US012780481B2

(12) United States Patent
Iijima

(10) Patent No.: US 12,780,481 B2
(45) Date of Patent: Nov. 3, 2026

(54) LABEL AFFIXING DEVICE

(71) Applicant: BROTHER KOGYO KABUSHIKI KAISHA, Nagoya (JP)

(72) Inventor: Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 112 days.

(21) Appl. No.: 19/028,206

(22) Filed: Jan. 17, 2025

(65) Prior Publication Data

US 2025/0236431 A1 Jul. 24, 2025

(30) Foreign Application Priority Data

Jan. 19, 2024 (JP) ................................ 2024-007031

(51) Int. Cl.

*B65C 9/40* (2006.01)
*B65C 7/00* (2006.01)
*B65C 9/00* (2006.01)

(52) U.S. Cl.

CPC .................. *B65C 9/40* (2013.01); *B65C 7/00* (2013.01); *B65C 9/0065* (2013.01); *B65C 2009/0087* (2013.01)

(58) Field of Classification Search

CPC .......... B65C 9/40; B65C 9/0065; B65C 9/42; B65C 7/00; B65C 2009/0087; B65C 3/02; B65C 11/021; B41J 11/703; B41J 3/4075

See application file for complete search history.

(56) References Cited

U.S. PATENT DOCUMENTS

| | | | | |
|---|---|---|---|---|
| 10,744,802 | B2 | 8/2020 | Yamaguchi et al. | |
| 2005/0031397 | A1* | 2/2005 | Miki ...................... | B41J 15/044 400/613 |
| 2007/0039677 | A1 | 2/2007 | Chapman | |
| 2022/0258499 | A1 | 8/2022 | Ukai et al. | |
| 2024/0165964 | A1 | 5/2024 | Iijima | |
| 2024/0246712 | A1 | 7/2024 | Iijima | |

FOREIGN PATENT DOCUMENTS

| | | | |
|---|---|---|---|
| JP | H10-16932 | A | 1/1998 |
| JP | 2009-234596 | A | 10/2009 |
| JP | 2015-63311 | A | 4/2015 |
| JP | 2023-020659 | A | 2/2023 |
| JP | 2023-20660 | A | 2/2023 |

* cited by examiner

*Primary Examiner* — Alex B Efta
*Assistant Examiner* — Alexander S Wright
(74) *Attorney, Agent, or Firm* — Kenealy Vaidya LLP

(57) ABSTRACT

A label affixing device includes a transport portion transporting a print tape in a transport direction, a cutting portion cutting a label material of the print tape into an individual label, a peeling portion peeling away of the label, and a controller. The label material is cut to form a margin region between a preceding label being one of the labels and a following label positioned upstream of the preceding label in the transport direction. When a downstream end portion of the margin region is positioned at or upstream of the peeling portion, the print tape is transported while imparting, to the print tape, a second tension smaller than a first tension required for the peeling away of the label. When the downstream end portion of the margin region is positioned downstream of the peeling portion, the print tape is transported while imparting the first tension to the print tape.

17 Claims, 43 Drawing Sheets

[ T0 ]

[ T4 ]

LABEL AFFIXING DEVICE

REFERENCE TO RELATED APPLICATIONS

This application claims priority from Japanese Patent Application No. 2024-007031 filed on Jan. 19, 2024. The entire content of the priority application is incorporated herein by reference.

BACKGROUND ART

The present disclosure relates to a label affixing device that affixes a label to an adherend.

A label affixing device is known that affixes a label removably adhered to a backing sheet, to an adherend. The label affixing device is provided with a feed-out roller that feeds out the backing sheet toward an acute angle portion, and a pull-out roller that gathers the backing sheet while pulling the backing sheet that has passed the acute angle portion. By decelerating or accelerating one of the feed-out roller or the pull-out roller and causing a speed difference between the rollers, the label affixing device weakens a tension on the backing sheet in the vicinity of the acute angle portion, and inhibits a label from being peeled away from the backing sheet.

SUMMARY

In the case of a label affixing device in which printing is performed on a print tape and a label is created by a half-cut operation, there is a case in which, after printing a preceding label, a subsequent label is not created and the preceding label is affixed to an adherend. In this case, a portion positioned between a print portion and a peeling portion of a label material becomes a margin region that cannot be used in creating a next label. In the conventional label affixing device, a so-called die cut label is targeted, in which only the label is affixed in advance to a backing sheet, and processing of the margin region is not taken into account.

An object of the present disclosure is to provide a label affixing device that peels away a label and affixes the label to an adherend, without peeling away a margin region formed on a print tape.

According to a first aspect of the present disclosure, a label affixing device is provided. The label affixing device includes a print portion including a print head and configured to print an image on a label material of a print tape, the print tape including the label material and a release material adhered to one surface of the label material. The label affixing device includes a transport portion configured to transport the print tape printed by the print portion, and a cutting portion disposed further downstream than the print portion in a transport direction of the print tape, the cutting portion being configured to cut the label material printed by the print portion into an individual label. The label affixing device includes a peeling portion configured to peel, away from the release material, the label cut by the cutting portion, and a controller configured to control the print portion, the transport portion, and the cutting portion. In the label affixing device that affixes the label peeled away by the peeling portion to an adherend being an affixing target of the label, the controller cuts the label material to form a margin region between a preceding label and a following label, the preceding label being one of the labels, the following label being positioned upstream of the preceding label in the transport direction, and the margin region being a region that is not a target of printing by the print portion. The controller transports the print tape while imparting a second tension to the print tape when a downstream end portion of the margin region in the transport direction is positioned at a position of the peeling portion or at a position further upstream than the peeling portion in the transport direction, the second tension being smaller than a first tension required by the peeling portion for the peeling away of the label. The controller transports the print tape while imparting the first tension to the print tape when the downstream end portion of the margin region is positioned further downstream than the position of the peeling portion in the transport direction.

The second tension is a tension with which slack is generated in the print tape in the transport of the print tape, for example. By transporting the print tape using the second tension when the downstream end portion of the margin region is positioned at the position of the peeling portion or at a position further upstream than the peeling portion, the downstream end portion of the margin region passes the position of the peeling portion without being peeled away by the peeling portion. The first tension is a tension with which the peeling portion can peel away the label from the print tape. By imparting the first tension to the print tape after the downstream end portion of the margin region has passed the position of the peeling portion, the slack in the print tape is eliminated and the print tape is transported without peeling away the margin region. Thus, the label affixing device contributes to peeling the label and affixing the label to the adherend without peeling away the margin region.

According to a second aspect of the present disclosure, a label affixing device is provided. The label affixing device includes a print portion including a print head and configured to print an image on a label material of a print tape, the print tape including the label material and a release material adhered to one surface of the label material. The label affixing device includes a transport portion configured to transport the print tape printed by the print portion, and a cutting portion disposed further downstream than the print portion in a transport direction of the print tape, the cutting portion being configured to cut the label material printed by the print portion into an individual label. The label affixing device includes a peeling portion configured to peel, away from the release material, the label cut by the cutting portion, and a controller configured to control the print portion, the transport portion, and the cutting portion. In the label affixing device that affixes the label peeled away by the peeling portion to an adherend being a target for affixing the label, the controller cuts the label material to form a margin region between a preceding label and a following label, the preceding label being one of the labels, the following label being positioned upstream of the preceding label in the transport direction, and the margin region being a region that is not a target of printing by the print portion. The controller transports the print tape while imparting a second tension to the print tape when the margin region is positioned at a position of the peeling portion or at a position further upstream than the peeling portion in the transport direction, the second tension being smaller than a first tension required by the peeling portion for the peeling away of the label. The controller transports the print tape while imparting the first tension to the print tape when an upstream end portion of the margin region in the transport direction is positioned further upstream in the transport direction than, and close to, the position of the peeling portion.

The second tension is a tension with which the slack is generated in the print tape in the transport of the print tape, for example. By transporting the print tape using the second tension when the margin region passes the peeling portion, the margin region is not peeled away by the peeling portion. The first tension is a tension with which the peeling portion can peel away the label from the print tape. By imparting the first tension to the print tape when the upstream end portion of the margin region is positioned upstream of and close to the peeling portion, the slack in the print tape is eliminated and, since the margin region has passed the peeling portion at that time, the margin region is transported without being peeled away. Thus, the label affixing device contributes to peeling the label and affixing the label to the adherend without peeling away the margin region.

DESCRIPTION

Figure 1:
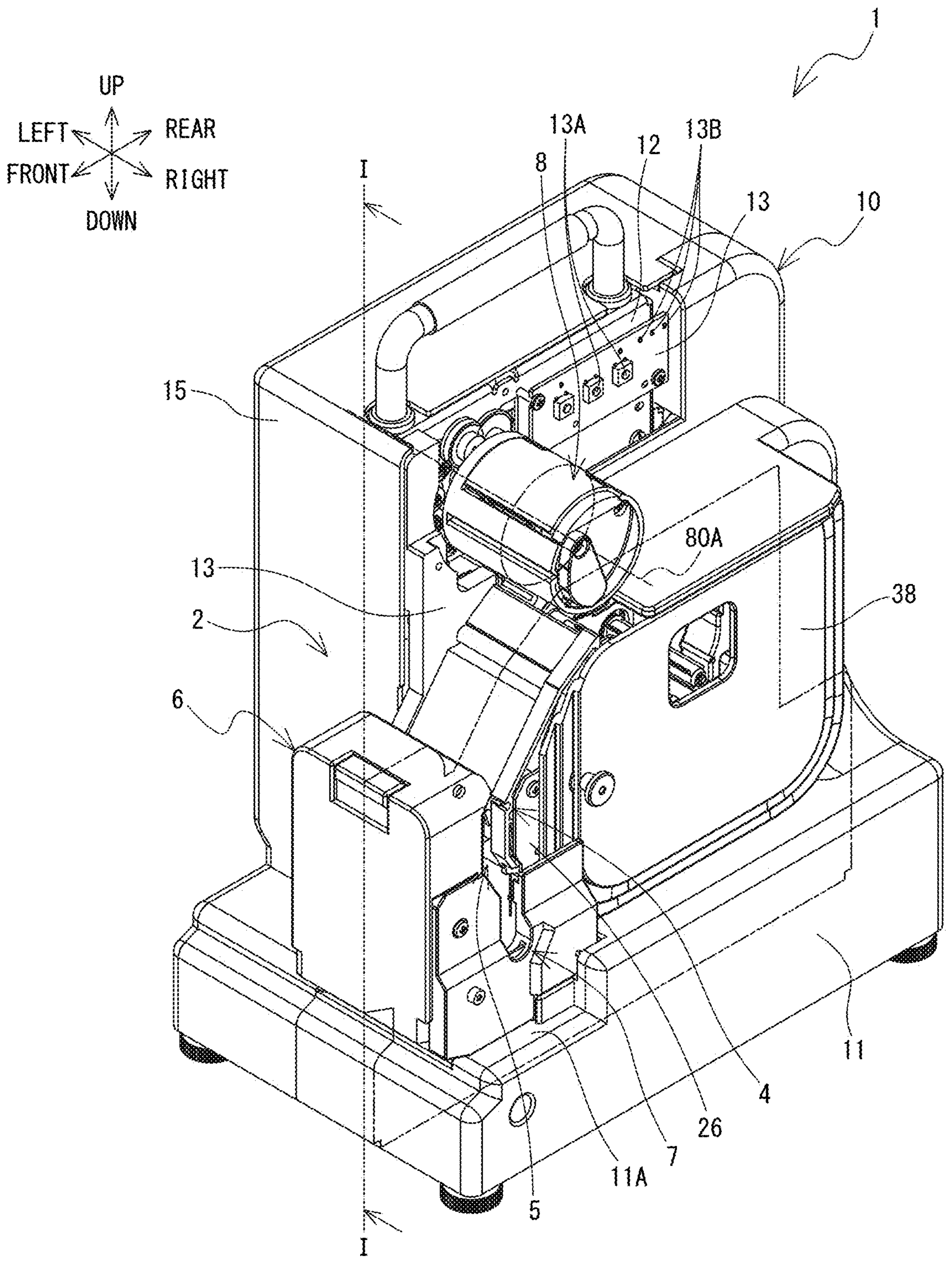
FIG. 1 is a perspective view of a label affixing device.

An embodiment of a label affixing device 1 embodying the present disclosure will be described with reference to the drawings. The referenced drawings are used to illustrate technological features that can be adopted by the present disclosure, and illustrated configurations of devices and the like are not intended to limit the present disclosure, and are simply explanatory examples. The label affixing device 1 is a device for producing a label 160 by performing printing on a tape 150 of a tape cassette 100 (refer to FIG. 4), and for wrapping the produced label 160 around a cable 19 and affixing the label 160 to the cable 19. Hereinafter, a lower left direction, an upper right direction, an upper left direction, a lower right direction, an upward direction, and a downward direction in FIG. 1 are, respectively, a front direction, a rear direction, a left direction, a right direction, an upward direction, and a downward direction of the label affixing device 1.

Overview of Label Affixing Device 1

Figure 2:
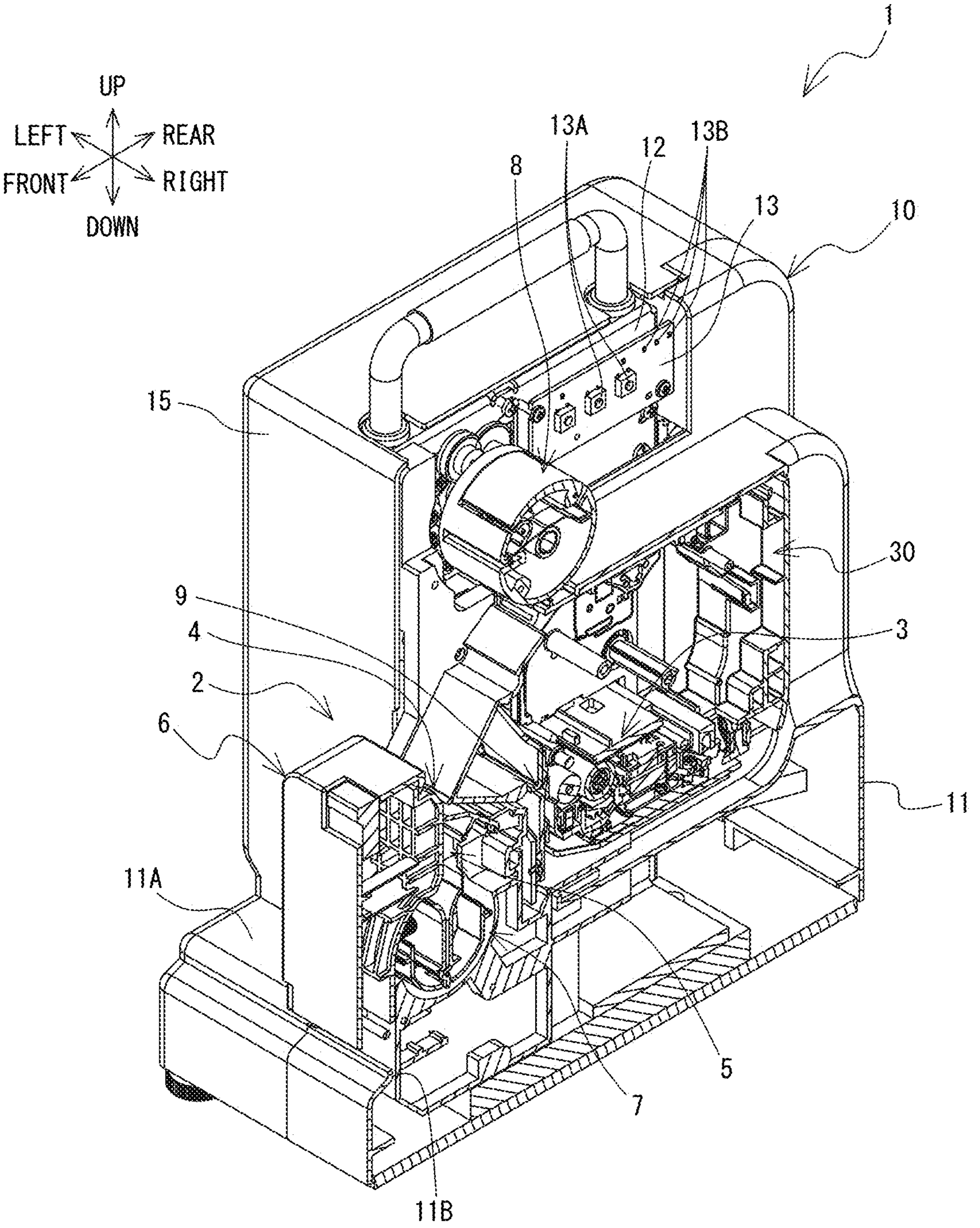
FIG. 2 is a perspective cross-sectional view of the label affixing device as cut along a line I-I shown in FIG. 1.
Figure 3:
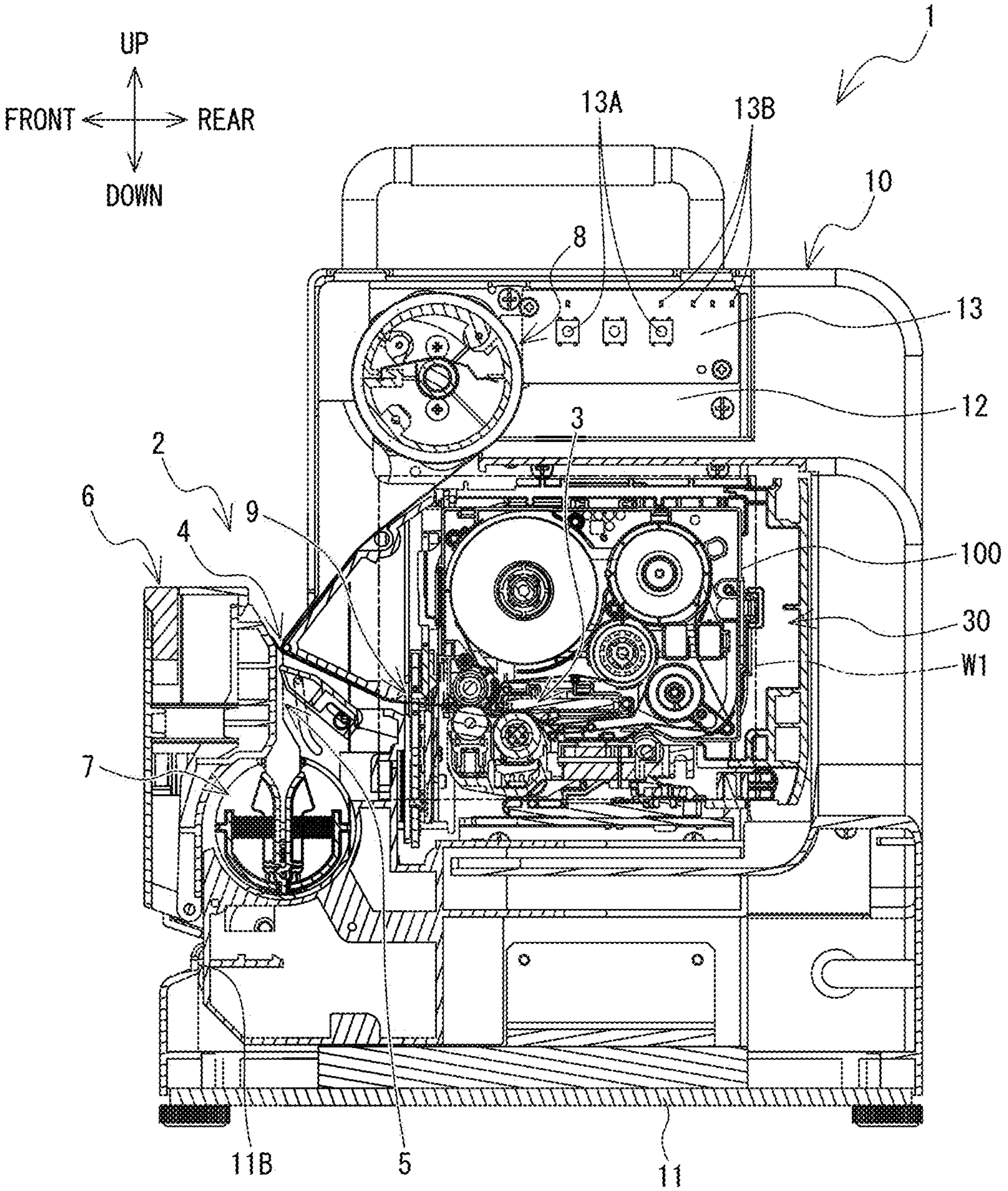
FIG. 3 is a right side cross-sectional view of the label affixing device cut along the line I-I shown in FIG. 1.

The label affixing device 1 will be described. As shown in FIG. 1 to FIG. 3, the label affixing device 1 includes a box-shaped housing 10. The housing 10 includes a base 11, a main unit 2, a main plate 12, a cover 15, a tape compartment 30, a print mechanism 3, and a cutting portion 9. The base 11 is a foundation of the label affixing device 1. The base 11 is a rectangular box shape, and is provided with adjustable legs, at a bottom portion thereof, that maintain the label affixing device 1 in a horizontal posture when the label affixing device 1 is placed on a table or the like. A power supply board, a battery, and the like (not shown in the drawings) are housed inside the base 11. A low floor portion 11A is formed at the front end of the base 11. The low floor portion 11A is lower, in a stepwise manner, than other portions of the base 11. A recess portion 11B is formed in a portion from substantially the center in the left-right direction to the right end of the low floor portion 11A. The main unit 2 is disposed in the recess portion 11B.

The main unit 2 is a unit for peeling away the label 160 from the tape 150 printed in the print mechanism 3 (to be described later), and for wrapping the label 160 around the cable 19. The main unit 2 includes a peeling portion 4, a pressing portion 5, an opening/closing member 6, and a wrapping portion 7 (to be described later). The lower end portion of the main unit 2 is disposed in the recess portion 11B of the low floor portion 11A of the base 11 and is fixed to the base 11. The main unit 2 will be described later.

Figure 25:
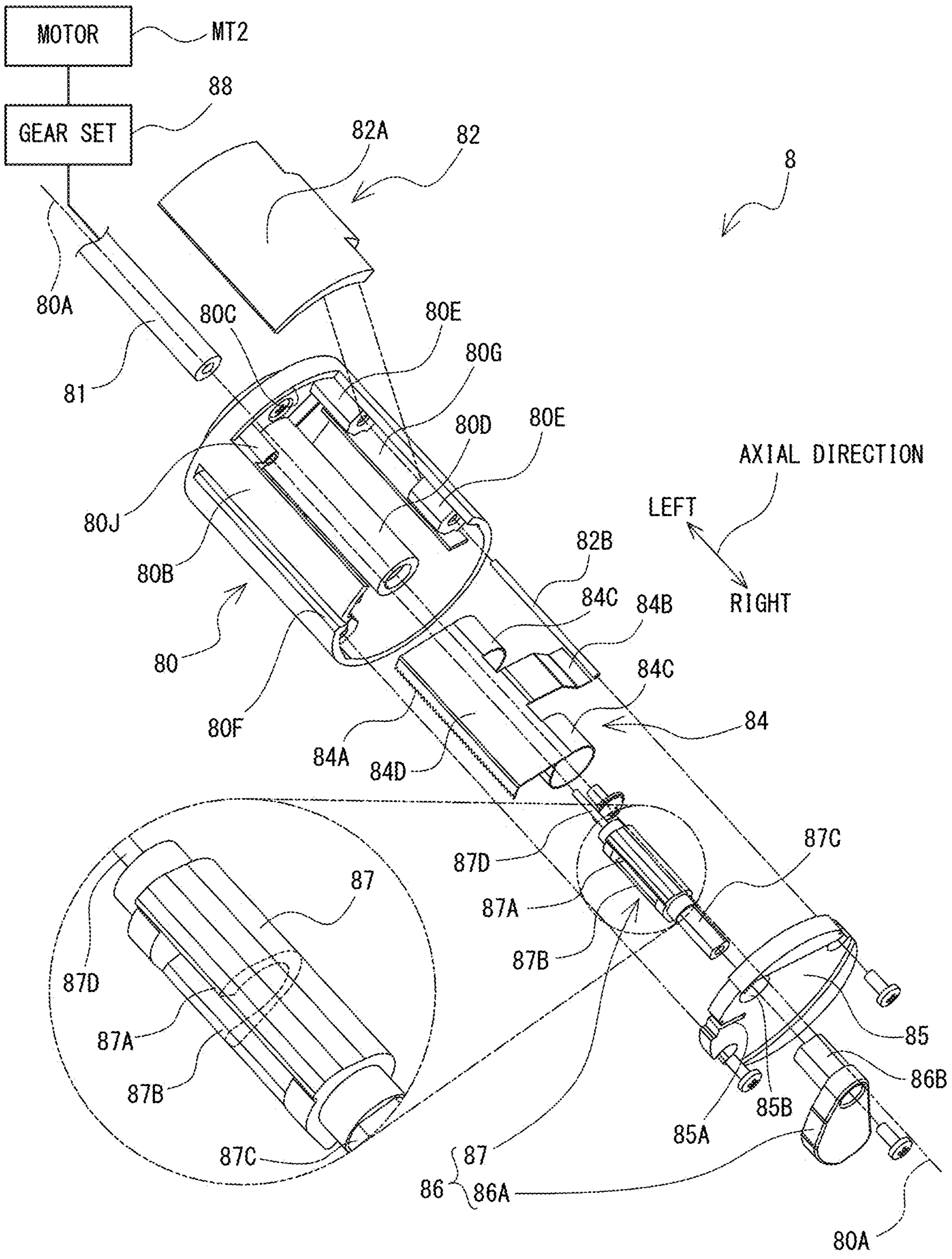
FIG. 25 is an exploded perspective view of a winding portion.

The main plate 12 has a plate shape extending in the up-down direction and the front-rear direction, is disposed at a position further to the left than the center, in the left-right direction of the base 11, and extends upward. The lower end portion of the main plate 12 is fixed to the lower end portion of the main unit 2, inside the base 11. The right surface of the main plate 12 supports the tape compartment 30, the print mechanism 3, the cutting portion 9, a winding portion 8 (to be described later), and an operation panel 13, and the left surface of the main plate 12 supports a controller 14 (refer to FIG. 30) and a drive portion. The controller 14 controls operations of the label affixing device 1. The drive portion includes a gear set 39 (refer to FIG. 4), a cam 93, a gear set 94 (refer to FIG. 6), and a gear set 88 (refer to FIG. 25). The gear set 39 drives the print mechanism 3 using a driving force of a motor MT3. The cam 93 drives a full-cut cutting blade 91 of the cutting portion 9 using a driving force of a motor MT4. The gear set 94 drives a half-cut cutting blade 92 of the cutting portion 9 using a driving force of a motor MT5. The gear set 88 drives the winding portion 8 using a driving force of a motor MT2. The operation panel 13 is fixed to the upper end portion of the main plate 12. An operation portion 13A including a plurality of buttons for receiving input of operations with respect to the label affixing device 1, and a notification portion 13B including a plurality of LEDs for notifying an operation status of the label affixing device 1 are provided at the operation panel 13. A handle used for carrying the label affixing device 1 is provided at the upper end of the main plate 12. The cover 15 that protects the controller 14 and the gear set 39 is mounted to the left surface of the main plate 12.

Figure 4:
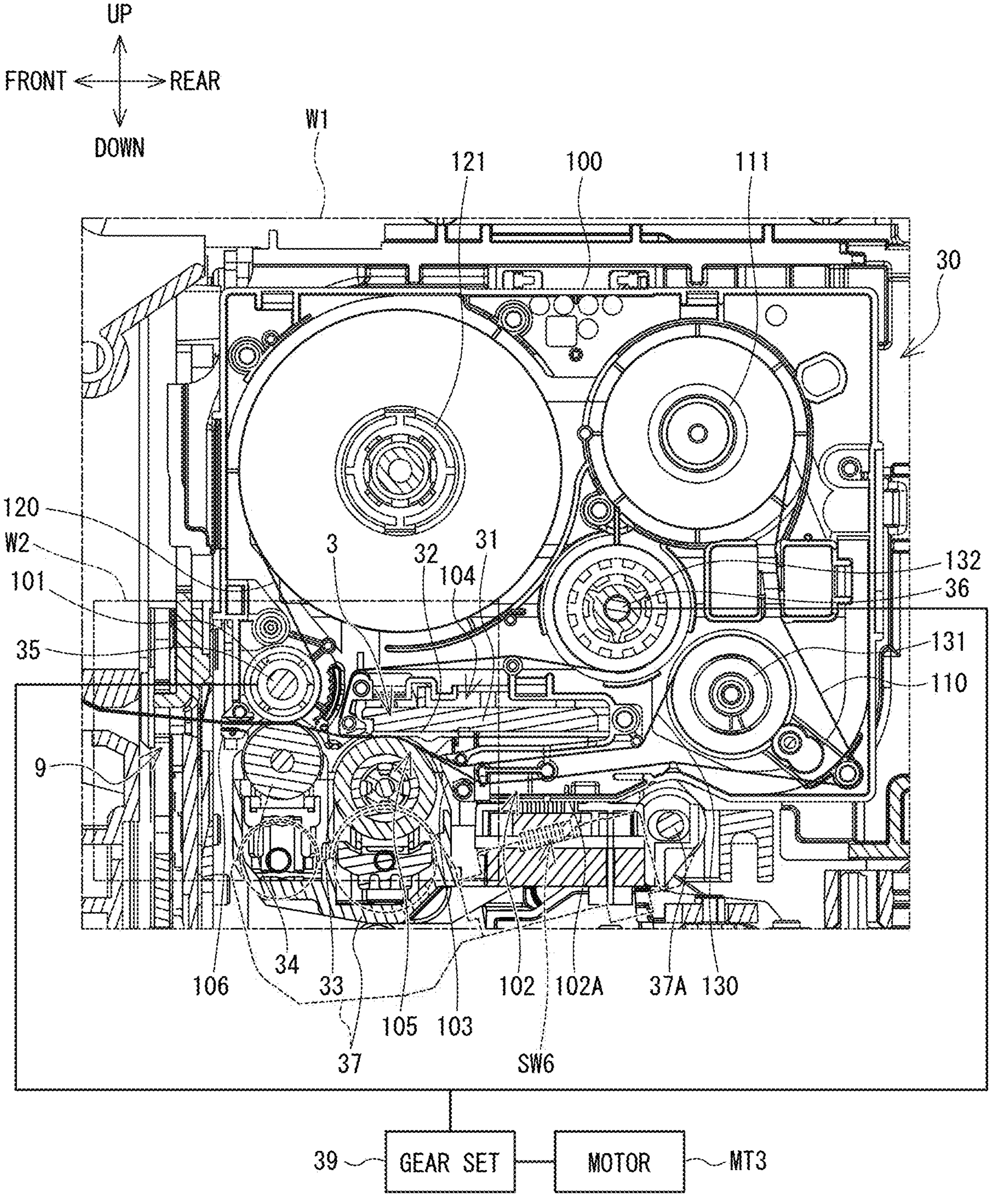
FIG. 4 is an enlarged view of a section indicated by a two-dot chain line shown in FIG. 3.

The tape compartment 30 is provided at substantially the center, in the front-rear direction and the up-down direction, of the housing 10, at the right surface of the main plate 12. As shown in FIG. 4, the compartment 30 has a box shape that is open at the right and can accept a plurality of types of tape cassette, such as a thermal type, a receptor type, a laminate type, and the like. The thermal-type tape cassette is provided with a heat-sensitive paper tape. The receptor-type tape cassette is provided with a tape and an ink ribbon. The tape cassette used in the label affixing device 1 according to the present embodiment is a laminate-type tape cassette 100. The laminate-type tape cassette 100 is provided with a film tape 110, a double-sided adhesive tape 120, and an ink ribbon 130. The film tape 110 is a transparent PET tape. The double-sided adhesive tape 120 is a tape in which a base material 140 and a release material 170 (refer to FIG. 6) are laminated via an adhesive. The tape cassette 100 will be described later.

Print Mechanism 3

Figure 5:
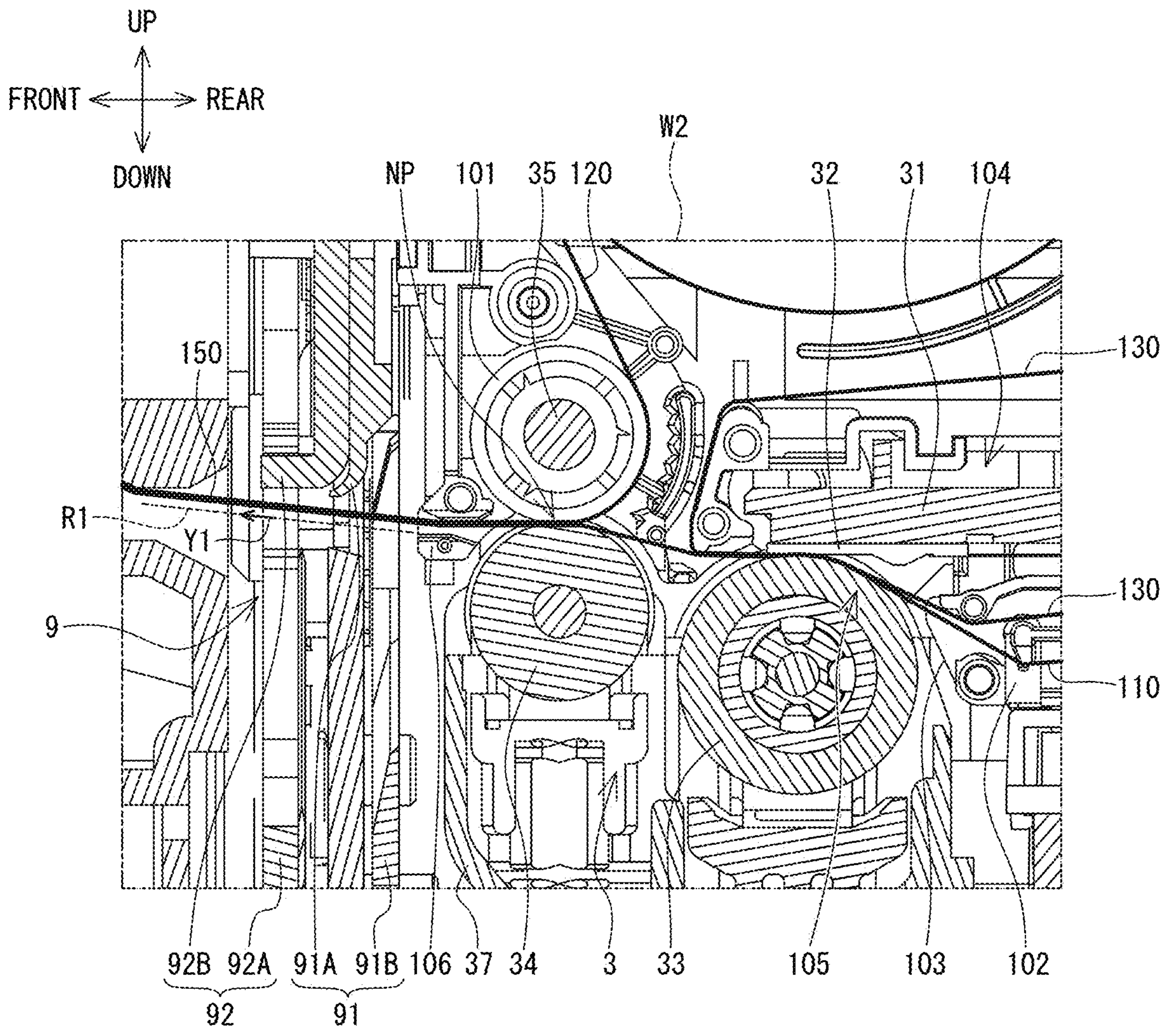
FIG. 5 is an enlarged view of a section indicated by a two-dot chain line shown in FIG. 4.

As shown in FIG. 4 and FIG. 5, the print mechanism 3 is provided below the tape compartment 30. The print mechanism 3 is provided with a head holder 31, a thermal head 32, a platen roller 33, a transport roller 34, a drive shaft 35, and a winding shaft 36. The head holder 31 is provided below the tape compartment 30. The head holder 31 has a plate shape, and extends in the front-rear direction and the left-right direction. The thermal head 32 is provided at the lower surface of the head holder 31. The thermal head 32 is provided with a plurality of heating elements (not shown in the drawings). The plurality of heating elements are aligned in a row in the left-right direction. In a state in which the tape cassette 100 is installed in the tape compartment 30, the thermal head 32 heats the ink ribbon 130 using the plurality of heating elements, and transfers ink to the film tape 110. Along with supporting the thermal head 32, the head holder 31 functions as a heat sink for the heating elements.

The drive shaft 35 for transporting the tape 150 is provided diagonally above and to the front of the head holder 31. The drive shaft 35 extends to the right from the bottom surface of a recess portion of the tape compartment 30 and is driven to rotate by the motor MT3 connected via the gear set 39. When the tape cassette 100 is installed, the drive shaft 35 engages with a shaft hole of a drive roller 101 of the tape cassette 100. The winding shaft 36 is provided diagonally above and to the rear of the head holder 31. The winding shaft 36 is driven to rotate by the driving force of the motor MT3 connected via the gear set 39. When the tape cassette 100 is installed, the winding shaft 36 engages with a winding spool 132 of the tape cassette 100.

A platen holder 37 is provided below the head holder 31. The platen holder 37 has an arm shape, and is supported to be rotatable around a support shaft 37A extending in the left-right direction. The support shaft 37A is provided at the rear end of the platen holder 37. The platen roller 33 and the transport roller 34 are rotatably supported at the leading end of the platen holder 37. The platen roller 33 approaches and moves away from the thermal head 32 in accordance with swinging of the platen holder 37. The transport roller 34 is provided to the left of the platen roller 33. The transport roller 34 approaches and moves away from the drive roller 101 of the tape cassette 100, in accordance with the swinging of the platen holder 37.

A sensor SW6 (refer to FIG. 4) is provided at the upper surface of the platen holder 37, namely, at the surface on the side facing the thermal head 32. The sensor SW6 includes a plurality of detection switches. Each of the detection switches is provided at a position facing an indicator portion 102A formed at a lower wall of an arm portion 102 of the tape cassette 100, in the state in which the tape cassette 100 is installed in the tape compartment 30.

A cassette cover 38 (refer to FIG. 1) is rotatably supported at the rear end portion of the tape compartment 30. A rotation center of the cassette cover 38 extends in the up-down direction. The cassette cover 38 opens and closes an open section of the tape compartment 30. In conjunction with the opening and closing of the cassette cover 38, the platen holder 37 swings between a stand-by position (a position indicated by a dotted line in FIG. 4), and a printing position (a position indicated by a solid line in FIG. 4). When the cassette cover 38 is opened, the platen holder 37 moves to the stand-by position. The stand-by position is a position at which the platen roller 33 and the transport roller 34 are separated from the tape compartment 30. When the platen holder 37 has moved to the stand-by position, a user can install or remove the tape cassette 100 into or from the tape compartment 30. When the cassette cover 38 is closed, the platen holder 37 moves to the printing position. The printing position is a position at which the platen roller 33 and the transport roller 34 are closer to the tape compartment 30. At the printing position, the platen roller 33 presses the film tape 110 and the ink ribbon 130 against the thermal head 32, and the transport roller 34 overlaps the film tape 110 with the double-sided adhesive tape 120 and presses them against the drive roller 101.

The tape cassette 100 houses the film tape 110, the double-sided adhesive tape 120, and the ink ribbon 130 in a box-shaped case. A film spool 111 around which the pre-printing film tape 110 is wound, is rotatably supported at a position diagonally above and to the rear inside the case. A ribbon spool 131 around which the unused ink ribbon 130 is wound is rotatably supported at a position diagonally below and to the rear inside the case. A tape spool 121 around which the double-sided adhesive tape 120 is wound is rotatably supported at a position diagonally above and to the front inside the case. The winding spool 132 that winds up the used ink ribbon 130 is rotatably supported at a position between the film spool 111, the tape spool 121, and the ribbon spool 131. The drive roller 101 is rotatably supported at a position diagonally below and to the front of the tape spool 121 inside the case.

The arm portion 102 is provided at the lower portion of the case. The arm portion 102 extends from the lower rear portion of the case to the lower front portion of the case. The indicator portion 102A is formed at the lower wall of the arm portion 102. The indicator portion 102A includes a plurality of detection holes. The detection holes are holes selectively formed at predetermined positions of the indicator portion 102A. The positions at which the detection holes are formed differ depending on the type of the tape cassette 100. When the platen holder 37 moves toward the printing position, the sensor SW6 faces the lower wall of the arm portion 102 of the tape cassette 100, and the detection switches of the sensor SW6 are selectively pressed by the detection holes of the indicator portion 102A. The detection switches corresponding to positions at which the detection holes are not formed, of the predetermined positions of the indicator portion 102A, are pressed and are in an on state. On the other hand, the detection switches corresponding to the position at which the detection holes are formed, of the predetermined positions, are not pressed and are in an off state. The label affixing device 1 detects the type of the tape cassette 100 based on an on and off combination of the detection switches of the sensor SW6.

An open portion 103 is provided at the left end of the arm portion 102. The open portion 103 is formed in a slit shape extending in the left-right direction. The open portion 103 discharges the film tape 110 pulled off the film spool 111 and the ink ribbon 130 pulled off the ribbon spool 131 from the inside to the outside of the case, in a state of the film tape 110 and the ink ribbon 130 being overlaid with each other.

A head insertion portion 104 is formed to the upper part of the arm portion 102. The head insertion portion 104 penetrates the case in the up-down direction. The front lower portion of the head insertion portion 104 is a head opening 105 that is open downward. The head opening 105 is positioned further downstream (to the front) than the open portion 103, in a transport direction (the front-rear direction) of the film tape 110. In the state in which the tape cassette 100 is installed in the tape compartment 30, the head holder 31 is inserted into the head insertion portion 104.

The drive roller 101 is positioned to the front of the head insertion portion 104, and is positioned between the open portion 103 of the arm portion 102 and a guide portion 106 in the transport direction of the film tape 110. The drive roller 101 has a cylindrical shape and extends in the left-right direction. The lower end portion of the drive roller 101 is exposed downward from the case. The driver roller 101 supports the double-sided adhesive tape 120 in a state in which the film tape 110 and the double-sided adhesive tape 120 are overlaid with each other. In the state in which the tape cassette 100 is installed in the tape compartment 30, the drive shaft 35 is inserted into the shaft hole of the drive roller 101. The drive roller 101 rotates in accordance with the rotational driving of the drive shaft 35 and transports the film tape 110 and the double-sided adhesive tape 120 in a state of being pinched between the drive roller 101 and the transport roller 34 at a roller nip point NP (refer to FIG. 5). The guide portion 106 is provided at a corner portion diagonally downward and at the front of the case.

The guide portion 106 is disposed further downstream (to the front) than the open portion 103 in the transport direction of the film tape 110. The guide portion 106 is formed in a slit shape extending in the left-right direction. The tape 150, which is formed by the double-sided adhesive tape 120 being adhered to the film tape 110, is transported by the drive roller 101 and passes through the inside of the guide portion 106. The guide portion 106 supports the tape 150 from both sides in the width direction. In this way, the tape 150 is discharged from the tape cassette 100 in a state in which the posture of the tape 150 is held.

At the time of printing by the print mechanism 3, the platen holder 37 moves from the stand-by position to the printing position. The platen roller 33 presses the film tape 110 and the ink ribbon 130 in the overlaid state against the thermal head 32. The platen roller 33 rotates and transports the film tape 110 toward the front. At the same time, the thermal head 32 produces heat, and the ink ribbon 130 is heated. In this way, the ink of the ink ribbon 130 is transferred to a print surface Ut (refer to FIG. 6) of the film tape 110. As a result, an image including characters and the like is printed on the film tape 110. After the printing, the ink ribbon 130 separates from the film tape 110, and is wound up by the winding spool 132.

The double-sided adhesive tape 120 is overlaid with the print surface Ut of the film tape 110 that has been printed. The base material 140 of the double-sided adhesive tape 120 comes into contact with the print surface Ut of the film tape 110. In this state, the film tape 110 and the double-sided adhesive tape 120 pass through the roller nip point NP between the drive roller 101 and the transport roller 34, in a state in which the film tape 110 is disposed below the double-sided adhesive tape 120. As a result of the film tape 110 being adhered to the base material 140 using the adhesive, the printed label 160 (refer to FIG. 6) is produced. The upper surface of the label 160 corresponds to an adhesive surface Ur (refer to FIG. 6) to which the adhesive of the base material 140 is adhered, and a state is obtained in which the release material 170 is adhered to the adhesive surface Ur. In other words, as a result of the double-sided adhesive tape 120 being adhered to the film tape 110, the tape 150 is produced in a state in which the release material 170 is adhered to the label 160. The width direction of the tape 150 corresponds to the left-right direction. A transport path of the tape 150 that is transported from the print mechanism 3, passes through the cutting portion 9, and is transported to the main unit 2 will be referred to as a "transport path R1". A transport direction of the tape 150 along the transport path R1 will be referred to as a "transport direction Y1". The transport direction Y1 is a direction from the roller nip point NP between the drive roller 101 and the transport roller 34 toward the main unit 2, passing through the cutting portion 9, and is a direction toward the front.

Cutting Portion 9

Figure 6:
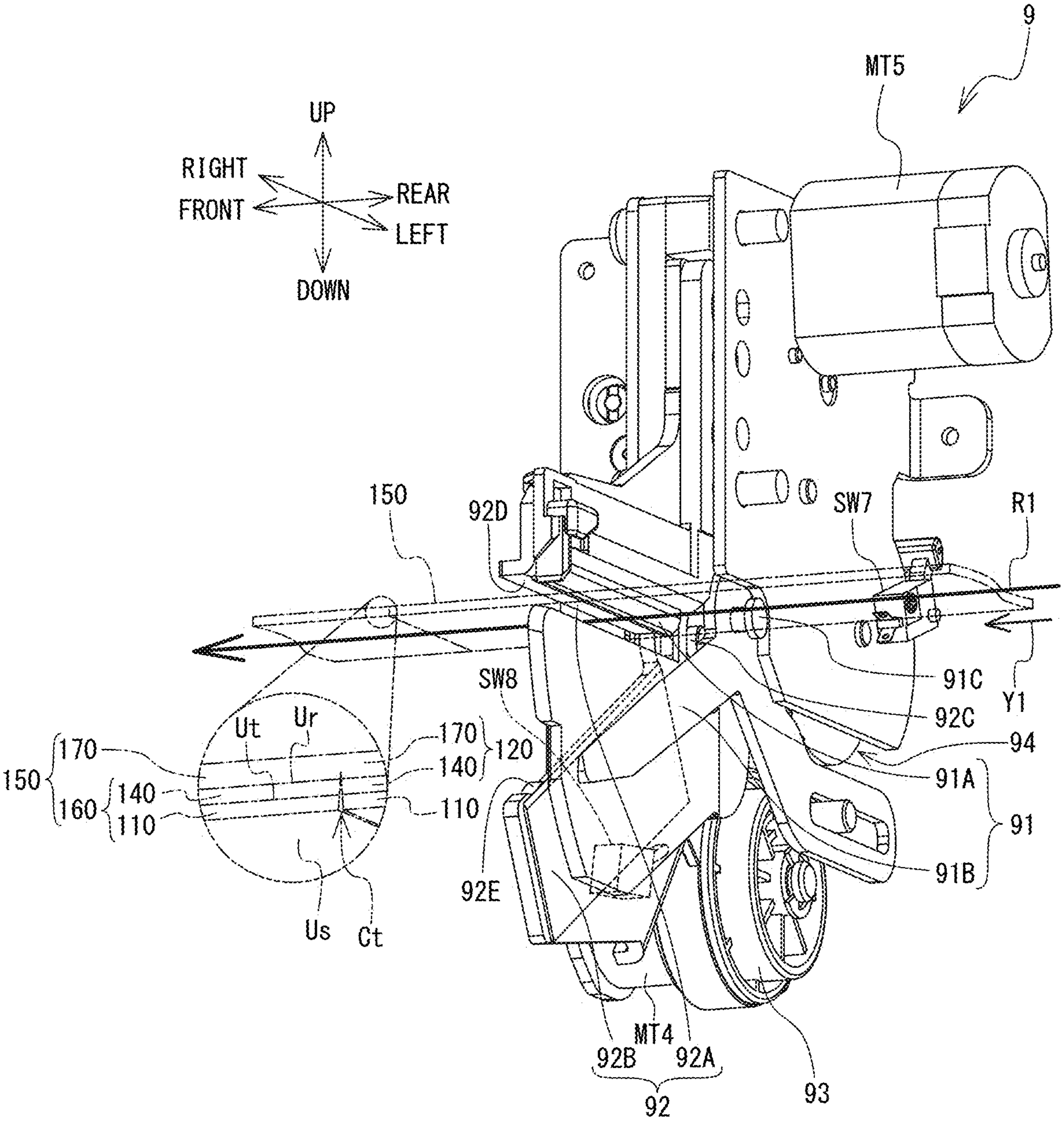
FIG. 6 is a perspective view of a cutting portion.
Figure 7:
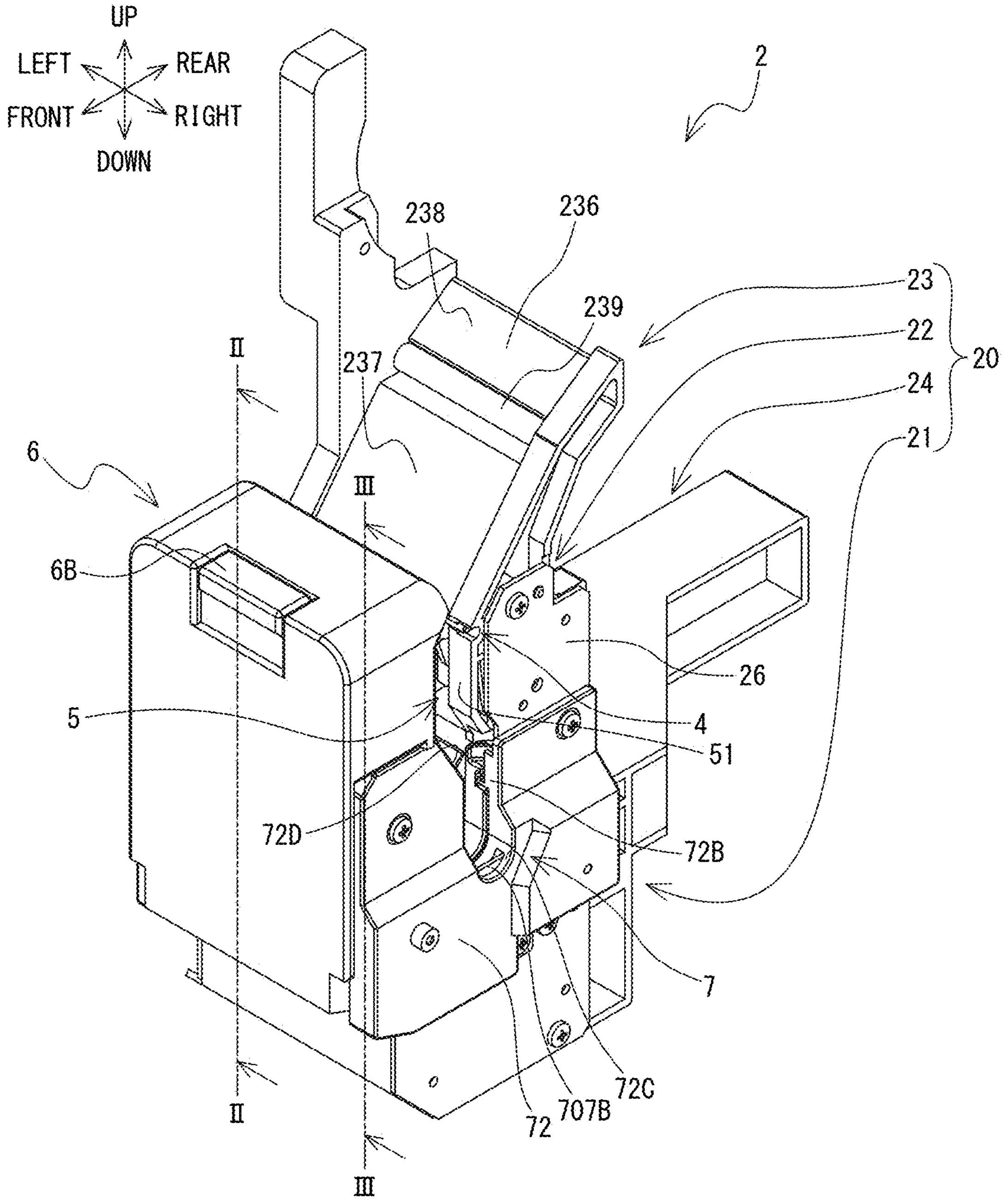
FIG. 7 is a perspective view of a main unit.

As shown in FIG. 5 and FIG. 6, the cutting portion 9 is disposed downstream of the transport roller 34 of the print mechanism 3 in the transport direction Y1 of the tape 150. The cutting portion 9 includes the full-cut cutting blade 91 and the half-cut cutting blade 92. The full-cut cutting blade 91 includes a fixed blade 91A that is fixed at a position higher than the transport path R1, and a movable blade 91B that can rotate at a position lower than the transport path R1. The fixed blade 91A extends in the left-right direction, and a cutting edge thereof faces downward. The movable blade 91B has a plate shape extending in the left-right direction, a cutting edge thereof facing upward, and is supported by a rotation shaft 91C. The rotation shaft 91C is provided to the left of the transport path R1 and extends in the front-rear direction. The movable blade 91B is connected to the motor MT4, via the cam 93, and rotates around the rotation shaft 91C due to the driving force of the motor MT4. By moving the cutting edge of the movable blade 91B upward, through the transport path R1 from below the transport path R1, with respect to the cutting edge of the fixed blade 91A, the full-cut cutting blade 91 divides (fully cuts) the tape 150.

The half-cut cutting blade 92 is provided downstream of the full-cut cutting blade 91 on the transport path R1. The half-cut cutting blade 92 includes a fixed base 92A fixed above the transport path R1, and a rotatable movable blade 92B provided lower than the transport path R1. The fixed base 92A extends in the left-right direction, and includes a blade contact surface 92D that faces downward, namely, faces toward the transport path R1. The movable blade 92B has a plate shape extending in the left-right direction and is supported by a rotation shaft 92C. The rotation shaft 92C is provided to the left of the transport path R1 and extends in the front-rear direction. The movable blade 92B is connected to the motor MT5 via the gear set 94 and rotates around the rotation shaft 92C due to the driving force of the motor MT5. The cutting edge of the movable blade 92B extends in the left-right direction and faces upward. A protrusion 92E, which protrudes slightly higher than the cutting edge, is formed at a leading end portion of the movable blade 92B. The amount the protrusion 92E protrudes above the cutting edge is equal to or less than a thickness of the release material 170.

As a result of adhering the film tape 110 to the lower surface of the double-sided adhesive tape 120, in the tape 150 transported by the transport path R1, of the label 160, the adhesive surface Ur to which the release material 170 is adhered faces upward, and a front surface Us opposite to the adhesive surface Ur faces downward. In the half-cut cutting blade 92, the cutting edge of the movable blade 92B approaches the blade contact surface 92D of the fixed base 92A, and using the cutting edge, cuts the film tape 110 and the base material 140 further below the release material 170, namely, cuts the label 160 from the front surface Us toward the adhesive surface Ur. The half-cut cutting blade 92 leaves the release material 170 uncut (performs the half-cut operation), by using the protrusion 92E to form a gap, between the cutting edge and the blade contact surface 92D, that is equal to or less than the thickness of the release material 170.

Main Unit 2

As shown in FIG. 7 to FIG. 11, a base body 20 of the main unit 2 is reinforced at both side surfaces by a left side plate 25 and a right side plate 26 (refer to FIG. 9), and the peeling portion 4, the pressing portion 5, the opening/closing member 6, and the wrapping portion 7 are provided between the left side plate 25 and the right side plate 26. The base body 20 is made of resin and supports the whole of the main unit 2. The base body 20 includes a bottom portion 21, a middle portion 22, an upper portion 23, and a rear portion 24. The size of the base body 20 in the left-right direction is greater than a maximum width of the tape 150 (the label 160) corresponding to the label affixing device 1.

The bottom portion 21 has a square cylindrical box shape extending in the left-right direction, and includes a partition plate, extending in the front-rear direction and the up-down direction, at a center thereof in the left-right direction. The lower portion of the bottom portion 21 is disposed inside the recess portion 11B of the base 11. A housing portion 211, which has a semi-circular cylindrical shaped recessed surface whose axial direction is the left-right direction and which is open upward and to the front, is formed in an upper portion of the bottom portion 21. The wrapping portion 7 that wraps the label 160 around the cable 19 is provided in the bottom portion 21. A drive mechanism 705 (refer to FIG. 9) that transmits a driving force for driving a rotation body 70 of the wrapping portion 7 is supported at the right surface of the left side plate 25, and is disposed in a region further to the left of the partition plate inside the bottom portion 21. A motor MT1 that generates the driving force for driving the rotation body 70 is assembled to the left surface of the left side plate 25, and a rotation shaft of the motor MT1 penetrates the left side plate 25 and is connected to the drive mechanism 705. The rotation body 70 is housed in the housing portion 211. The wrapping portion 7 will be described later. The rear portion 24 protrudes to the rear of the bottom portion 21. The rear portion 24 is disposed further to the rear than the recess portion 11B inside the base 11, and is fixed to the base 11 by screws, along with the lower portion of the bottom portion 21.

The middle portion 22 includes a left wall 221, a right wall 222, and a connecting wall 223, and is formed above the bottom portion 21. The left wall 221 extends upward from the left rear end portion of the bottom portion 21, and the right wall 222 extends upward from the right rear end portion of the bottom portion 21. The connecting wall 223 connects the left wall 221 and the right wall 222 in the left-right direction, at the rear portions thereof. A region between the left wall 221 and the right wall 222 is a peeling region 224 (refer to FIG. 11), and is a space portion that is open to the front and downward. The label 160 is pulled downward in the peeling region 224, and is peeled away from the release material 170. The pressing portion 5 that presses an end portion of the label 160 onto the cable 19 is provided in the middle portion 22. Guide surfaces 51 that extend in the up-down direction and face to the front are formed at the front end of the left wall 221 and the front end of the right wall 222 in the middle portion 22. The pressing portion 5 and the guide surfaces 51 will be described later.

Figure 11:
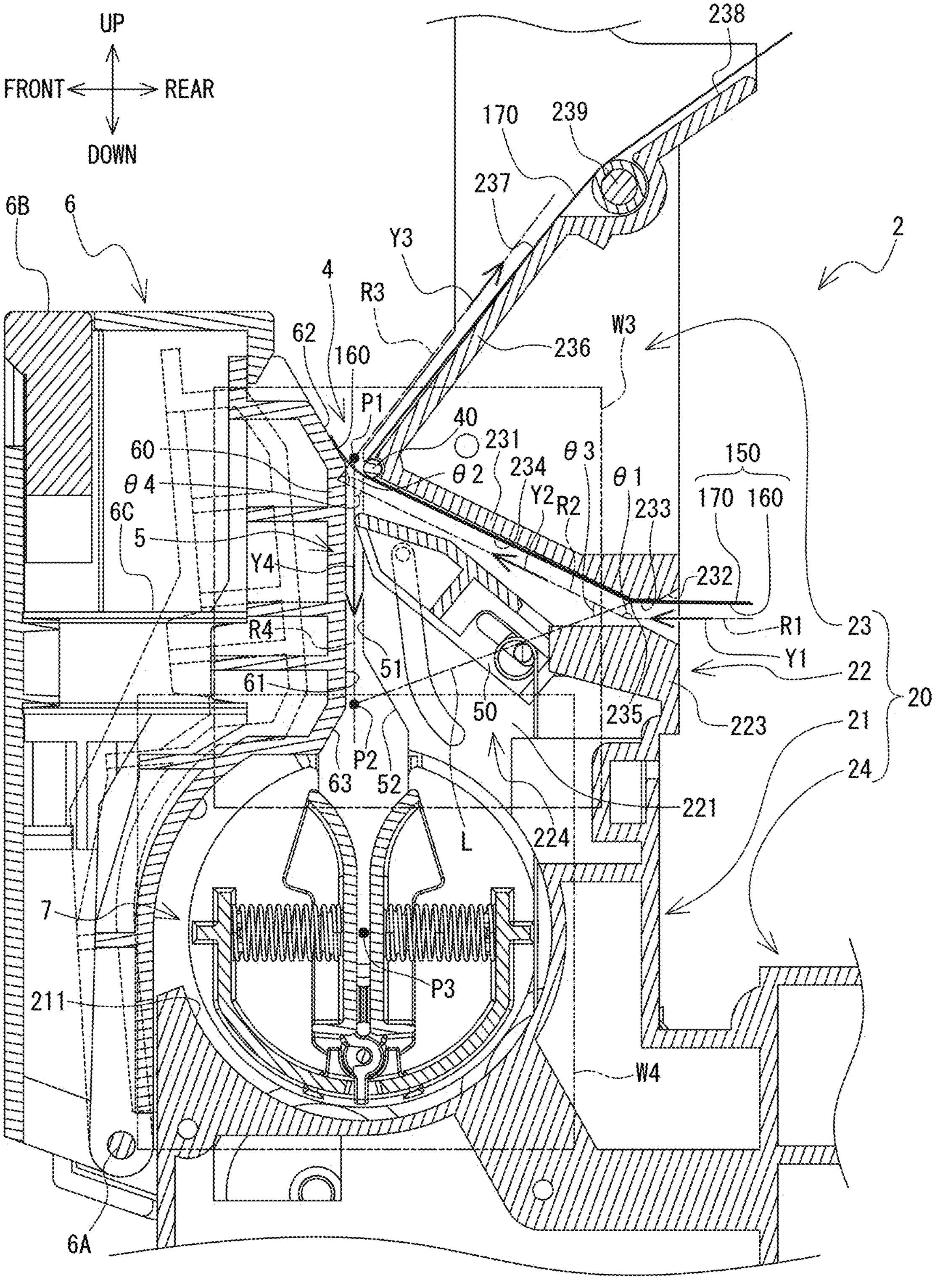
FIG. 11 is a right side cross-sectional view of the main unit cut along a line II-II shown in FIG. 7.

The upper portion 23 is formed above the middle portion 22. Each of the left wall 221 and the right wall 222 extends further from the middle portion 22 toward the upper portion 23. As shown in FIG. 11, the upper portion 23 includes a first wall 231 and a second wall 236. The first wall 231 has a plate shape stretching between the left wall 221 and the right wall 222 and extends diagonally upward toward the front in a side view. The second wall 236 has a plate shape stretching between the left wall 221 and the right wall 222 and extends diagonally upward toward the rear in a side view, from the front end of the first wall 231. The peeling portion 4 is provided at a connection portion of the first wall 231 and the second wall 236. The peeling portion 4 will be described later.

The first wall 231 defines a furthermost downstream section, in the transport direction Y1 in the transport path R1, of the tape 150 that has been transported on the transport path R1 and has passed through the cutting portion 9, and defines a transport path R2 along which the tape 150 is transported toward the peeling portion 4. The transport path R2 is connected to the transport path R1. The first wall 231 includes a first surface 232 and a second surface 233 facing the transport path R1, and a third surface 234 facing the transport path R2. The first surface 232 is positioned further downstream, in the transport direction Y1 of the tape 150 transported along the transport path R1, than the cutting portion 9, and faces diagonally downward to the front. The first surface 232 is disposed at a position at which the tape 150 that has passed through the cutting portion 9 enters into the main unit 2. The second surface 233 is positioned furthermost downstream in the transport direction Y1 in the transport path R1, is connected to the first surface 232, and faces downward. The second surface 233 defines the transport direction Y1 of the tape 150, by coming into contact with the tape 150.

A transport direction Y2 is a direction along which the tape 150 is transported on the transport path R2 along the third surface 234, and is a direction extending diagonally upward toward the front. The third surface 234 is connected to the second surface 233 at a position furthermost upstream in the transport direction Y2 of the transport path R2, extends toward the peeling portion 4, and faces diagonally downward to the front. The third surface 234 is in contact with the tape 150 being transported along the transport path R2, defines the transport direction Y2, and guides the tape 150 toward the peeling portion 4.

Figure 26:
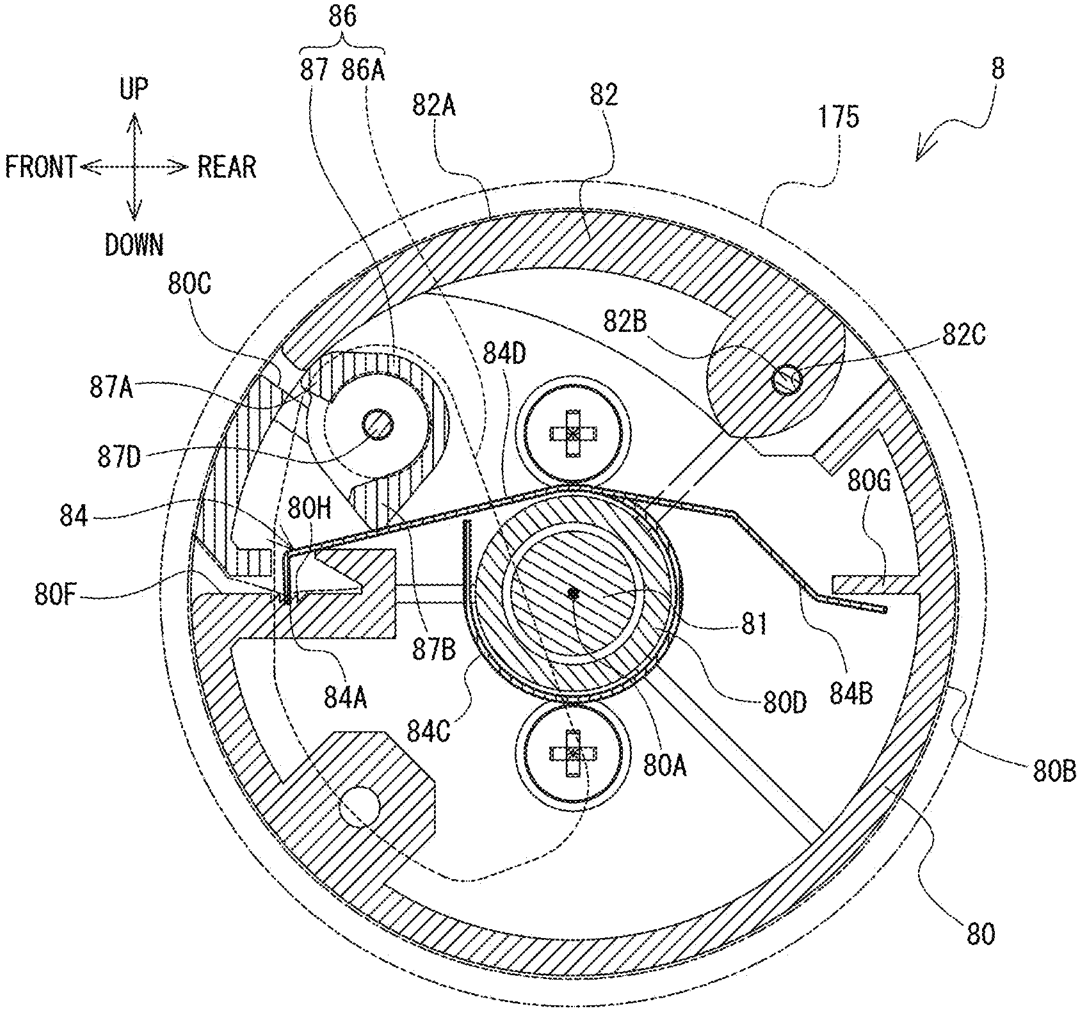
FIG. 26 is a cross-sectional view in an axial direction of the winding portion when an operation portion is at a first position.
Figure 27:
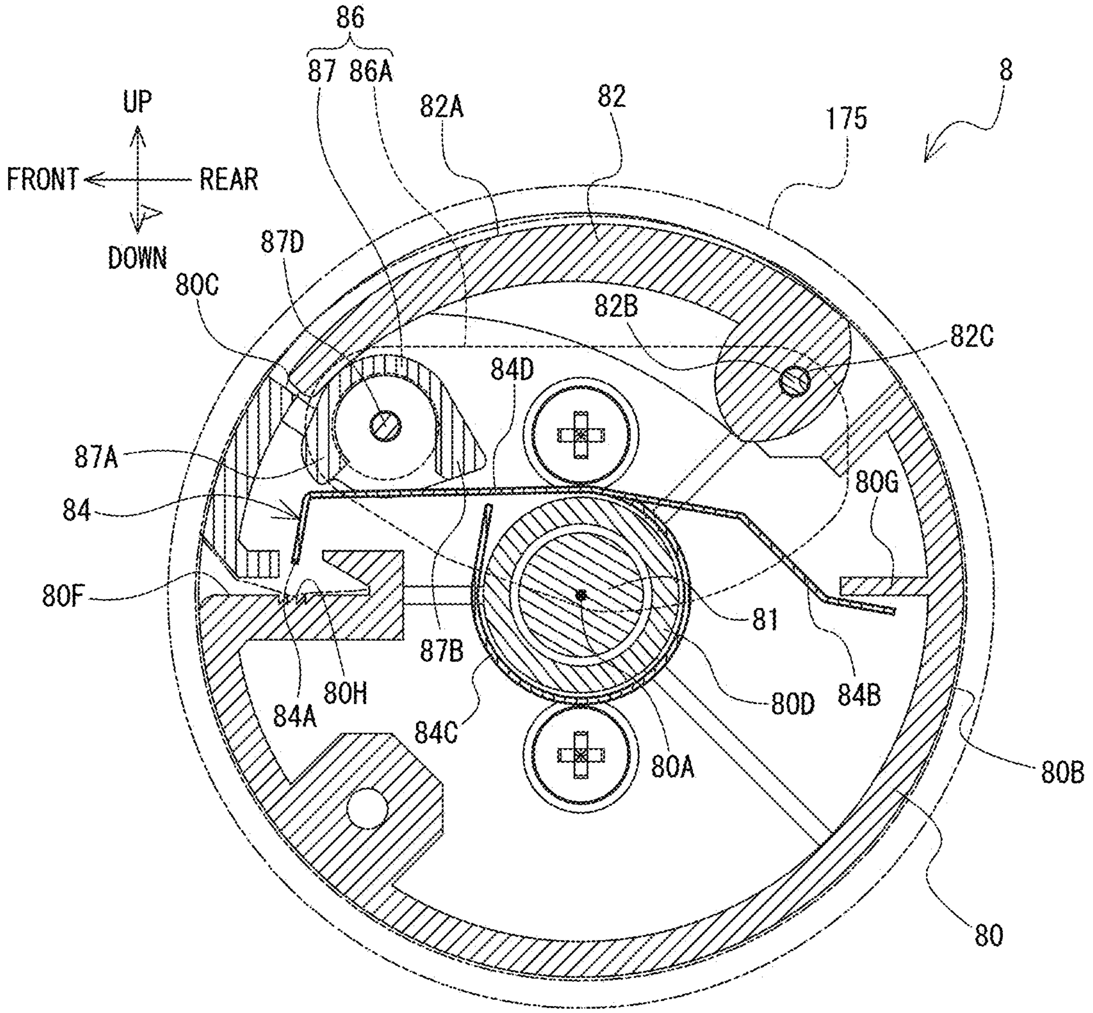
FIG. 27 is a cross-sectional view in the axial direction of the winding portion when the operation portion is at a second position.

The second wall 236 defines a transport path R3 of the release material 170 transported toward the winding portion 8. The second wall 236 includes a fourth surface 237 facing the transport path R3, a fifth surface 238, and a roller 239. The fourth surface 237 is positioned furthermost upstream in a transport direction Y3 of the release material 170 transported along the transport path R3, and faces diagonally upward to the front. The transport direction Y3 is a direction along which the tape 150 is transported on the transport path R3 along the fourth surface 237, and is a direction extending upward toward the rear. The fourth surface 237 is disposed at an entrance of the transport path R3 along which the release material 170, from which the label 160 has been peeled away at the peeling portion 4, is transported toward the winding portion 8 positioned diagonally above and to the rear of the main unit 2. The fourth surface 237 guides the release material 170 along the transport path R3 to the roller 239. The roller 239 is provided at a connection portion between the fourth surface 237 and the fifth surface 238. The roller 239 adjusts the transport direction of the release material 170 that has passed the roller 239, in accordance with changes in an outer diameter of a release material roll 175 (refer to FIG. 26) of the release material 170 taken up by and wound onto the winding portion 8, and suppresses breakage of the release material 170. The fifth surface 238 extends diagonally upward to the rear and faces upward at a more moderate angle than the fourth surface 237.

An angle θ1 formed between the transport direction Y1 and the transport direction Y2 is greater than 90 degrees, and less than 180 degrees. The tape 150 on which the image has been printed by the print mechanism 3 is transported on the transport path R1, toward the cutting portion 9, in a state in which the label 160 is positioned below the release material 170. The tape 150, on which the label 160 has been cut using the half-cut operation by the cutting portion 9 while leaving the release material 170 intact, is transported on that transport path R2 while being pulled as a result of being wound up by the winding portion 8 positioned higher than the peeling portion 4. Thus, in the transport path R2, the tape 150 comes into contact with the second surface 233 positioned lower than the first surface 232, without coming into contact with the first surface 232, and is guided in the transport direction Y1. The tape 150 is further guided in the transport direction Y2 toward the peeling portion 4 along the third surface 234. At a connection portion 235 between the second surface 233 and the third surface 234, the tape 150 is bent at an angle greater than 90 degrees and less than 180 degrees. The release material 170 of the tape 150 faces the connection portion 235, with respect to the adhesive surface Ur of the base material 140 of the label 160, and the front surface Us of the label 160 faces downward. Thus, when a cut section Ct that has been half cut by the half-cut cutting blade 92 passes the connection portion 235 between the second surface 233 and the third surface 234, the tape 150 is bent at the obtuse angle with the release material 170 being on the inner side, and the cut section Ct is spread apart. Thus, the end portion of the label 160 is easily peeled away from the release material 170.

As shown in FIG. 7 to FIG. 11, the left side plate 25 is a metal plate that extends in the up-down direction and the front-rear direction and is fixed to the left surface of the base body 20 using screws. When the main unit 2 is fixed to the base 11, the left side plate 25 is disposed at a position substantially at the center of the low floor portion 11A in the left-right direction. A circular-shaped open portion 25A, which penetrates the left side plate 25 in the left-right direction, is formed at the center of the left side plate 25. The open portion 25A is formed by cutting out part of a top end of the left side plate 25, such that a top end section of an inner periphery of the open portion 25A is cut out in the upward direction, and is communicated with an open section cut out of the left side plate 25. Of the upper end portion of the left side plate 25, the upper end portion on the rear of the open portion 25A extends further upward than the upper end portion on the front, and extends to be longer and further upward than the upper end portion on the rear of an open portion 26A of the right side plate 26. In a state in which the left side plate 25 is assembled to the base body 20, the circular-shaped section of the open portion 25A is disposed at a position corresponding to the housing portion 211 of the bottom portion 21.

The right side plate 26 is a metal plate extending in the up-down direction and the front-rear direction, and is fixed to the right surface of the base body 20 using screws. When the main unit 2 is fixed to the base 11, the right side plate 26 is disposed at a position toward the right end of the low floor portion 11A, and faces the left side plate 25 in the left-right direction. The right side plate 26 is substantially the same shape as the left side plate 25, and the circular-shaped open portion 26A, which penetrates the right side plate 26 in the left-right direction, is formed at the center of the right side plate 26. The open portion 26A is formed by cutting out part of a top end of the right side plate 26, such that a top end section of an inner periphery of the open portion 26A is cut out in the upward direction, and is communicated with an open section cut out of the right side plate 26. Of the upper end portion of the right side plate 26, the upper end portion on the rear of the open portion 26A extends further upward than the upper end portion on the front. In a state in which the right side plate 26 is assembled to the base body 20, the circular-shaped section of the open portion 26A is disposed at a position corresponding to the housing portion 211 of the bottom portion 21.

A left support portion 71 is fixed to the left surface of the left side plate 25 using screws. The left support portion 71 extends in the up-down direction and the front-rear direction and has a box shape having a thickness in the left-right direction. A stepped shape is formed at substantially the center thereof in the up-down direction, and the thickness of the lower section thereof is thicker than the thickness of the upper section thereof. A guide portion 71B that is recessed downward from the upper end is formed in the left support portion 71. The guide portion 71B is substantially U-shaped, and a bottom portion 71C has a semicircular shape. An open portion is formed in the bottom portion 71C and exposes an input portion 706B of a lever member 706 (to be described later). The bottom portion 71C of the guide portion 71B is a guide position that guides the cable 19 at the left of a wrapping position P3, in order to dispose the cable 19 at the wrapping position P3, which is a position at which the wrapping portion 7 wraps the label 160 around the cable 19. The guide portion 71B guides the cable 19 to the bottom portion 71C.

Of the upper end portion of the left support portion 71, a guide surface 71D that guides the cable 19 toward the guide portion 71B is formed at the upper end portion further to the front than the guide portion 71B. The guide surface 71D is an inclined surface facing diagonally upward to the rear. The guide surface 71D comes into contact with the cable 19 when a position of the cable 19, which has passed through a guide path R4 (to be described later) and through the pressing portion 5, has been displaced to the front, and guides the cable 19 to the guide portion 71B so that the cable 19 reaches the wrapping portion 7. At the right surface of the left support portion 71, a rotation shaft bearing portion 71A, which has a substantially C shape protruding to the right, is formed along the semicircular bottom portion 71C in a peripheral direction, except for at the guide portion 71B. In a state in which the left support portion 71 is assembled to the left side plate 25, the rotation shaft bearing portion 71A is disposed at the circular shaped portion of the open portion 25A of the left side plate 25, and protrudes further to the right than the left side plate 25. A rotation shaft portion 73C (to be described later) of the rotation body 70 of the wrapping portion 7 engages with the rotation shaft bearing portion 71A. The surface on the inside of the rotation shaft bearing portion 71A rotatably supports the rotation shaft portion 73C. The surface on the outside of the rotation bearing shaft portion 71A is supported by the circular-shaped section of the open portion 25A of the left side plate 25. Since a structure is obtained in which the rotation shaft portion 73C of the rotation body 70 is supported by both the left support portion 71 and the left side plate 25, even when the user presses the cable 19 strongly against the rotation body 70, the rotation body 70 is unlikely to become tilted or displaced.

A right support portion 72 is fixed to the right surface of the right side plate 26 using screws. The right support portion 72 extends in the up-down direction and the front-rear direction and has a box shape having a thickness in the left-right direction. A stepped shape is formed at substantially the center thereof in the up-down direction, and the thickness of the lower section thereof is thicker than the thickness of the upper section thereof. A guide portion 72B that is recessed downward from the upper end is formed in the right support portion 72. The guide portion 72B is substantially U-shaped, and a bottom portion 72C has a semicircular shape. An open portion is formed in the bottom portion 72C and exposes an input portion 707B of a lever member 707 (to be described later). The bottom portion 72C of the guide portion 72B is a guide position that guides the cable 19 at the right of the wrapping position P3. The guide portion 72B guides the cable 19 to the bottom portion 72C.

Of the upper end portion of the right support portion 72, a guide surface 72D that guides the cable 19 toward the guide portion 72B is formed at the upper end portion further to the front than the guide portion 72B. The guide surface 72D is an inclined surface facing diagonally upward to the rear. The guide surface 72D comes into contact with the cable 19 when the movement direction of the cable 19 is displaced to the front, and guides the cable 19 to the guide portion 72B. At the left surface of the right support portion 72, a rotation shaft bearing portion 72A, which has a substantially C shape protruding to the left, is formed along the semicircular bottom portion 72C in a peripheral direction, except for at the guide portion 72B. In a state in which the right support portion 72 is assembled to the right side plate 26, a rotation shaft bearing portion 72A is disposed at the circular shaped portion of the open portion 26A of the right side plate 26, and protrudes further to the left than the right side plate 26. A rotation shaft portion 74C (to be described later) of the rotation body 70 engages with the rotation shaft bearing portion 72A. The surface on the inside of the rotation shaft bearing portion 72A rotatably supports the rotation shaft portion 74C of the rotation body 70. The surface on the outside of the rotation shaft bearing portion 72A is supported by the circular-shaped section of the open portion 26A of the right side plate 26. Since a structure is obtained in which the rotation shaft portion 74C of the rotation body 70 is supported by both the right support portion 72 and the right side plate 26, even when the user presses the cable 19 strongly against the rotation body 70, the rotation body 70 is unlikely to become tilted or displaced.

Peeling Portion 4

The peeling portion 4 separates the label 160 from the release material 170. The peeling portion 4 includes a round rod-shaped peeling shaft 40 extending in the left-right direction. A fixing portion for fixing the peeling shaft 40 is formed at a connection section between the first wall 231 and the second wall 236. The peeling shaft 40 is disposed at a position furthermost downstream in the transport direction Y2 along the third surface 234, in the transport path R2, and at a position furthermost upstream in the transport direction Y3 along the fourth surface 237, in the transport path R3. The peeling shaft 40 is exposed at the guide surfaces 51 of the pressing portion 5 (refer to FIG. 8). A coating layer that inhibits the attachment of adhesive when peeling away the label 160 is formed on the surface of the peeling shaft 40.

As shown in FIG. 11, an angle θ2 formed between the transport direction Y2 and the transport direction Y3 is equal to or less than 90 degrees. The tape 150 transported on the transport path R2 reaches the peeling portion 4 in the state in which, at the connection portion 235, the label 160 is easily peeled away from the release material 170. The tape 150 is bent at the angle equal to or less than 90 degrees in a state in which, at the peeling portion 4, the release material 170 is in contact with the peeling shaft 40 as a result of the release material 170 being pulled by the winding portion 8. Thus, when the cut section Ct passes the peeling portion 4, due to the tape 150 being bent at the acute angle or at the right angle with the release material 170 on the inner side, the cut section Ct is spread apart even more than when passing the connection portion 235. As a result, the end portion of the label 160 is peeled away from the release material 170. When the release material 170 moves in the transport direction Y3, the end portion of the label 160 peeled away from the release material 170 moves in the transport direction Y2, passes over the support surface 62 of the opening/closing member 6, and is disposed at an affixing position P1 in a state in which the adhesive surface Ur faces upward. The affixing position P1 is a position at which the affixing of the end portion of the label 160 to the cable 19 is performed, and is a position furthermost upstream in a guide direction Y4 in which the cable 19 inserted into the guide path R4 of the pressing portion 5 is guided.

At the cut section Ct of the label 160 cut by the half-cut cutting blade 92, the adhesive adhered to the surface of the base material 140 on the side adhered to the print surface Ut of the film tape 110 is exposed at a cutting surface. Rollers for transporting the tape 150 are not disposed downstream, in the transport direction Y1, of the cutting portion 9 in the transport path R1, nor in the transport path R2. Thus, on a path from the cutting portion 9 to reaching the peeling portion 4, the tape 150 is not pinched at any nip point between rollers. Further, when the tape 150 passes the connection portion 235, the release material 170 faces the connection portion 235. Thus, the tape 150 is bent at a superior angle on the label 160 with respect to the release material 170, and is not bent at an inferior angle. The transport paths R1 and R2 have this type of configuration, and thus, on the path of the tape 150 from the cutting portion 9 to reaching the peeling portion 4, the re-attachment of the adhesive exposed at the cutting surface at the cut section Ct is suppressed.

Opening/Closing Member 6

As shown in FIG. 7 to FIG. 11, the opening/closing member 6 has a box shape extending in the up-down direction, and is disposed at the front of the base body 20. The opening/closing member 6 includes a shaft body 6A that penetrates the lower end portion of the opening/closing member 6 in the left-right direction, and protrudes in the left and right directions from each of a lower end portion left surface and lower end portion right surface (refer to FIG. 9). The shaft body 6A engages with shaft holes 25B and 26B respectively formed in the lower front corner portion of the left side plate 25 and the lower front corner portion of the right side plate 26, and rotatably supports the opening/closing member 6. The opening/closing member 6 includes a hook 6D that engages with the base body 20, in conjunction with an opening/closing button 6B at an upper front edge portion of the opening/closing member 6. The upper end portion of the opening/closing member 6 rotates to the front when the engagement of the hook 6D with the base body 20 is released by the depression of the opening/closing button 6B, and is in an open state. In the open state, of the main unit 2, the peeling region 224 of the pressing portion 5 and the housing portion 211 of the wrapping portion 7 are exposed at the front surface of the label affixing device 1 (refer to FIG. 8). In a closed state, of the main unit 2, the peeling region 224 and the housing portion 211 are covered by the opening/closing member 6 (refer to FIG. 7).

A pressing member 60 that protrudes to the rear and advances and retracts in the front-rear direction is provided at the rear surface of the opening/closing member 6 in the closed state. The pressing member 60 extends in the up-down direction. The lower end portion of the pressing member 60 is supported by the shaft body 6A, and the upper end portion of the pressing member 60 swings in the front-rear direction, as shown by dotted lines in FIG. 11. The pressing member 60 is urged to the rear by a compression coil spring 6C disposed inside the opening/closing member 6. The front surface of the pressing member 60 is a pressing surface 61. When the opening/closing member 6 is in the closed state, the pressing surface 61 extends in the up-down direction and the left-right direction and faces to the rear. In this state, the pressing surface 61 is disposed to the front of an open portion of the peeling region 224 of the pressing portion 5, and, in a side view, there is a gap between the pressing surface 61 and the guide surfaces 51 in the front-rear direction. The guide surfaces 51 are disposed at positions offset with respect to the pressing surface 61 in the left-right direction, and do not face the pressing surface 61 in the front-rear direction. Further, the size of the pressing surface 61 in the left-right direction is greater than the maximum width of the tape 150 corresponding to the label affixing device 1.

Using an urging force, the pressing surface 61 presses the end portion of the label 160 against the cable 19 passing in the guide direction Y4 along the guide path R4 between the guide surfaces 51 and the pressing surface 61. The pressing surface 61 extends to be longer than the guide surfaces 51 in the guide direction Y4, so that the pressing of the end portion of the label 160 by the pressing surface 61 is maintained until the label 160 is peeled away from the release material 170. When a position P2 is a furthermost downstream position in the guide direction Y4 of the pressing surface 61 in the guide path R4, a virtual line joining the position P2 and the connection portion 235 is a virtual line L. The pressing surface 61 extends to the position P2 at which an angle θ3 formed between the transport direction Y2 and the virtual line L is in a range from 40 degrees to 90 degrees. By causing the angle θ3 to be equal to or greater than 40 degrees, it is possible to increase an angle between the label 160 and a backing sheet when peeling the label 160, and to lower a load necessary for the peeling away. In particular, when the angle θ3 is 90 degrees, a load pulling in the transport direction Y2 does not act on the release material 170. Since it is possible to reduce a force by which the label 160 pulls the release material 170 when peeling away the label 160, a situation in which the pre-printing tape 150 is erroneously pulled out from the tape cassette 100 is avoided. As a result, the print mechanism 3 can suppress distortion occurring in the tape 150 when printing. Further, the pressing surface 61 extends from the affixing position P1 to the position P2, and can thus maintain the state of pressing the end portion of the label 160 against the cable 19 until the label 160 is peeled away from the release material 170.

The pressing member 60 further includes a support surface 62 and an inclined surface 63. The support surface 62 is connected to the upper end of the pressing surface 61 and faces diagonally upward to the rear in the closed state. When the user disposes the cable 19 at the affixing position P1, the support surface 62 guides the position thereof in the front-rear direction. Further, since the end portion of the label 160 peeled away from the release material 170 is in a lifted state, when the user affixes the end portion of the label 160 to the cable 19, the end portion is clamped between the support surface 62 and the cable 19 and is adhered to the cable 19. Furthermore, when the outer diameter of the cable 19 is larger than the gap between the pressing surface 61 and the guide surfaces 51, as a result of the cable 19 coming into contact with the support surface 62 that is inclined to the front, a force is imparted to the support surface 62 for moving the upper end portion of the pressing member 60 toward the front, and the support surface 62 can thus widen the gap.

The inclined surface 63 is connected to the lower end of the pressing surface 61 and faces diagonally downward to the rear in the closed state. When the cable 19 around which the label 160 has been wrapped by the wrapping portion 7 is moved upward and removed from the label affixing device 1, the inclined surface 63 guides the cable 19 to the gap between the pressing surface 61 and the guide surfaces 51. Further, when the outer diameter of the cable 19 is larger than the gap between the pressing surface 61 and the guide surfaces 51, as a result of the cable 19 coming into contact with the inclined surface 63 that is inclined to the front, a force is imparted to the inclined surface 63 for moving the upper end portion of the pressing member 60 toward the front, and the inclined surface 63 can thus widen the gap.

Pressing Portion 5

Figure 12:
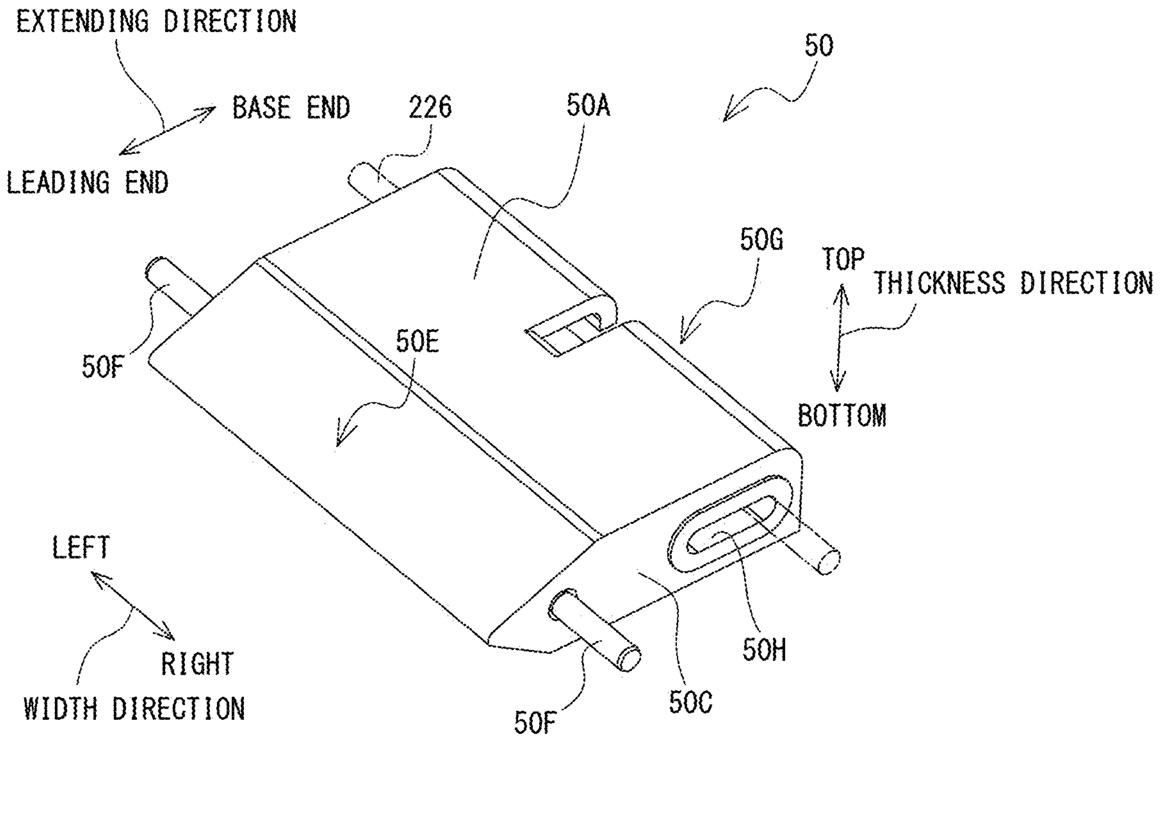
FIG. 12 is a perspective view of a moving member as seen in a top view.
Figure 13:
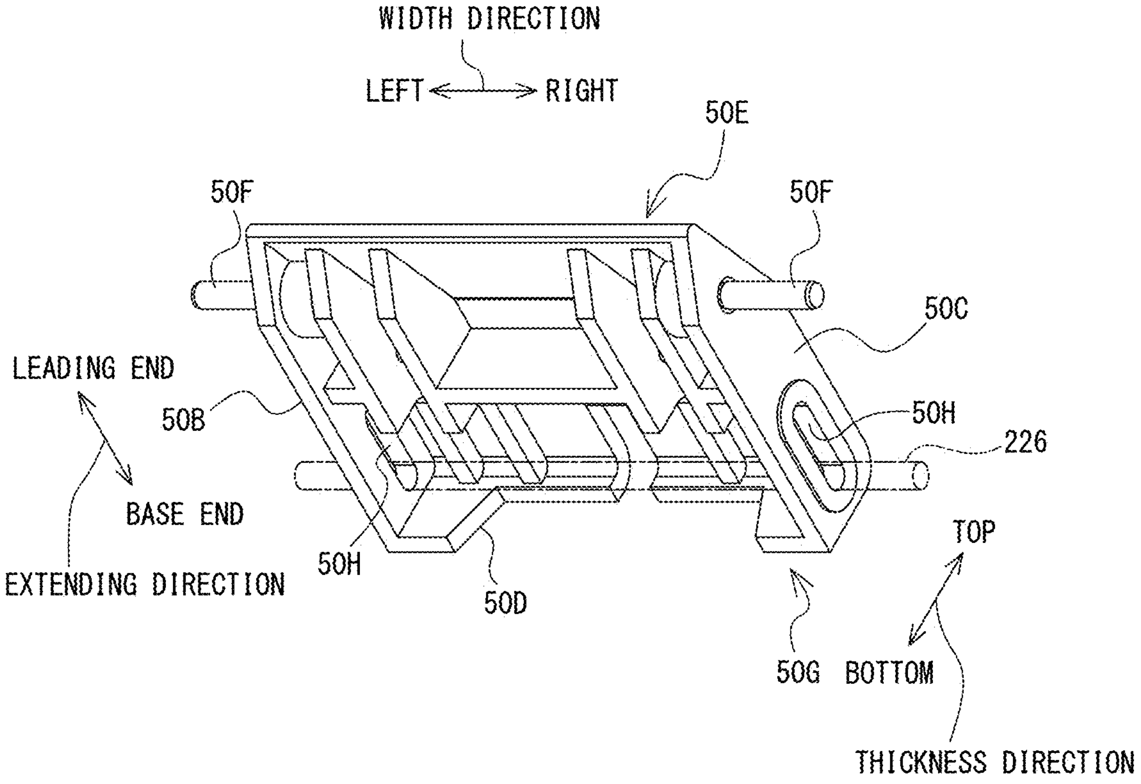
FIG. 13 is a perspective view of the moving member as seen in a bottom view.
Figure 14:
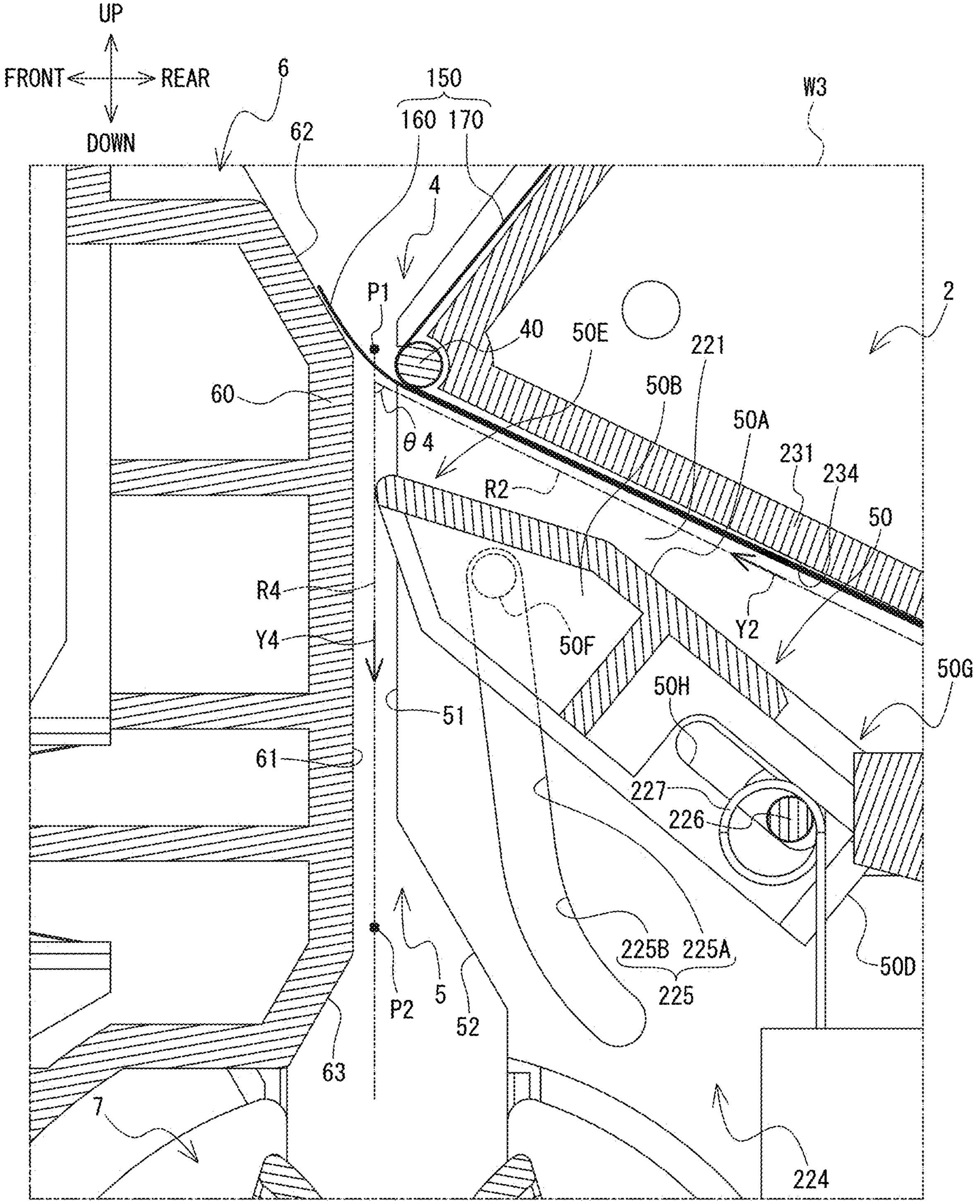
FIG. 14 is an expanded view of a section indicated by a two-dot chain line shown in FIG. 11.

In the course of guiding, to the wrapping portion 7, the cable 19 to which the end portion of the label 160 has been affixed at the affixing position P1, the pressing portion 5 is a portion that presses the end portion of the label 160 against the cable 19 so that the end portion of the label 160 does not peel away. The pressing portion 5 is configured by the pressing member 60 of the opening/closing member 6, the middle portion 22 of the base body 20, and the moving member 50. The moving member 50 is disposed in the peeling region 224 of the middle portion 22. The peeling region 224 is a region surrounded by the left wall 221, the right wall 222, the connecting wall 223, and the first wall 231. As shown in FIG. 12 to FIG. 14, the moving member 50 has a box shape extending in a width direction and an extending direction and having a thickness. A top wall 50A is formed having a flat top surface, and a left wall 50B, a right wall 50C, and a base portion wall 50D respectively extend toward the bottom from edge portions at the left, the right and a base of the top wall 50A. A bottom surface is open, and the top wall 50A is reinforced by ribs. A center section in the width direction of the base portion wall 50D is cut out. A thickness of a distal portion 50E decreases the further toward the distal end.

Pins 50F that protrude in the width direction are provided in the vicinity of the distal portion 50E of the left wall 50B and of the right wall 50C. The pins 50F engage with guide holes 225 respectively formed in the left wall 221 and the right wall 222 of the peeling region 224. In a side view, each of the guide holes 225 includes a first guide hole 225A extending in a straight line in the up-down direction and a second guide hole 225B connected to the lower end of the first guide hole 225A and extending in an arc shape. On the vicinity of a base portion 50G, the left wall 50B and the right wall 50C include guide holes 50H through which a shaft body 226 extending in the width direction is inserted. The guide hole 50H is a long hole extending in the extending direction. The shaft body 226 is supported by the left wall 221 and the right wall 222 of the peeling region 224. A torsion spring 227 is assembled to the shaft body 226. The torsion spring 227 urges the moving member 50 such that the distal portion 50E is positioned higher than the base portion 50G.

The guide surfaces 51 are disposed at both the left and right sides of the peeling region 224 and guide the cable 19 to which the label 160 has been affixed at the affixing position P1 to the wrapping portion 7. The user grips the cable 19 extending in the left-right direction with both hands and brings the cable 19 into contact with the guide surfaces 51. The user moves the cable 19 downward along the guide surfaces 51 toward the wrapping portion 7 positioned below the affixing position P1. The cable 19 passes along the guide path R4 between the guide surfaces 51 and the pressing surface 61 in the guide direction Y4 and reaches the wrapping portion 7. The guide direction Y4 is the direction in which the cable 19 moves along the guide surfaces 51 extending in the up-down direction, and is the downward direction in the vertical direction.

Figure 15:
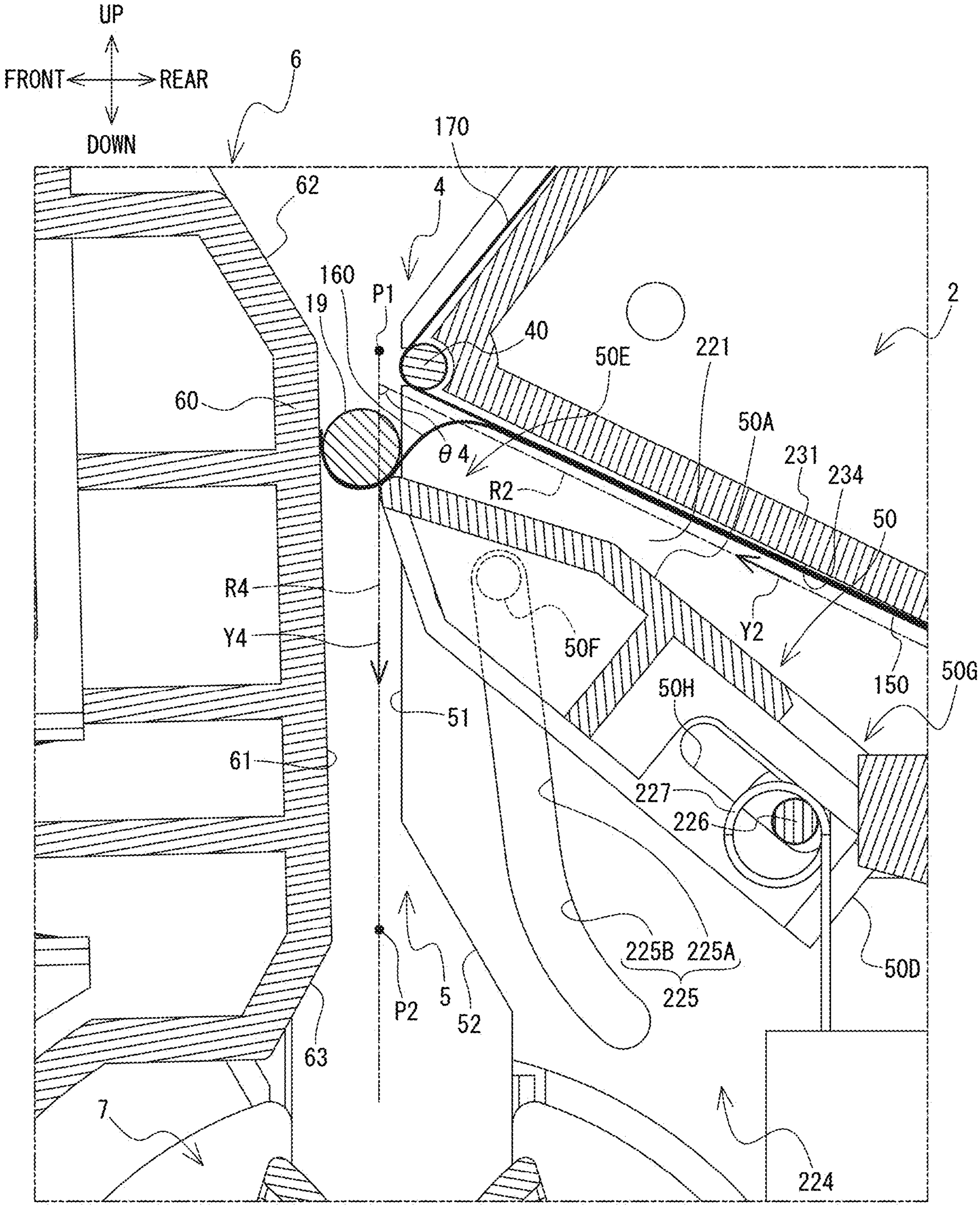
FIG. 15 is an enlarged view of a pressing portion when a cable has entered into a guide path.

As shown in FIG. 15, when the cable 19 moves in the guide direction Y4, the transport of the tape 150 in the transport path R2 is stopped. The tape 150 is held in a state of being pinched between the transport roller 34 and the drive roller 101, and even when a force is applied in a direction to pull the tape 150 from the print mechanism 3, the tape 150 is suppressed from being pulled out. The transport path R2 is exposed at the peeling region 224. Thus, the label 160 whose end portion is affixed to the cable 19 is peeled away from the release material 170 inside the peeling region 224, in accordance with the movement of the cable 19 in the guide direction Y4. An angle θ4 formed between the transport direction Y2 of the tape 150 in the transport path R2 and the vertical downward direction that is the direction in which the guide surfaces 51 extend is equal to or less than 90 degrees. The angle θ4 is set such that the label 160 is smoothly peeled away from the release material 170 by the movement of the cable 19 to which the end portion of the label 160 is affixed. When the angle θ4 is an obtuse angle greater than 90 degrees, the force necessary for peeling the label 160 away from the release material 170 increases. When the pulling and peeling away of the label 160 is performed in this state, the tape 150 stopped on the transport path R2 is pulled along with the label 160 and it is difficult to cleanly peel away the label 160. Inclination angles of the third wall 234 of the first wall 231 is set such that the angle θ4 is equal to or less than 90 degrees.

The moving member 50 is urged by the torsion spring 227. In a state in which a load is not acting thereon, the distal portion 50E protrudes inside the guide path R4 below the affixing position P1 and is positioned further to the front than the guide surfaces 51 in a side view. When the cable 19 to which the end portion of the label 160 is affixed moves from the affixing position P1 along the guide path R4 in the guide direction Y4, the distal portion 50E of the moving member 50 clamps the end portion of the label 160 from downstream in the guide direction Y4 between the distal portion 50E and the cable 19, and comes into contact with the cable 19. Due to the urging of the compression coil spring 6C, the pressing surface 61 of the pressing member 60 maintains the state of pressing the end portion of the label 160 against the cable 19.

Figure 16:
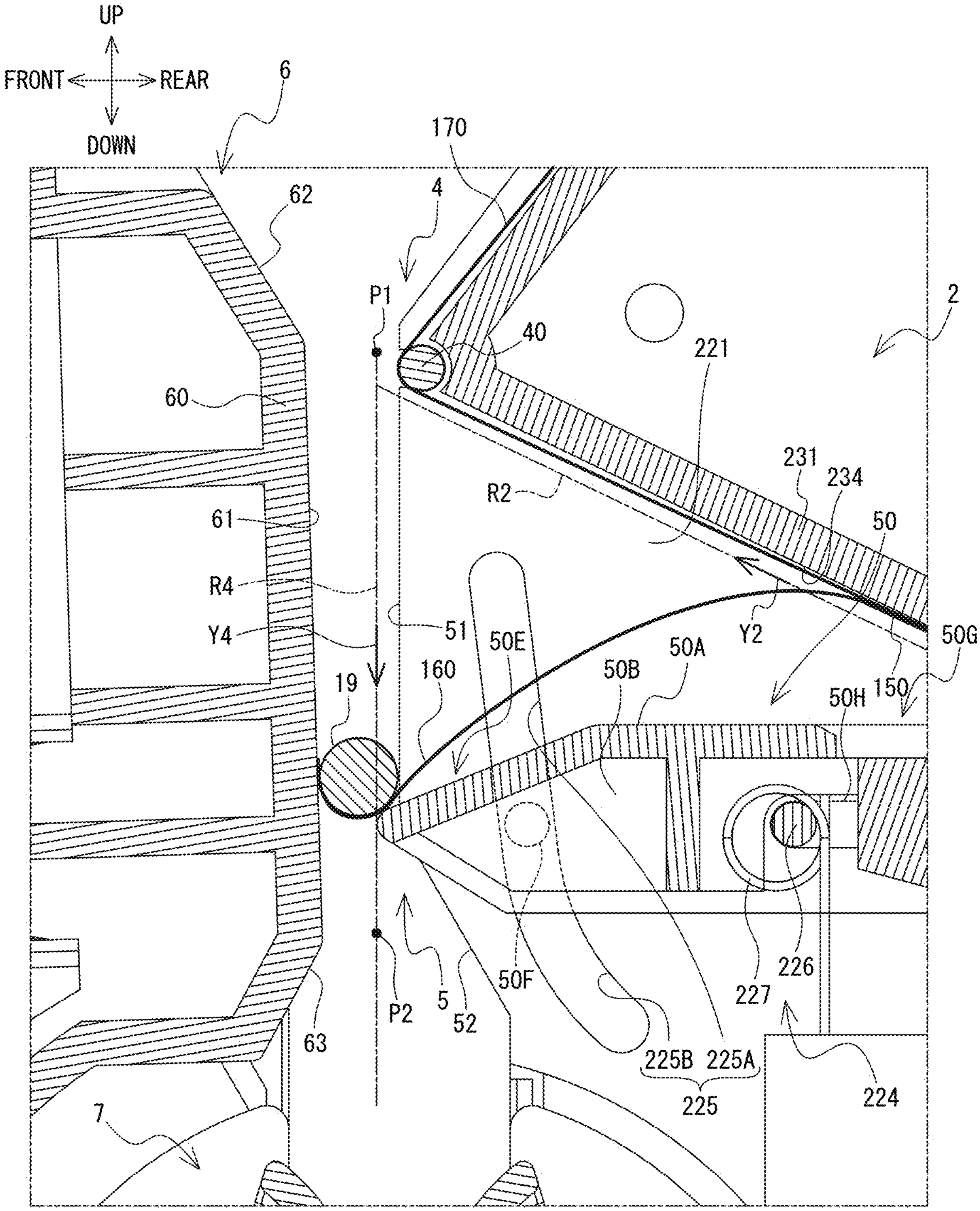
FIG. 16 is an enlarged view of the pressing portion when the cable has reached a furthermost downstream position at a guide surface.

As shown in FIG. 16, when the cable 19 moves in the guide direction Y4, due to the pressing of the cable 19, the distal portion 50E of the moving member 50 rotates downward around the shaft body 226 supporting the base portion 50G. As a result of the guide holes 50H moving with respect to the shaft body 226, the moving member 50 can displace a position of the fulcrum of the rotation. Then, since the pins 50F move along the straight line-shaped first guide holes 225A of the guide holes 225, the distal portion 50E of the moving member 50 maintains the state of protruding inside the guide path R4. Thus, the distal portion 50E maintains the state in which the end portion of the label 160 is clamped between the distal portion 50E, from downstream in the guide direction Y4, and the cable 19, and the label 160 is pulled and peeled away from the release material 170 together with the cable 19.

Figure 17:
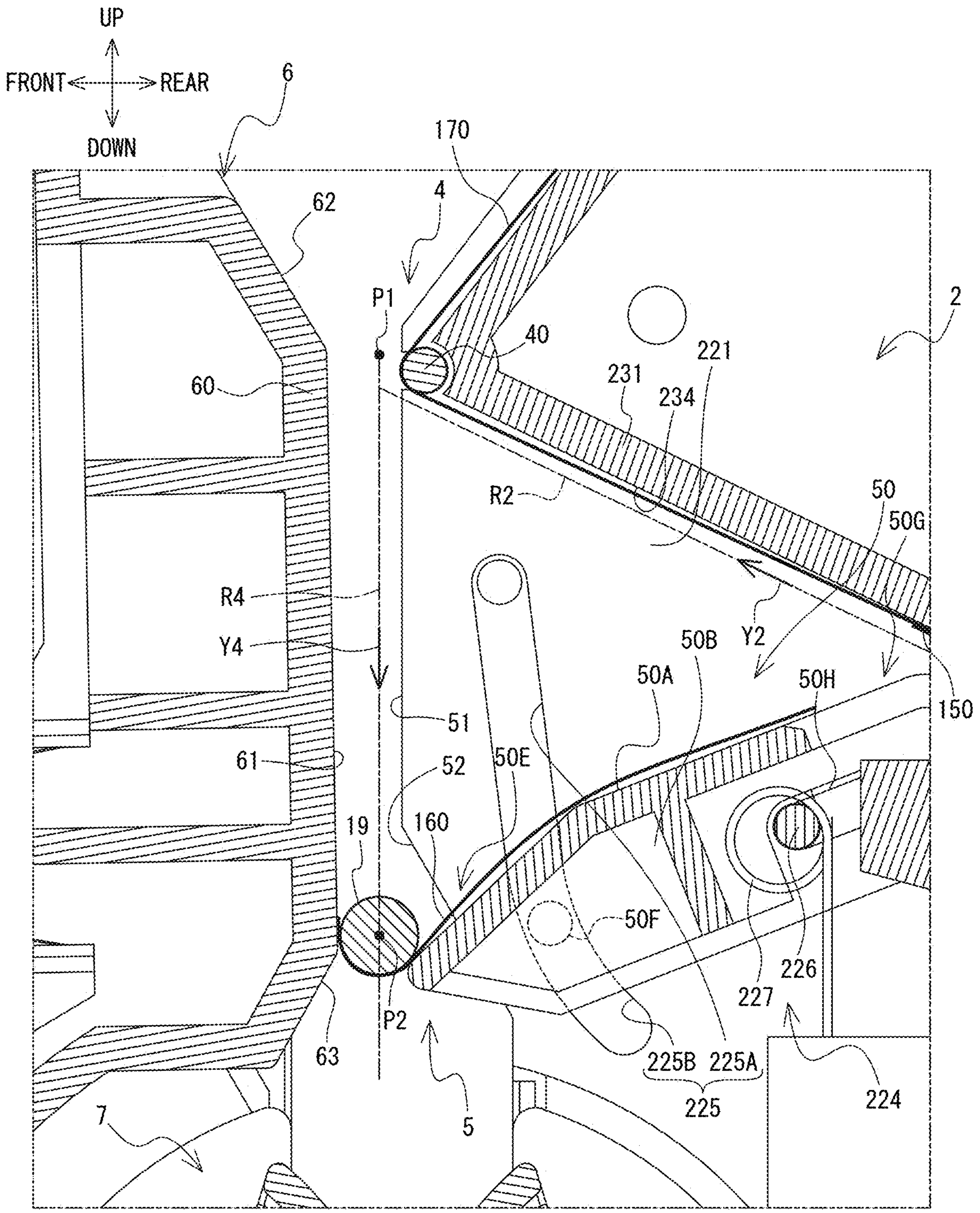
FIG. 17 is an enlarged view of the pressing portion when the cable has reached a position.

As shown in FIG. 17, the guide surfaces 51 are shorter than the pressing surface 61 in the up-down direction. When the distal portion 50E of the moving member 50 moves further downward than a furthermost downstream position of the guide surfaces 51 in the guide direction Y4, the pins 50F move along the arc-shaped second guide holes 225B of the guide holes 225. The second guide holes 225B are curved in a direction separating from the guide path R4 toward the rear. Thus, the distal portion 50E gradually retracts from the guide path R4 in accordance with the movement of the cable 19 in the guide direction Y4. When the cable 19 moves further in the guide direction Y4 and reaches the furthermost downstream position P2 of the pressing surface 61 in the guide path R4, the pressing of the end portion of the label 160 by the pressing surface 61 ends.

Figure 18:
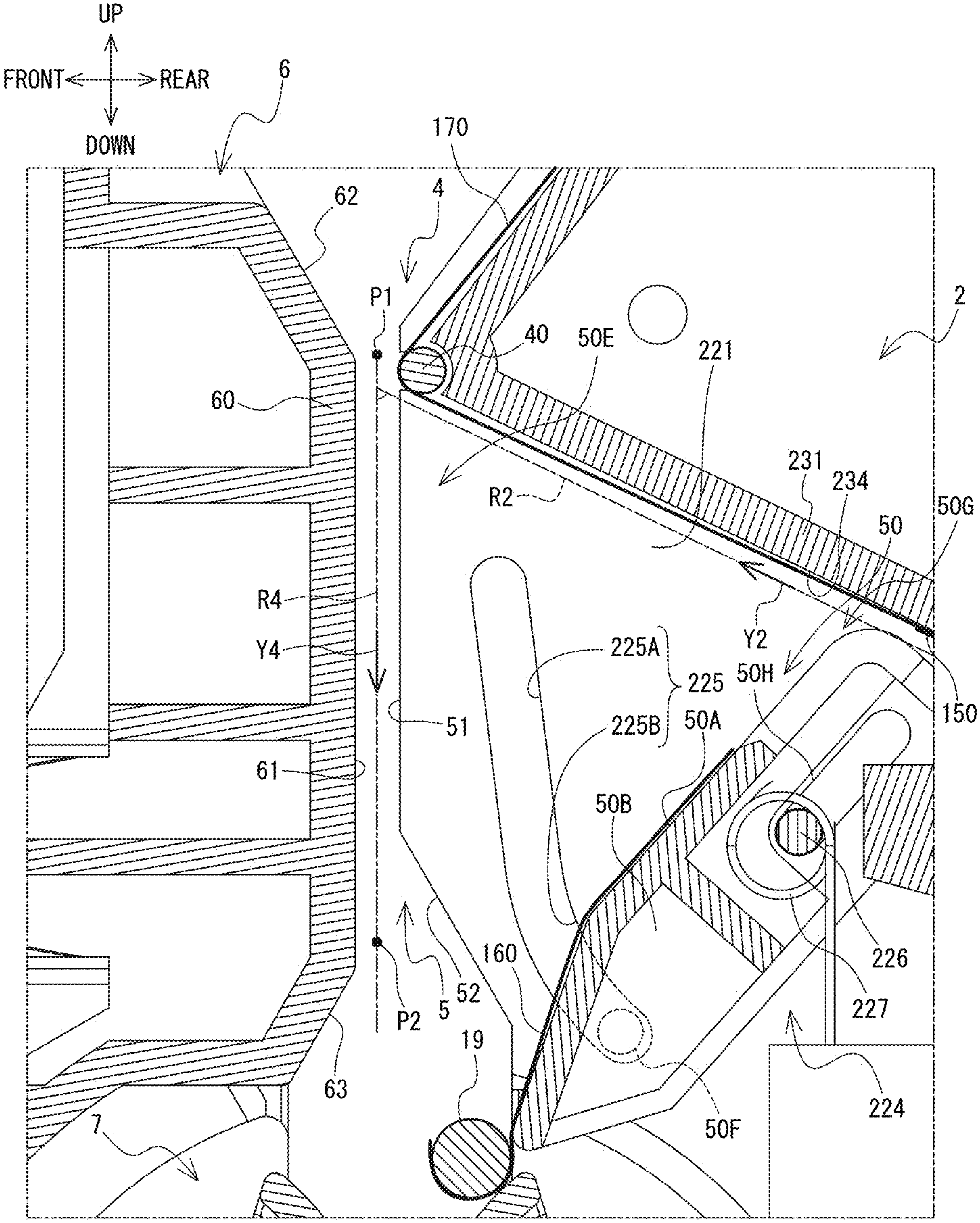
FIG. 18 is an enlarged view of the pressing portion when the cable has moved along an inclined surface.

As shown in FIG. 18, the middle portion 22 of the base body 20 includes inclined surfaces 52 below the guide surfaces 51. The inclined surfaces 52 are connected to the lower ends of the guide surfaces 51 and face diagonally downward to the front. When the cable 19 around which the label 160 has been wrapped by the wrapping portion 7 is moved upward and is removed from the label affixing device 1, the inclined surfaces 52 guide the cable 19 into the gap between the pressing surface 61 and the guide surfaces 51. When affixing the label 160, since the user presses the cable 19 against the guide surfaces 51, and moves the cable 19 along the guide surfaces 51, the cable 19 sometimes moves along the inclined surfaces 52 from the lower ends of the guide surfaces 51. When the pins 50F move along the second guide holes 225B, the moving member 50 retracts further to the rear than the inclined surfaces 52. Thus, the moving member 50 does not obstruct the movement of the cable 19.

The label affixing device 1 cuts the tape 150 using the half-cut cutting blade 92 to a length corresponding to a thickness and application of the cable 19, and thus generates the label 160. When the position P2, which is the position at which the pressing surface 61 ends the pressing of the end portion of the label 160, is a peeling completion position, the length of the label 160 is preferably a length at which the peeling away from the release material 170 is complete at the peeling completion position. That is to say, when the cable 19 has reached the position P2, the label 160 is sufficiently strongly affixed to the cable 19 as a result of the pressing of the end portion by the pressing surface 61 and the clamping of the end portion by the moving member 50. Thus, even when the label 160 does not have the length at which the peeling away from the release material 170 is complete even when the cable 19 has reached the position P2, the label affixing device 1 can sufficiently perform the peeling away of the label 160 at a position further downstream in the guide direction Y4 than the position P2 simply using the adhesive force to the cable 19.

Wrapping Portion 7

The wrapping portion 7 wraps the label 160, whose end portion is adhered to the cable 19 disposed at the wrapping position P3, around the cable 19 and thus affixes the label 160 to the cable 19. As shown in FIG. 6, FIG. 7, and FIG. 19 to FIG. 21, the wrapping portion 7 includes the substantially cylindrical rotation body 70 having a side surface that is partially cut away. A rotational axis center 70A that is a center of rotation of the rotation body 70 extends in the left-right direction, and the rotation body 70 is rotatably supported by the left support portion 71 fixed to the left surface of the left side plate 25 and the right support portion 72 fixed to the right surface of the right side plate 26, respectively. The rotation body 70 includes a left side surface portion 73, a right side surface portion 74, and a peripheral surface portion 75. The left side surface portion 73 and the right side surface portion 74 are circular plates, and are separated facing each other in the left-right direction.

An external gear 73A is provided on the left surface of the left side surface portion 73. The external gear 73A is connected to the drive mechanism 705 provided at the bottom portion 21 of the main unit 2, and the driving force generated by the motor MT1 is transmitted and input from the external gear 73A. An insertion portion 73B that is recessed from a peripheral end portion toward the rotational axis center 70A is formed in the left side surface portion 73. The insertion portion 73B is substantially U-shaped and extends in a radial direction from a semicircular bottom portion 731 centered on the rotational axis center 70A to an open portion 732 that corresponds to a part of the peripheral end portion of the left side surface portion 73. The left side surface portion 73 includes the substantially C-shaped rotation shaft portion 73C that protrudes to the left along a peripheral direction excluding the insertion portion 73B, further to the inner side than the external gear 73A in the radial direction of the rotational axis center 70A. The rotation shaft portion 73C engages with the rotation shaft bearing portion 71A formed at the right surface of the left support portion 71 and is rotatably supported.

A detection plate 74A is provided at a peripheral edge portion of the right surface of the right side surface portion 74. The detection plate 74A is disposed at a position that is detected by a sensor SW3 (refer to FIG. 9), which is a transmitting type photo-sensor, when the rotation body 70 is at a home position. The rotation body 70 can be stopped at the home position, by performing control to stop the rotation of the rotation body 70 when the sensor SW3 detects the detection plate 74A. Here, the home position of the rotation body 70 is a position at which the cable 19 and the label 160 can be inserted into the insertion portion 73B and an insertion portion 74B, in a state in which the open portion 732 and an open portion 742 are disposed at the upper end portions of the bottom portion 731 and a bottom portion 741 (to be described later). The sensor SW3 is provided at a position diagonally above and to the rear of the housing portion 211 in the bottom portion 21 of the base body 20. The sensor SW3 is disposed further to the rear than the position of the rotation body 70 disposed in the housing portion 211, namely, at a position on the back of the housing portion 211 when the opening/closing member 6 is open and the housing portion 211 is seen from the front. The insertion portion 74B that is recessed from a peripheral end portion toward the rotational axis center 70A is formed in the right side surface portion 74. The insertion portion 74B is substantially U-shaped and extends in the radial direction from the semicircular bottom portion 741 centered on the rotational axis center 70A to the open portion 742 that corresponds to a part of the peripheral end portion of the right side surface portion 74. The right side surface portion 74 includes the substantially C-shaped rotation shaft portion 74C that protrudes to the right along a peripheral direction excluding the insertion portion 74B, further to the inner side than a peripheral end portion in the radial direction of the rotational axis center 70A. The rotation shaft portion 74C engages with the rotation shaft bearing portion 72A formed at the left surface of the right support portion 72 and is rotatably supported.

The peripheral surface portion 75 is a semicircular cylindrical shape extending in the left-right direction, and is provided between the left side surface portion 73 and the right side surface portion 74. In a side view, the peripheral surface portion 75 is substantially U-shaped, and both ends thereof are connected to the left side surface portion 73 and the right side surface portion 74, respectively. An open section of the peripheral surface portion 75 and open sections of the insertion portions 73B and 74B are disposed to face in the same direction in the radial direction of the rotational axis center 70A. The peripheral surface portion 75 internally houses and swingably supports arm members 76 and 77.

When the rotation body 70 is in a state in which the open portions 732 and 742 are disposed at the upper end portions of the bottom portions 731 and 741, the cable 19 and the label 160 can be inserted into the insertion portions 73B and 74B. A rotation position of the rotation body 70 in this state is the home position. In the following description, as long as there is no particular limitation, the state is assumed in which the rotation body 70 is disposed at the home position. The insertion portions 73B and 74B are disposed below the affixing position P1 in the vertical direction, and further downstream than the position P2 of the guide path R4 in the guide direction Y4. The open portions 732 and 742 of the insertion portions 73B and 74B are open toward the front surface Us of the end portion of the label 160 disposed at the affixing position P1.

The wrapping portion 7 includes the arm members 76 and 77, coil springs 78 and 79, and a support shaft 702 inside the rotation body 70. The arm members 76 and 77 clamp and hold the cable 19 when the label 160 is wrapped around the cable 19 by the wrapping portion 7. The arm member 76 and the arm member 77 are metal members having the same shape as each other. The arm members 76 and 77 respectively include clamp portions 76A and 77A, receiving portions 76B and 77B, shaft bearing portions 76C and 77C, spacers 76D and 77D, and retainers 76E and 77E. The clamp portions 76A and 77A have a flat plate shape extending in the left-right direction and the up-down direction and are disposed facing each other with a gap therebetween in the front-rear direction. The spacers 76D and 77D are respectively provided at the clamp portions 76A and 77A, at positions closer to the shaft bearing portions 76C and 77C than to the rotational axis center 70A, and are in contact with each other, thus securing the gap between the clamp portions 76A and 77A.

The shaft bearing portions 76C and 77C are formed at end portions of the clamp portions 76A and 77A where the spacers 76D and 77D are provided. The single support shaft 702 is inserted into the shaft bearing portions 76C and 77C. Thus, the arm members 76 and 77 swing around the shared support shaft 702. Both ends of the support shaft 702 are supported, at the left side surface portion 73 and the right side surface portion 74 of the rotation body 70, at positions further to the outer side in the radial direction of the rotational axis center 70A than the bottom portions 731 and 741 of the insertion portions 73B and 74B. Thus, of the arm members 76 and 77, the end portions opposite to the support shaft 702 swing so as to approach each other and separate from each other. Protrusions 76F and 77F (refer to FIG. 21) that extend to the direction opposite to the clamp portions 76A and 77A are formed on the shaft bearing portions 76C and 77C. The protrusions 76F and 77F are disposed inside the open portion 75A (refer to FIG. 19) formed at a bottom section of the peripheral surface portion 75 of the rotation body 70. When the arm members 76 and 77 swing around the support shaft 702 and a swinging range thereof reaches a predetermined range, the protrusions 76F and 77F come into contact with edges of the open portion 75A. In other words, the open portion 75A defines the swinging range of the arm members 76 and 77. The swinging range is a range (refer to dotted lines in FIG. 19) over which distal ends 76G and 77G of the arm members 76 and 77 do not move beyond an external periphery of the left side surface portion 73 and the right side surface portion 74, namely, do not move beyond an external periphery of the rotation body 70.

The receiving portions 76B and 77B are formed at the end portions of the arm members 76 and 77 opposite to the support shaft 702, and are respectively connected to the clamp portions 76A and 77A. The receiving portions 76B and 77B are curved so as to separate from each other in the front-rear direction. In other words, in a side view, the size of the gap between the receiving portions 76B and 77B becomes gradually narrower toward the inner side in the radial direction of the rotational axis center 70A. Surfaces of the clamp portion 76A and the receiving portion 76B facing the rotational axis center 70A form a smoothly connected surface, and a coating layer is formed on the surface that suppresses attachment of the adhesive. In a similar manner, surfaces of the clamp portion 77A and the receiving portion 77B facing the rotational axis center 70A form a smoothly connected surface, and a coating layer is formed on the surface that suppresses the attachment of the adhesive. The receiving portions 76B and 77B guide the cable 19 moving from the pressing portion 5 to the wrapping portion 7 toward the rotational axis center 70A in the front-rear direction, using the curved surfaces, and guide the cable 19 into the gap between the clamp portions 76A and 77A.

The retainers 76E and 77E are formed at surfaces on opposite to the mutually facing surfaces of the clamp portions 76A and 77A, and hold first ends of the coil springs 78 and 79. Second ends of the coil springs 78 and 79 are held at the inner surface of the peripheral surface portion 75 of the rotation body 70. The arm members 76 and 77 are respectively urged to the rotational axis center 70A by the coil springs 78 and 79. The clamp portions 76A and 77A clamp and hold the cable 19 inserted into the gap therebetween.

The wrapping portion 7 further includes the lever members 706 and 707, and sensors SW1 and SW2. The sensors SW1 and SW2 are microswitches, and detect the cable 19 at each of guide positions at the left support portion 71 and the right support portion 72, namely, when the cable 19 has reached the bottom portions 71C and 72C. When sections of the cable 19 corresponding to the guide portions 71B and 72B are positioned at the guide positions, the section of the cable 19 corresponding to the rotation body 70 is positioned at the wrapping position P3. The wrapping position P3 is a position of the rotational axis center 70A at the bottom portions 731 and 741 of the insertion portions 73B and 74B, or a position in the vicinity thereof. The bottom portions 731 and 741 are semicircular curved surfaces centered on the rotational axis center 70A that is the center of rotation of the rotation body 70. A radius of curvature of the bottom portions 731 and 741 has a size corresponding to the cable 19 having a maximum outer diameter, among outer diameters of the cables 19 around which the label affixing device 1 can wrap the label 160. Thus, when the cable 19 having the outer diameter that is not the maximum diameter comes into contact with the bottom portions 731 and 741, a position of a center line of the cable 19 is not aligned with the rotational axis center 70A. The wrapping portion 7 can perform the wrapping of the label 160 even when the position of the center line of the cable 19 is displaced from the position of the rotational axis center 70A of the rotation body 70. Thus, when the cable 19 is positioned at the guide position, the wrapping position P3 is a position at which the section of the cable 19 corresponding to the rotation body 70 is disposed.

Thus, the wrapping position P3 is not necessarily aligned with the rotational axis center 70A.

Figure 22:
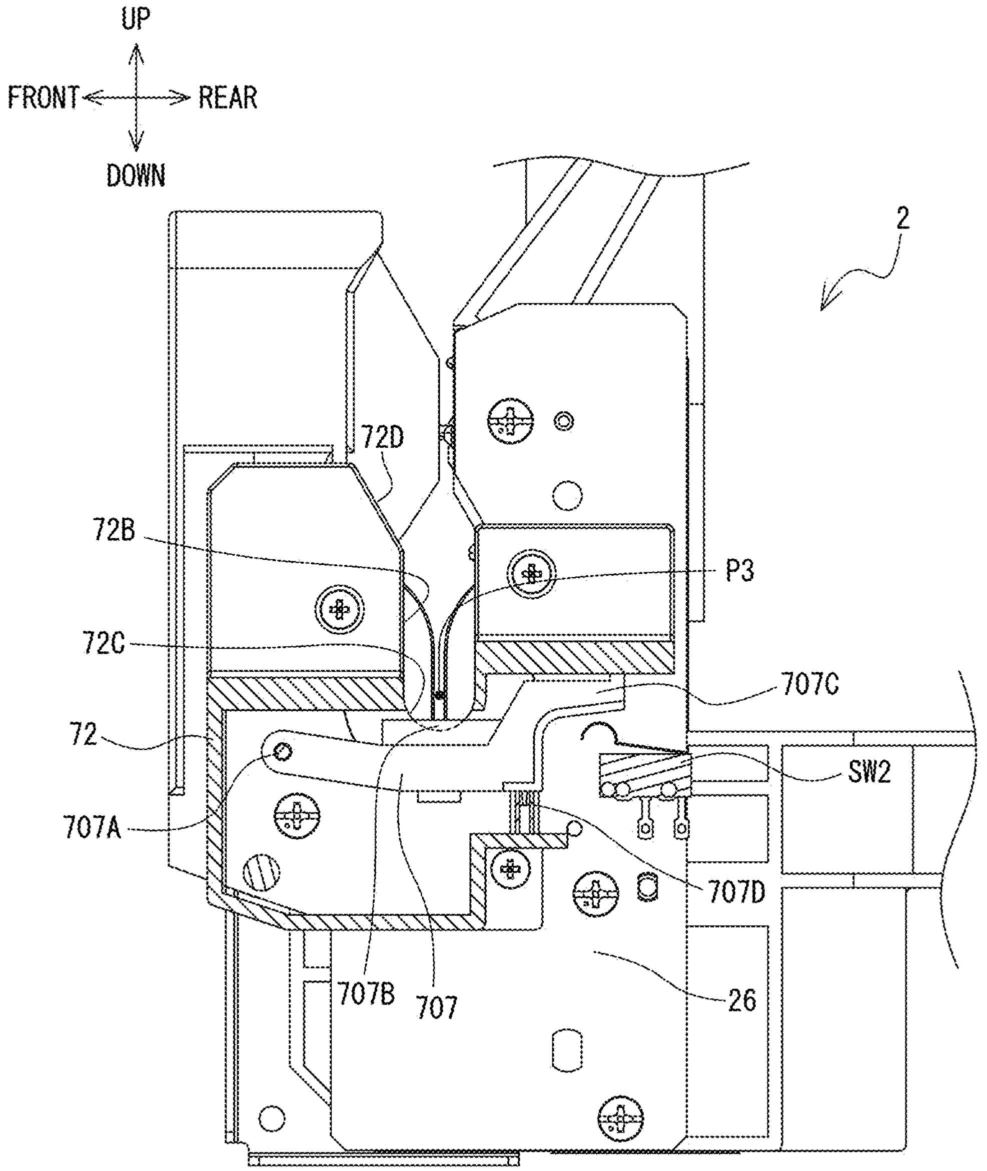
FIG. 22 is a right side cross-sectional view of the main unit cut along a line III-III shown in FIG. 7.

As shown in FIG. 22, the lever member 707 has a plate shape extending while curving in a stepped manner in the front-rear direction, and includes a support portion 707A, the input portion 707B, and an action portion 707C. The support portion 707A is a fulcrum rotatably supporting the lever member 707 and is provided at the front end portion of the lever member 707. The lever member 707 is assembled to the left surface of the right support portion 72. A shaft body that engages with the support portion 707A protrudes from the left surface of the right support portion 72. The rear end of the lever member 707 is urged upward by a coil spring 707D. The input portion 707B is formed at the upper surface of a center portion of the lever member 707 and protrudes upward. A part of the input portion 707B is exposed to the bottom portion 72C via the open portion formed in the bottom portion 72C of the guide portion 72B of the right support portion 72. The input portion 707B swings the lever member 707 as a result of being pressed by the cable 19 guided to the bottom portion 72C. The action portion 707C is provided at the rear end of the lever member 707. The action portion 707C is positioned to the rear of and higher than the input portion 707B and the support portion 707A, in the state in which the input portion 707B is exposed to the bottom portion 72C. The sensor SW2 is disposed below the action portion 707C and is fixed to the right surface of the right side plate 26. The sensor SW2 is a switch for driving a drive portion that rotates the rotation body 70. The action portion 707C is positioned higher than the input portion 707B, and thus, even if foreign material, such as water, attaches to the input portion 707B via the open portion of the bottom portion 72C, the foreign material is not likely to reach the action portion 707C. Thus, attachment of foreign material to the sensor SW2 is suppressed.

Figure 10:
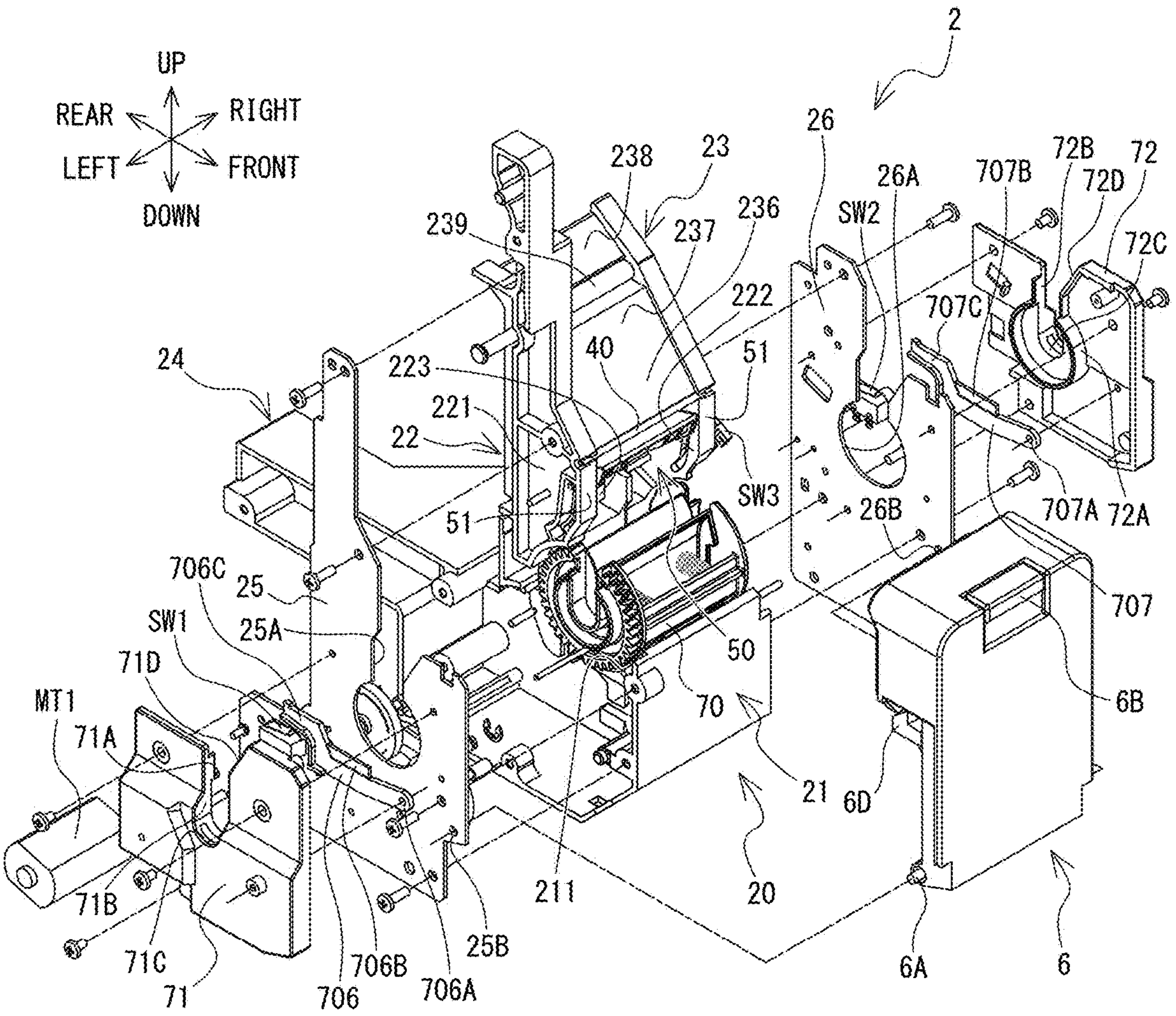
FIG. 10 is an exploded perspective view of the main unit as seen from above left and from the front.

The lever member 706 shown in FIG. 10 is also configured in the same manner as the lever member 707. The lever member 706 has a plate shape extending while curving in a stepped manner in the front-rear direction, and includes a support portion 706A, the input portion 706B, and an action portion 706C. The support portion 706A is a fulcrum rotatably supporting the lever member 706 and is provided at the front end portion of the lever member 706. The lever member 706 is assembled to the right surface of the left support portion 71. A shaft body that engages with the support portion 706A protrudes from the right surface of the left support portion 71. The rear end of the lever member 706 is urged upward by a coil spring (not shown in the drawings). The input portion 706B is formed at the upper surface of a center portion of the lever member 706 and protrudes upward. A part of the input portion 706B is exposed to the bottom portion 71C via the open portion formed in the bottom portion 71C of the guide portion 71B of the left support portion 71. The input portion 706B swings the lever member 706 as a result of being pressed by the cable 19 guided to the bottom portion 71C. The action portion 706C is provided at the rear end of the lever member 706. The action portion 706C is positioned to the rear of and higher than the input portion 706B and the support portion 706A, in the state in which the input portion 706B is exposed to the bottom portion 71C. The sensor SW1 is disposed below the action portion 706C and is fixed to the left surface of the left side plate 25. The sensor SW1 is a switch for driving the drive portion that rotates the rotation body 70. The action portion 706C is positioned higher than the input portion 706B, and thus, even if foreign material, such as water, attaches to the input portion 706B via the open portion of the bottom portion 71C, the foreign material is not likely to reach the action portion 706C. Thus, attachment of foreign material to the sensor SW1 is suppressed.

Figure 19:
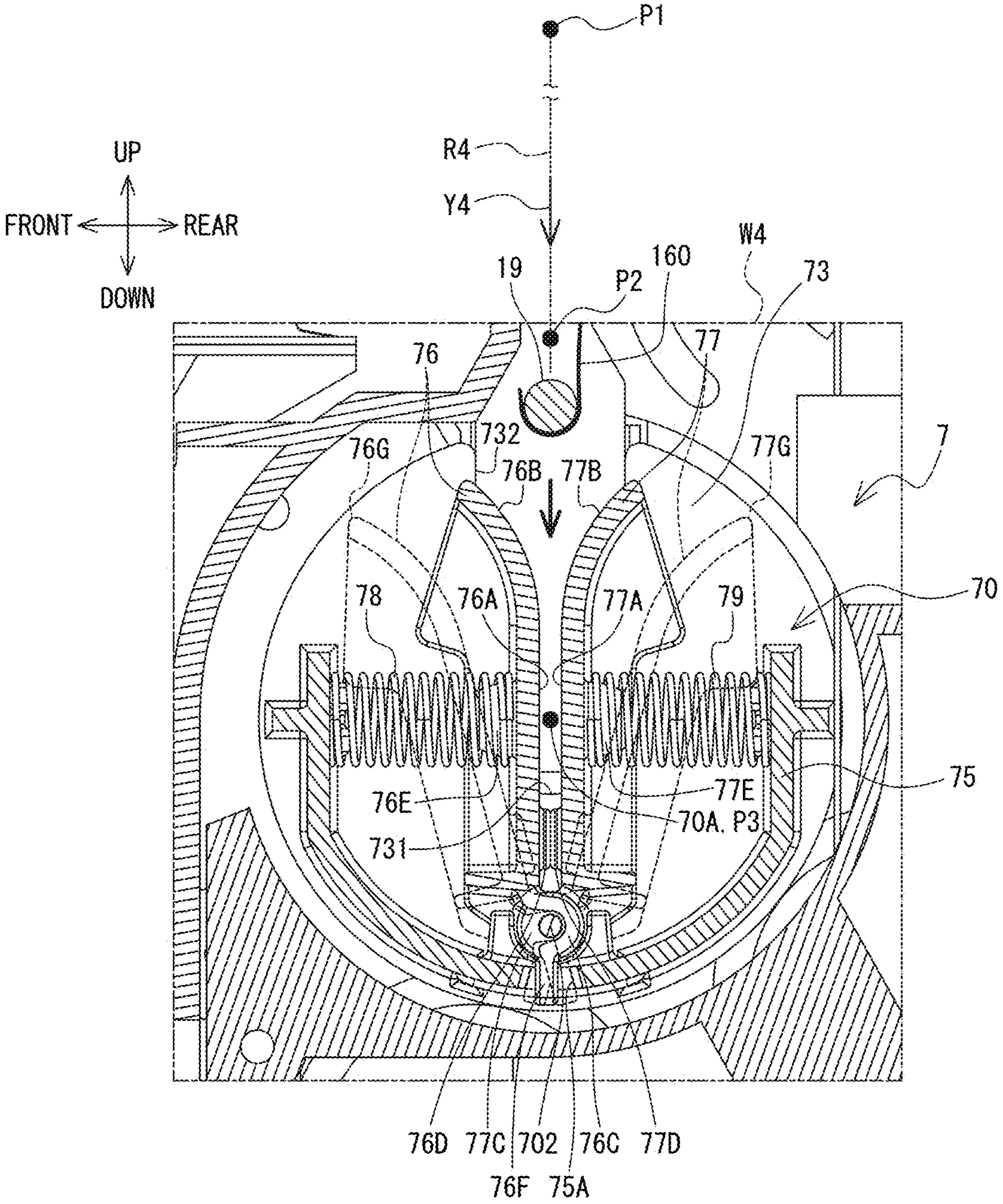
FIG. 19 is an enlarged view of a section indicated by a two-dot chain line shown in FIG. 11.
Figure 20:
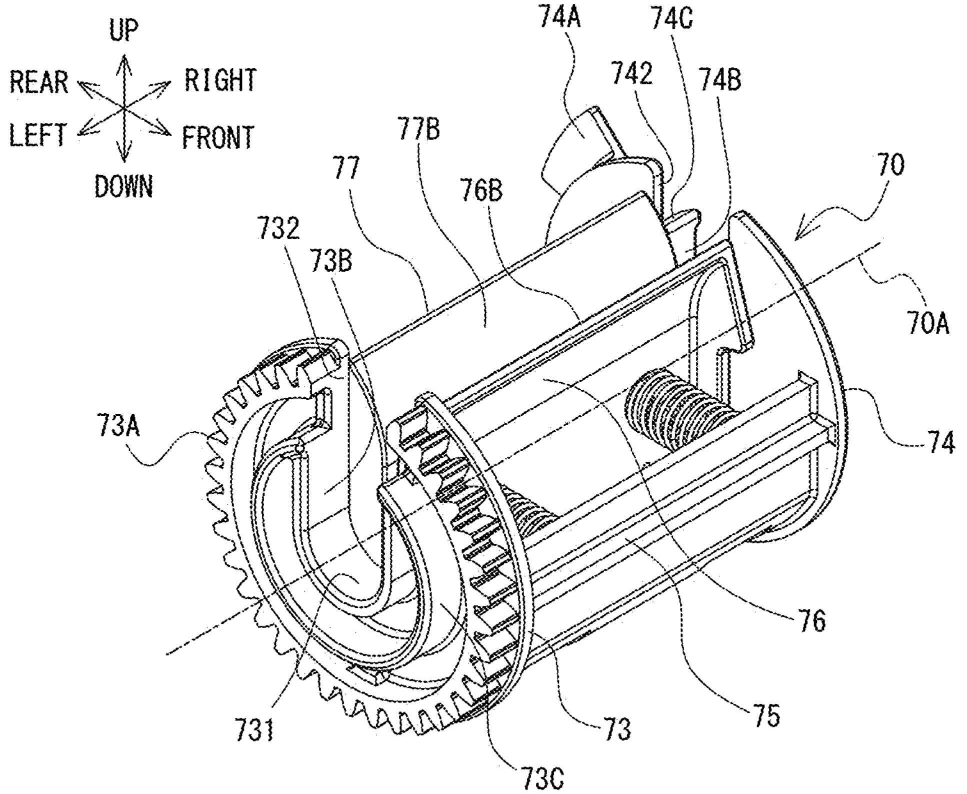
FIG. 20 is a perspective view of a wrapping portion.
Figure 21:
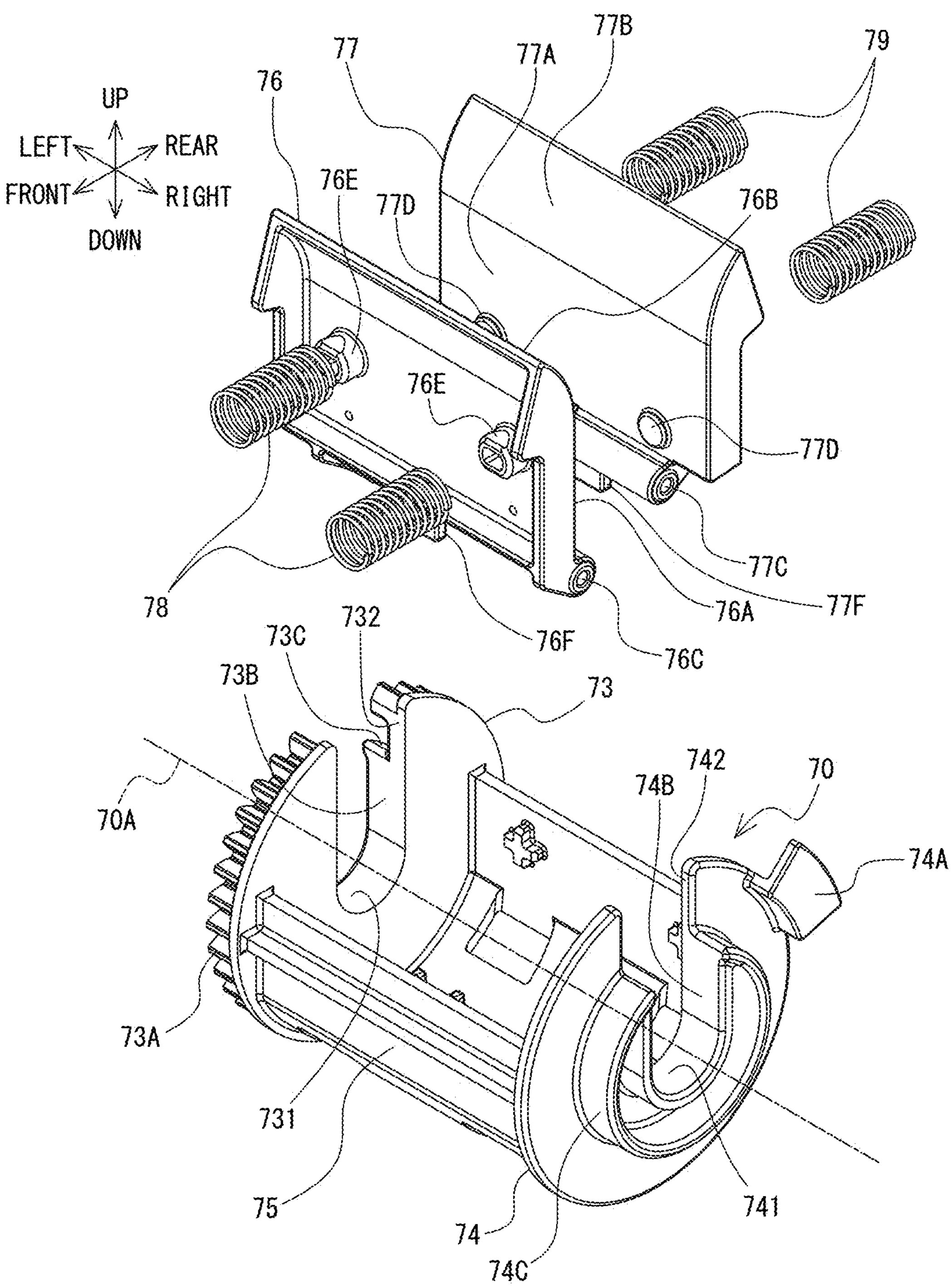
FIG. 21 is an exploded perspective view of the wrapping portion.
Figure 23:
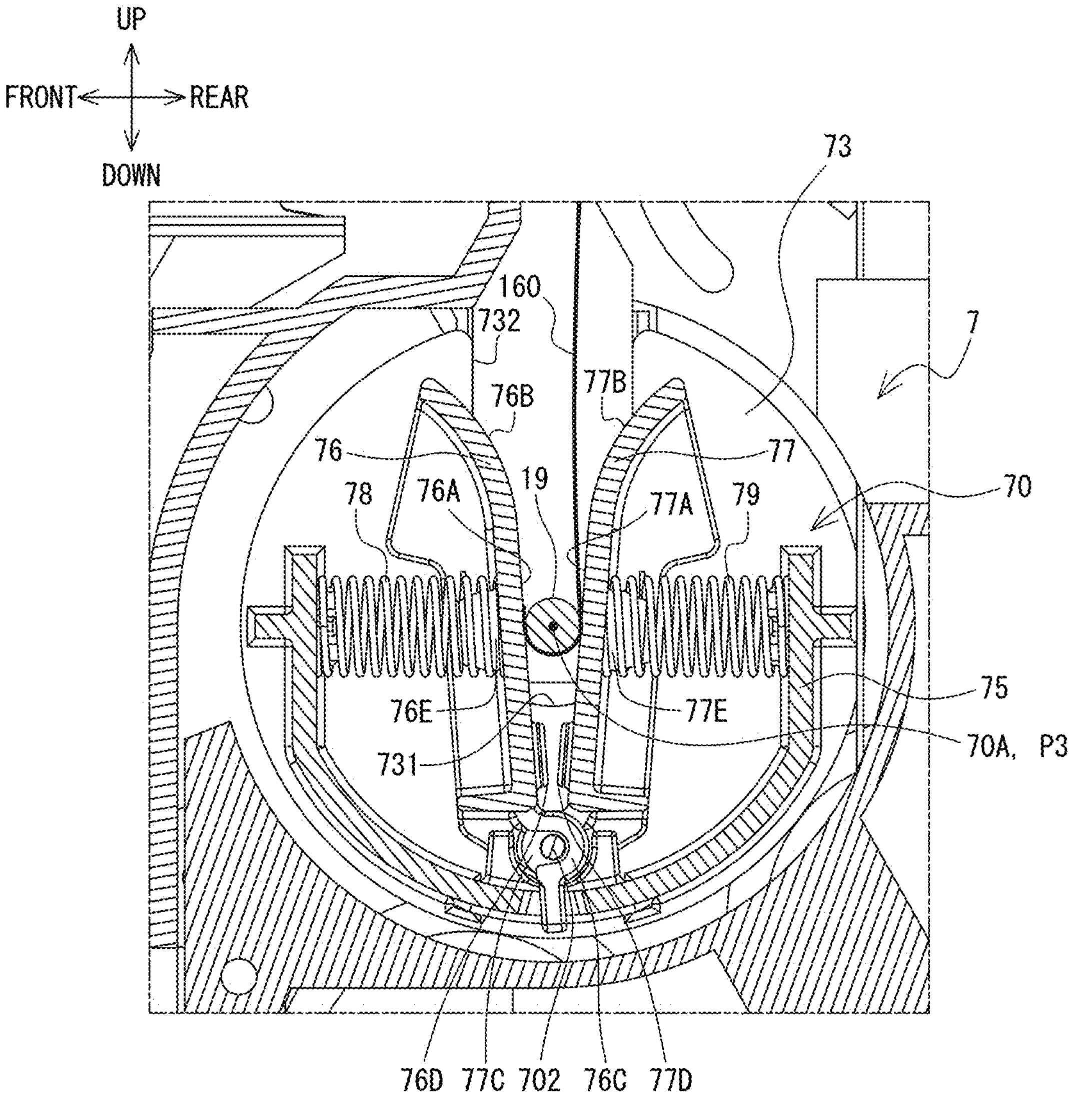
FIG. 23 is a cross-sectional enlarged view of the wrapping portion when the cable has reached a wrapping position.

The cable 19 that has moved in the guide direction Y4 along the guide path R4 and has separated the label 160 from the release material 170 moves further downward from the position P2. The guide surface 71D of the left support portion 71 and the guide surface 72D of the right support portion 72 come into contact with sections of the cable 19 further to the outer side, in the left-right direction, than a section to which the label 160 is affixed, and guide the cable 19 to the guide portions 71B and 72B. The cable 19 moves downward along the guide portions 71B and 72B. As shown in FIG. 19, the rotation body 70 is stopped at the home position. The cable 19 can enter into the insertion portions 73B and 74B. As a result of being guided by the guide portions 71B and 72B and the insertion portions 73B and 74B, the cable 19 enters the gap between the clamp portions 76A and 77A of the arm members 76 and 77. Even if the movement direction of the cable 19 deviates in the front-rear direction, the cable 19 is guided to the receiving portions 76B and 77B between which the gap narrows in the downward direction, and enters the gap between the clamp portions 76A and 77A. As shown in FIG. 23, when the cable 19 enters the gap between the clamp portions 76A and 77A, the cable 19 presses on the arm members 76 and 77 and causes the arm members 76 and 77 to swing around the shared support shaft 702, thus pushing on and widening the gap between the clamp portions 76A and 77A. Due to an urging force, the arm members 76 and 77 maintain the state of clamping the cable 19 between the clamp portions 76A and 77A and thus holding the cable 19.

When the cable 19 reaches the bottom portions 71C and 72C of the guide portions 71B and 72B, namely, reaches the guide position, the section to which the end portion of the label 160 is affixed is disposed at the wrapping position P3 inside the rotation body 70. Sections of the cable 19 that has reached the guide position, as shown in FIG. 23, press the input portions 706B and 707B downward. As a result of the input portions 706B and 707B moving downward, the action portions 706C and 707C move downward. The action portions 706C and 707C are at positions, respectively, that are farther from the support portions 706A and 707A than the input portions 706B and 707B. Thus, each of the action portions 706C and 707C moves downward by a distance longer than a distance by which each of the input portions 706B and 707B move downward as a result of being pressed by the cable 19. When the action portions 706C and 707C have moved downward, the action portions 706C and 707C come into contact with and turn on the sensors SW1 and SW2, respectively.

Figure 24:
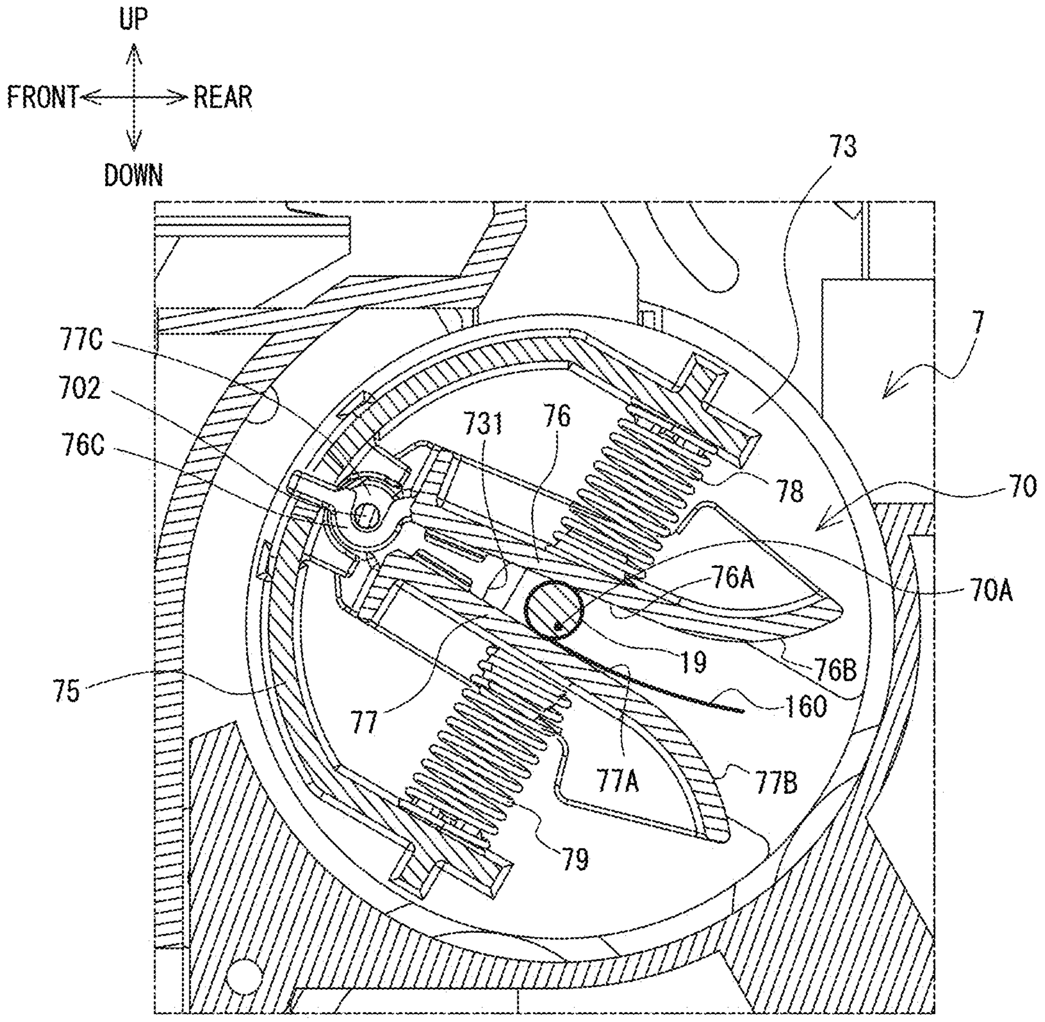
FIG. 24 is a cross-sectional enlarged view of the wrapping portion in a state in which a rotation body has rotated.

The controller 14 drives the motor MT1 when both the sensor SW1 and the sensor SW2 are turned on, and performs control to rotate the rotation body 70. As shown in FIG. 24, as a result of the rotation body 70 rotating, the label 160 is wrapped around the outer peripheral surface of the cable 19. Surfaces of the clamp portions 76A and 77A of the arm members 76 and 77 that come into contact with the cable 19 are flat surfaces. Thus, even when the center position of the cable 19 is displaced with respect to the position of the rotational axis center 70A of the rotation body 70, the clamp portions 76A and 77A can constantly maintain the state in which the outer peripheral surface of the cable 19 is held, as a result of the arm members 76 and 77 being urged. Even when the outer diameter of the cable 19 is different, in the same manner, the clamp portions 76A and 77A can constantly maintain the state in which the outer peripheral surface of the cable 19 is held. As a result of the rotation body 70 rotating in the state in which the cable 19 is held by the clamp portions 76A and 77A, the label 160 is wrapped around the outer peripheral surface of the cable 19, and is affixed to the cable 19 by the adhesive.

The controller 14 controls a number of rotations and a rotation position of the rotation body 70 by the sensor SW3 detecting the detection plate 74A of the rotation body 70. When the number of rotations of the rotation body 70 reaches a number that is set in advance, the controller 14 performs control to stop the rotation body 70 at the home position. In other words, the open portions 732 and 742 of the insertion portions 73B and 74B are positioned above the bottom portions 731 and 742. The cable 19 around which the label 160 has been wrapped can be removed from the insertion portions 73B and 74B and the guide portions 71B and 72B. When the cable 19 is discharged from the guide portion 72B, the lever member 707 moves upward due to the urging of the action portion 707C, and turns off the sensor SW2.

As shown in FIG. 11, when the cable 19 moves in the opposite direction from the guide direction Y4, the inclined surface 63 of the pressing member 60 and the inclined surface 52 of the middle portion 22 of the base body 20 guide the cable 19 to the position of the guide path R4. When the cable 19 passes further along the guide path R4, as a result of the cable 19 pressing the pressing surface 61 along the inclined surface 52, the upper end portion of the pressing member 60 moves to the front, and pushes on and widens the guide path R4 in the front-rear direction. The cable 19 passes through and out of the guide path R4 and the cable 19 to which the label 160 has been affixed is removed from the label affixing device 1.

Figure 8:
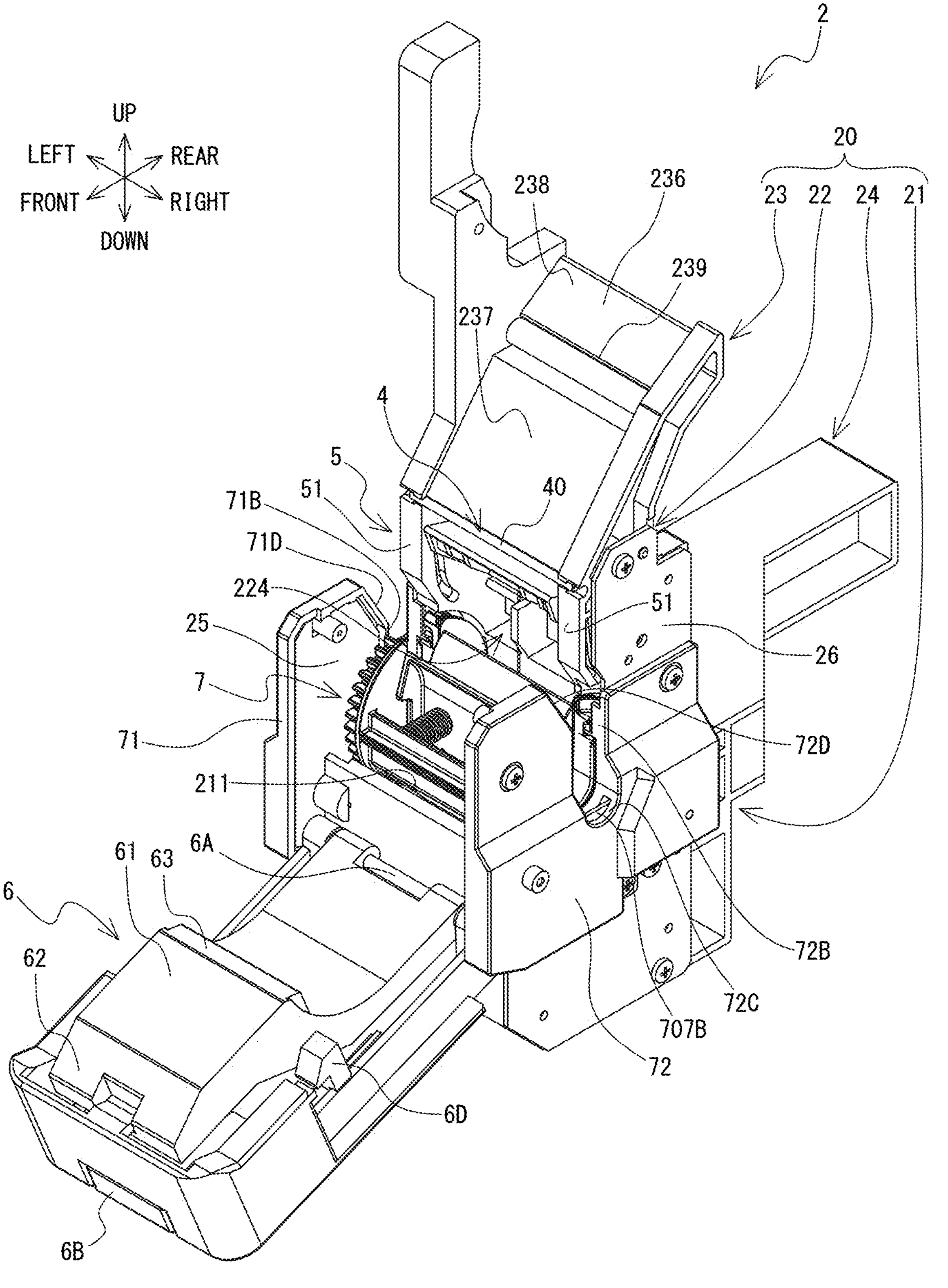
FIG. 8 is a perspective view of the main unit when an opening/closing member is open.
Figure 9:
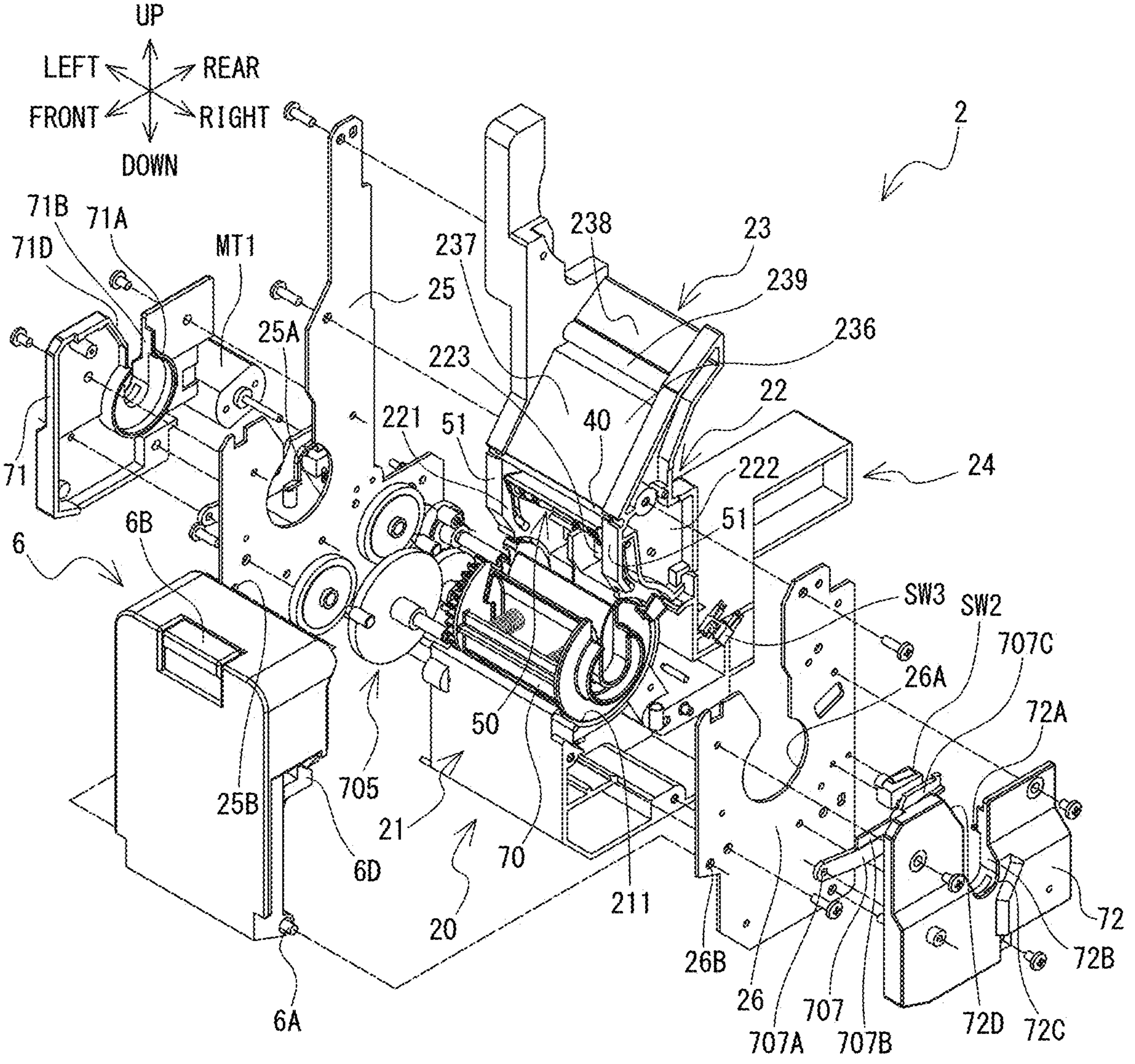
FIG. 9 is an exploded perspective view of the main unit as seen from above right and from the front.

It should be noted that, by opening the opening/closing member 6, the rotation body 70 can be removed from the housing portion 211 and maintenance can be performed. As shown in FIG. 8, the user depresses the opening/closing button 6B of the opening/closing member 6 and opens the opening/closing member 6. The peeling region 224 of the pressing portion 5 and the housing portion 211 of the wrapping portion 7 are exposed to the front surface of the label affixing device 1. The user removes the screws of the left support portion 71 and the right support portion 72 and removes the left support portion 71 and the right support portion 72 from the left side plate 25 and the right side plate 26, respectively. The engagement of the rotation shaft portions 73C and 74C of the rotation body 70 with the rotation shaft bearing portions 71A and 72A of the left support portion 71 and the right support portion 72 is released. Thus, the user can remove the rotation body 70 from the housing portion 211. The sensor SW3 detects the detection plate 74A of the rotation body 70 in a non-contact manner. Furthermore, the sensor SW3 is disposed at the position on the depth side of the housing portion 211. Thus, when removing the rotation body 70, it is not necessary to go to the trouble of removing a wiring line of the sensor SW3, releasing an engagement between the sensor SW3 and the detection plate 74A, and the like.

Further, the sensors SW1 and SW2 are respectively fixed to the left side plate 25 and the right side plate 26. Thus, when removing the left support portion 71 and the right support portion 72 from the left side plate 25 and the right side plate 26, it is not necessary for the user to remove wiring lines of the sensors SW1 and SW2. The lever members 706 and 707 are respectively assembled to the left support portion 71 and the right support portion 72, and are held at positions separated from the sensors SW1 and SW2 by the spring force of the coil spring 707D of the lever member 707. Thus, when the user removes the left support portion 71 and the right support portion 72 from the left side plate 25 and the right side plate 26, the lever members 706 and 707 do not interfere with the sensors SW1 and SW2.

When installing the rotation body 70 in the housing portion 211, the user performs the operation as a reverse procedure to that when removing the rotation body 70. The user places the rotation body 70 in the housing portion 211. The user provisionally places the rotation shaft bearing portions 71A and 72A of the left support portion 71 and the right support portion 72 in the circular sections of the open portions 25A and 26A of the left side plate 25 and the right side plate 26. The user fits the rotation shaft portions 73C and 74C of the rotation body 70 into the rotation shaft bearing portions 71A and 72A of the left support portion 71 and the right support portion 72, respectively, and provisionally engages the rotation shaft portions 73C and 74C with the rotation shaft bearing portions 71A and 72A. By rotating the left support portion 71 and the right support portion 72 around the fulcrums of the rotation shaft bearing portions 71A and 72A, respectively, the user determines the positions between the guide portions 71B and 72B of the left support portion 71 and the right support portion 72, and the open portions 25A and 26A of the left side plate 25 and the right side plate 26. The user tightens the screws, fixes the left support portion 71 and the right support portion 72 to the left side plate 25 and the right side plate 26, respectively, and ends the installation of the rotation body 70.

Winding Portion 8

As shown in FIG. 3 and FIG. 11, the winding portion 8 is positioned diagonally upward and to the rear of the peeling portion 4, and is provided at the right surface of the main plate 12, above the upper front corner portion of the tape compartment 30. The winding portion 8 imparts a tension to the tape 150 necessary for the transport of the tape 150 and for the peeling away of the label 160, by winding up into a roll shape the release material 170 from which the label 160 has been peeled away at the peeling portion 4. As shown in FIG. 1, the winding portion 8 has a cylindrical shape and a rotational axis center 80A thereof extends in the left-right direction. The length of the winding portion 8 in the left-right direction is greater than the maximum width of the tape 150 (the label 160) corresponding to the label affixing device 1. The left end portion of the winding portion 8 is connected to a drive portion provided at the main plate 12, and the winding portion 8 rotates in the counterclockwise direction in a right side view, under the control of the controller 14. The right end portion of the winding portion 8 is free. The release material 170 is wound up onto the outer peripheral surface of the winding portion 8, and at a time of disposal, the release material roll 175 that is in the roll shape is removed to the right from the right end portion.

As shown in FIG. 25 to FIG. 29, the winding portion 8 includes a reel 80, a rotation shaft 81, an advancing/retracting member 82, a presser member 84, a lid member 85, and an operation member 86. The reel 80 has a cylindrical shape and extends in an axial direction of the rotational axis center 80A. The left surface of the reel 80 is closed, and an opening is formed at the center of the reel 80, through which the rotation shaft 81 extending from the gear set 88 of a drive portion is inserted. The opening for the rotation shaft 81 is connected to the inner peripheral surface of a tubular shaft 80D that extends to the right in a tubular shape from the left surface, inside the reel 80. The rotation shaft 81 is screwed to the tubular shaft 80D by screws, at the right end of the tubular shaft 80D, and is fixed to the reel 80. The gear set 88 transmits the driving force of the motor MT2 provided in the drive portion to the rotation shaft 81, and rotates the reel 80 in accordance with the control of the controller 14.

The right surface of the reel 80 is open. The reel 80 has an open portion 80C that penetrates an outer peripheral surface 80B and opens the outer peripheral surface 80B over substantially one fourth of the breadth of the outer peripheral surface 80B. The open portion 80C is open at the right surface. The advancing/retracting member 82 is disposed at the open portion 80C. The advancing/retracting member 82 has a plate shape having substantially the same size as the breadth of the open portion 80C, and includes an outer surface 82A curved along the outer peripheral surface 80B. A shaft hole 82C (refer to FIG. 27), through which a shaft 82B extending in the axial direction is inserted, is formed at one end side in a peripheral direction of the outer surface 82A of the advancing/retracting member 82. The shaft 82B is held by shaft bearings 80E formed at an inner portion of the reel 80, at the one end side in the peripheral direction of the open portion 80C of the reel 80. Thus, the advancing/retracting member 82 swings around the shaft 82B such that the other end side in the peripheral direction of the outer surface 82A is a free end. The free end can enter and leave, in the radial direction, a gap between the inner portion and an outer portion of the reel 80, via the open portion 80C.

The reel 80 includes a slit-shaped slot 80F extending in the axial direction, closer to the other end side in the peripheral direction than the open portion 80C, in the outer peripheral surface 80B. The inner wall of the slot 80F extends inside the reel 80 to substantially the center in the radial direction. An end portion of the release material 170 to be wound up by the winding portion 8 is inserted into the slot 80F. The presser member 84 is a metal plate spring. One end portion of the presser member 84 in a direction orthogonal to the axial direction is bent, and a presser portion 84A is formed at an edge section thereof. The presser portion 84A includes a plurality of teeth aligned in the axial direction. The other end portion of the presser member 84 is divided into three sections in the axial direction. At the other end portion, sections at both end sides of the presser member 84 in the axial direction are support portions 84C. Each of the support portions 84C is curved over in a cylindrical shape having a greater radius of curvature than the outer diameter of the tubular shaft 80D. The support portions 84C engage with the outer peripheral surface of the tubular shaft 80D, and support the presser member 84 to be rotatable around the tubular shaft 80D.

A central section of the other end portion in the peripheral direction of the presser member 84 is a restriction portion 84B. The restriction portion 84B extends to the other end side while bending in a stepped shape. In a state in which the presser portion 84A is disposed at the inner wall section of the slot 80F, the restriction portion 84B is hooked onto a hook portion 80G provided in the vicinity of the shaft bearings 80E inside the reel 80. The restriction portion 84B restricts the rotation of the presser member 84 in the counterclockwise direction in a right side view. A section between the support portions 84C and the presser portion 84A is a flexible portion 84D. The flexible portion 84D is bent by pressure from a first cam 87A (to be described later). The flexible portion 84D bends due to the pressure, and is restored to an original state by an elastic force when the pressure is released. A receiving toothed portion 80H (refer to FIG. 27) is provided at the inner wall section of the slot 80F. The receiving toothed portion 80H includes a plurality of receiving teeth formed in a stepped shape with respect to an insertion direction of the end portion of the release material 170. The receiving teeth of the receiving toothed portion 80H extend in the axial direction. The presser portion 84A of the presser member 84 is disposed at a position facing the teeth on the receiving toothed portion 80H.

The lid member 85 closes the right surface of the reel 80. The lid member 85 is disposed at the inner side of the right end portion of the reel 80 and is fixed by screws. The lid member 85 includes a removal opening 85A having a long thin cutout shape. The removal opening 85A is formed at a position corresponding to an opening section on the right surface of the slot 80F, and is connected to the slot 80F. The end portion of the release material 170 inserted into the slot 80F can be pulled out from the removal opening 85A by sliding the end portion to the right. The operation member 86 moves the free end of the advancing/retracting member 82 and the presser portion 84A of the presser member 84. The operation member 86 includes an operation portion 86A and a cam member 87. The operation portion 86A includes a rotation shaft 86B, which is inserted into a support hole 85B of the lid member 85, and is rotatably supported. The operation portion 86A is disposed at the right surface of the lid member 85, and rotates between a first position (refer to FIG. 28) at which the operation portion 86A overlaps with the removal opening 85A and the slot 80F in the axial direction, and a second position (refer to FIG. 29) at which the operation portion 86A does not overlap the removal opening 85A and the slot 80F in the axial direction.

The cam member 87 is disposed inside the reel 80, and includes a thick shaft 87C, a first cam 87A and a second cam 87B, and a thin shaft 87D. The thick shaft 87C extends in the axial direction, and is coupled to the rotation shaft 86B of the operation portion 86A. The first cam 87A and the second cam 87B are coupled to the left end portion of the thick shaft 87C. The thin shaft 87D extends in the axial direction and is coupled to the left end portions of the first cam 87A and the second cam 87B. The thick shaft 87C and the thin shaft 87D are coaxial with each other. The thin shaft 87D is supported at a shaft bearing portion 80J formed at the left surface inside the reel 80. The cam member 87 is disposed between the free end of the advancing/retracting member 82 and the presser portion 84A of the presser member 84, inside the reel 80. The first cam 87A changes the position of the free end of the advancing/retracting member 82 in accordance with the rotation of the operation portion 86A.

When the operation portion 86A is at the first position, the first cam 87A presses the free end of the advancing/retracting member 82 to the outside in the radial direction, thereby placing the advancing/retracting member 82 at an extended position. The extended position is a position at which the position of the outer surface 82A of the advancing/retracting member 82 is substantially the same as the position of the outer peripheral surface 80B of the reel 80 in the radial direction (refer to FIG. 26). When the operation portion 86A is at the second position, the first cam 87A releases the pressure applied to the free end of the advancing/retracting member 82, and the advancing/retracting member 82 is disposed at a retracted position. The retracted position is a position at which the position of the outer surface 82A of the advancing/retracting member 82 is disposed further to the inner side, in the radial direction, than the position of the outer peripheral surface 80B of the reel 80 (refer to FIG. 27).

The length of the reel 80 in the peripheral direction when the advancing/retracting member 82 is at the extended position will be referred to as a first peripheral length. The peripheral length is a shortest length of the reel 80 in the peripheral direction, and is a shortest length of an outer contour line in a cross-section orthogonal to the rotational axis center 80A and including the open portion 80C. The first peripheral length is a length of the outer contour line obtained by connecting a line along the outer peripheral surface 80B of the reel 80 and a line along the outer surface 82A of the advancing/retracting member 82 at the open portion 80C. The first peripheral length is roughly the same as the length of the outer peripheral surface 80B of the reel 80 when the open portion 80C is not present. The length of the reel 80 in the peripheral direction when the advancing/retracting member 82 is at the retracted position will be referred to as a second peripheral length. The second peripheral length is a length of the outer contour line obtained by connecting the line along the outer peripheral surface 80B of the reel 80, a line along a part of the outer surface 82A of the advancing/retracting member 82 at the open portion 80C, and a tangent line extending to the outer surface 82A from an edge portion of the open portion 80C. The tangent line extending to the outer surface 82A from the edge portion of the open portion 80C passes inside the open portion 80C. Thus, the second peripheral length is shorter than the first peripheral length.

The second cam 87B changes the position of the presser portion 84A of the presser member 84 in accordance with the rotation of the operation portion 86A. When the operation portion 86A is at the first position, the second cam 87B pushes on the flexible portion 84D. As a result of the flexible portion 84D bending, the presser portion 84A moves to a contact position. The contact position is a position at which the presser portion 84A is in contact with the receiving toothed portion 80H formed at the inner wall of the slot 80F (refer to FIG. 26). When the operation portion 86A is at the second position, the second cam 87B releases the pressure applied to the flexible portion 84D. The flexible portion 84D then returns to its original state by elastic force, and the presser portion 84A moves to a separated position. The separated position is a position at which the presser portion 84A is at a position separated from the receiving toothed portion 80H (refer to FIG. 27).

When winding up the release material 170 from which the label 160 has been peeled away, the user rotates the operation portion 86A and disposes the operation portion 86A at the second position. The pressing of the flexible portion 84D by the second cam 87B is released and the flexible portion 84D is restored by the elastic force, thus moving the presser portion 84A to the separated position. The user inserts the end portion of the release material 170 into the slot 80F of the reel 80. The end portion of the release material 170 is inserted deep into the slot 80F without coming into contact with the presser portion 84A. The user rotates the operation portion 86A and disposes the operation portion 86A at the first position. The flexible portion 84D is pressed by the second cam 87B, thus moving the presser portion 84A to the contact position. The presser portion 84A clamps the inserted end portion of the release material 170 between the presser portion 84A and the receiving toothed portion 80H. Further, the flexible portion 84D urges the presser portion 84A using the elastic force. As a result of the urging force, the presser portion 84A applies a load to the end portion of the release material 170, and presses the end portion of the release material 170 against the receiving toothed portion 80H. Thus, when the winding up by the winding portion 8 starts, the end portion of the release material 170 is not likely to be pulled out of the slot 80F. The user operates the operation panel 13 and issues a rotation command for the winding portion 8. The controller 14 drives the motor MT2 of the drive portion, rotates the rotation shaft 81, and rotates the reel 80 in the counterclockwise direction in a right side view. The release material 170 is wound up by the winding portion 8, and slack is taken up. Since the advancing/retracting member 82 is at the extended position, the length of the inner periphery of the release material roll 175 of the release material 170 wound up by the winding portion 8 is the first peripheral length.

The outer peripheral surface 80B of the reel 80 is preferably a round cylindrical surface over which a distance in the radial direction with respect to the rotational axis center 80A is constant. Furthermore, the outer surface 82A of the advancing/retracting member 82 at the extended position preferably configures a round cylindrical surface having the same distance in the radial direction with respect to the rotational axis center 80A as that of the outer peripheral surface 80B of the reel 80. As a result of the outer peripheral surface 80B of the reel 80 and the outer surface 82A of the advancing/retracting member 82 configuring the round cylindrical surface, the winding portion 8 can suppress fluctuations in a speed of winding the release material 170 by the reel 80, and thus unevenness in the printing on the label 160 is less likely to occur.

Inside the tape cassette 100, the release material 170 is wound around the tape spool 121, as the double-sided adhesive tape 120 adhered to the adhesive surface Ur of the base material 140. Thus, a coating treatment is carried out on both surfaces of the release material 170 to inhibit the attachment of the adhesive, so that the double-sided adhesive tape 120 is fed out from the tape spool 121. Thus, the double-sided adhesive tape 120 slides more easily at a time of transport. The winding portion 8 pulls the release material 170 by winding up the release material 170 using the driving force of the motor MT2, and assists the transport. Thus, the winding portion 8 imparts a sufficient peeling force to the peeling portion 4, in resistance to the sliding of the release material 170.

Note that a change between the outer diameter of the release material roll 175 when the winding portion 8 starts to wind up the release material 170 and the outer diameter of the release material roll 175 when the winding up is complete is preferably suppressed to being within 20% or less of the outer diameter of the reel 80. At the cut section Ct of the label 160, a surface of the release material 170 on the label 160 is partially cut (refer to FIG. 6). Thus, when a pulling force caused by the winding up by the winding portion 8 significantly changes, there is a possibility that the release material 170 may break at the cut section Ct. Thus, by causing the change in the outer diameter of the release material roll 175 from the start to the end of the winding to be within 20% or less of the outer diameter of the reel 80, the change in the pulling force on the release material 170 is suppressed, and the breakage of the release material 170 during the winding up is suppressed.

The winding portion 8 winds up the release material 170 onto the outer peripheral surface 80B of the reel 80 while pulling the release material 170. Thus, the release material roll 175 is in a state of being firmly wound onto the reel 80, and cannot be easily removed from the reel 80. When removing the release material roll 175, the user rotates the operation portion 86A and disposes the operation portion 86A at the second position. The presser portion 84A moves to the separated position. Further, the pressing of the advancing/retracting member 82 by the first cam 87A is released, and the advancing/retracting member 82 moves to the retracted position. The advancing/retracting member 82 is pushed into the open portion 80C by the release material roll 175 firmly wound onto the reel 80, and is disposed at the retracted position. The length in the peripheral direction of the reel 80 becomes the second peripheral length, and is shorter than the length of the inner periphery of the release material roll 175. Thus, a gap is generated between the inner surface of the release material roll 175 and the outer surface 82A of the advancing/retracting member 82 and the release material roll 175 moves easily over the outer peripheral surface 80B.

Figure 28:
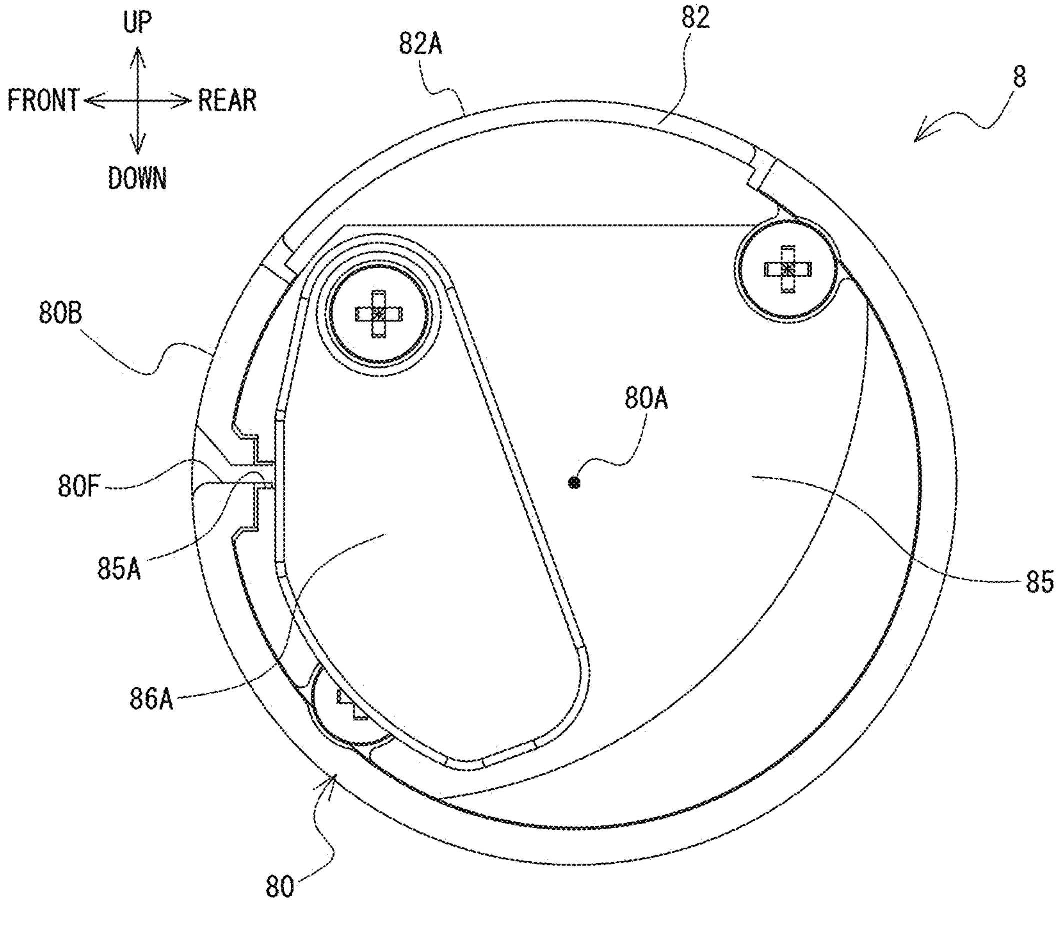
FIG. 28 is a right side view of the winding portion when the operation portion is at the first position.
Figure 29:
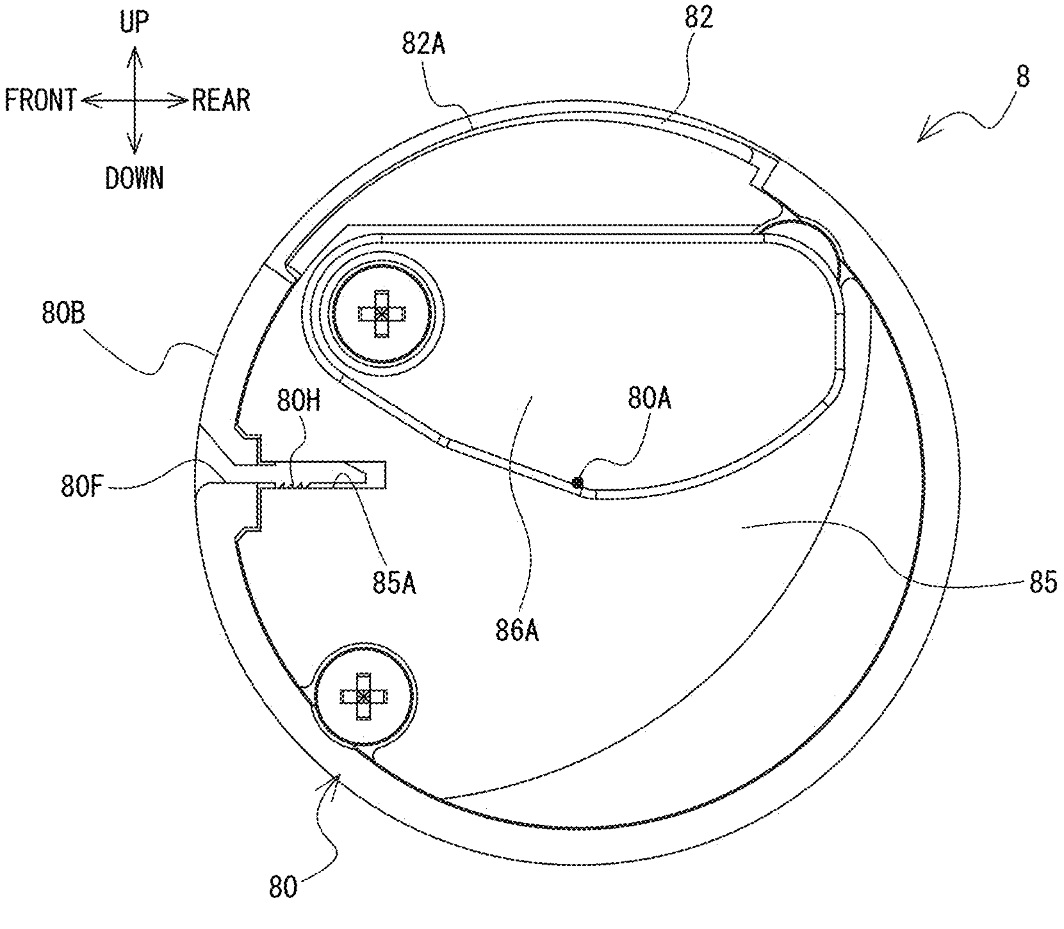
FIG. 29 is a right side view of the winding portion when the operation portion is at the second position.

As shown in FIG. 28, when the operation portion 86A is at the first position, the operation portion 86A overlaps the removal opening 85A in the axial direction, and the user cannot see inside the slot 80F. As shown in FIG. 29, when the operation portion 86A is at the second position, the operation portion 86A does not overlap the removal opening 85A in the axial direction, and the user can see inside the slot 80F. Thus, simply by looking at the right surface of the winding portion 8 and checking that the removal opening 85A does not overlap the operation portion 86A, the user can ascertain whether the release material roll 175 can be removed.

The user moves the release material roll 175 in the axial direction, and removes the release material roll 175 from the right end portion of the reel 80. Since the operation portion 86A has moved to the position not overlapping the removal opening 85A, the user can remove the end portion of the release material 170 to the outside of the slot 80F in the axial direction, via the removal opening 85A.

Electrical Configuration

Figure 30:
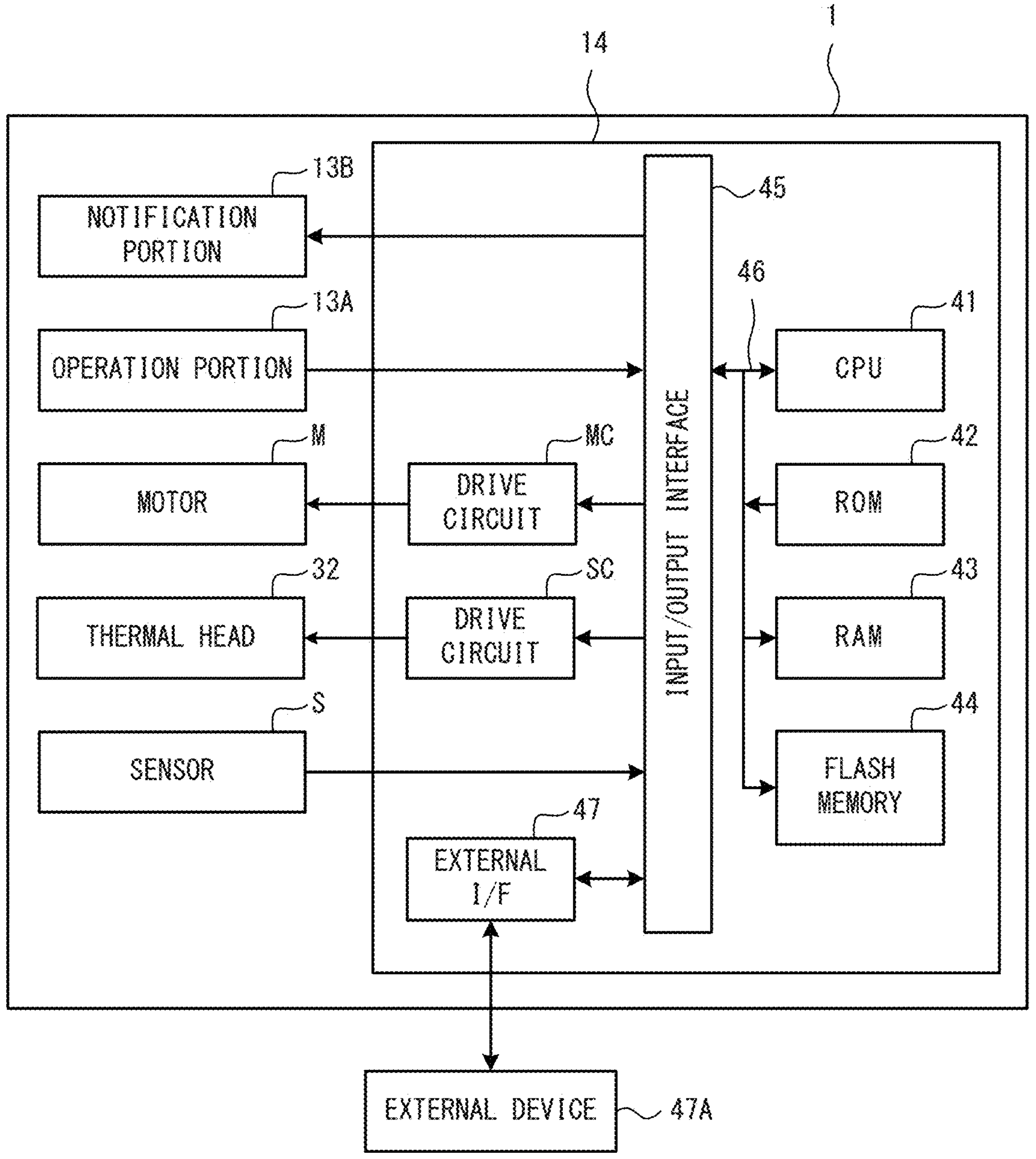
FIG. 30 is a block diagram showing an electrical configuration of the label affixing device.

The electrical configuration of the label affixing device 1 will be described with reference to FIG. 30. The controller 14 of the label affixing device 1 is provided with a CPU 41, a ROM 42, a RAM 43, a flash memory 44, an input/output interface 45, drive circuits MC and SC, and an external interface (I/F) 47. The CPU 41, the ROM 42, the RAM 43, the flash memory 44, and the input/output interface 45 are connected via a data bus 46. The CPU 41 performs overall control of the label affixing device 1. The ROM 42 stores constants necessary when the CPU 41 executes various programs. The RAM 43 stores temporary data generated when the CPU 41 executes processing. The flash memory 44 stores the programs executed by the CPU 41, variables, and the like.

The notification portion 13B, the operation portion 13A, the drive circuits MC and SC, sensors S, and the external I/F 47 are connected to the input/output interface 45. The notification portion 13B is configured by a plurality of LEDs that can notify the state of the label affixing device 1. The notification portion 13B includes a tape replacement LED that illuminates when the label affixing device 1 is in a state in which the tape cassette 100 can be replaced. The operation portion 13A is a button for performing operations with respect to the label affixing device 1. The drive circuit MC is an electronic circuit for driving motors M. The drive circuit SC is an electronic circuit for driving the thermal head 32. The external I/F 47 is connected to and communicates with an external terminal 47A. For example, the CPU 41 can update a program by storing a program received from the external terminal 47A in the flash memory 44. The external terminal 47A is a general-purpose personal computer (PC) or a portable terminal.

The motors M include the motors MT1 to MT5. The motor MT1 is the motor for driving the wrapping portion 7. The motor MT2 is the DC motor for driving the winding portion 8. The motor MT3 is the motor for driving the drive shaft 35 and the winding shaft 36. The motor MT4 is the motor for driving the full-cut cutting blade 91. The motor MT5 is the motor for driving the half-cut cutting blade 92.

The sensors S include the sensors SW1 to SW4, and SW6 to SW8. The sensor SW1 is the microswitch (refer to FIG. 9 and FIG. 10) that can detect, at the left end portion of the wrapping portion 7, whether the cable 19 is disposed at the wrapping position P3. The sensor SW2 (refer to FIG. 9 and FIG. 10) is the microswitch that can detect, at the right end portion of the wrapping portion 7, whether the cable 19 is disposed at the wrapping position P3. The sensor SW3 (refer to FIG. 9 and FIG. 10) is the transmitting type photo-sensor for detecting the rotation position and the number of rotations of the rotation body 70. The sensor SW4 is a contact type sensor (not shown in the drawings) for detecting whether the tape cassette 100 is installed in the tape compartment 30. The sensor SW6 (refer to FIG. 4) is configured by the plurality of detection switches for detecting the type of the tape cassette 100. The sensor SW7 is a microswitch for detecting whether the movable blade 91B of the full-cut cutting blade 91 is at a home position. The sensor SW8 is a microswitch for detecting whether the movable blade 92B of the half-cut cutting blade 92 is at a home position.

Power On Processing

Power-on processing will be described with reference to FIG. 31 and FIG. 32. When the power of the label affixing device 1 is switched from OFF to ON, the power-on processing is started by the CPU 41 reading out and executing a program stored in the flash memory 44. When the power is turned on, the label affixing device 1 performs processing to cause the positions of the full-cut cutting blade 91, the half-cut cutting blade 92, and the rotation body 70 of the wrapping portion 7 to be the respective home positions.

Figure 31:
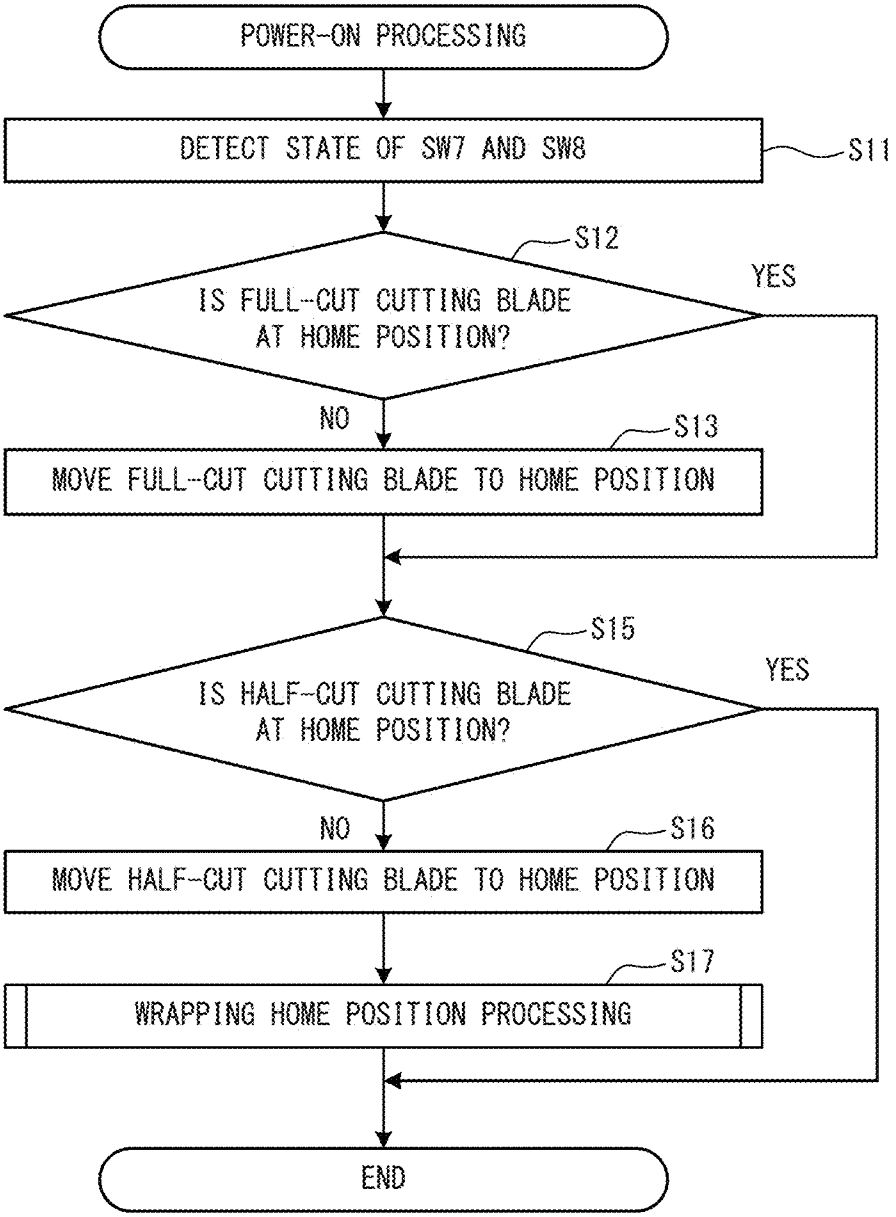
FIG. 31 is a flowchart of power-on processing.
Figure 32:
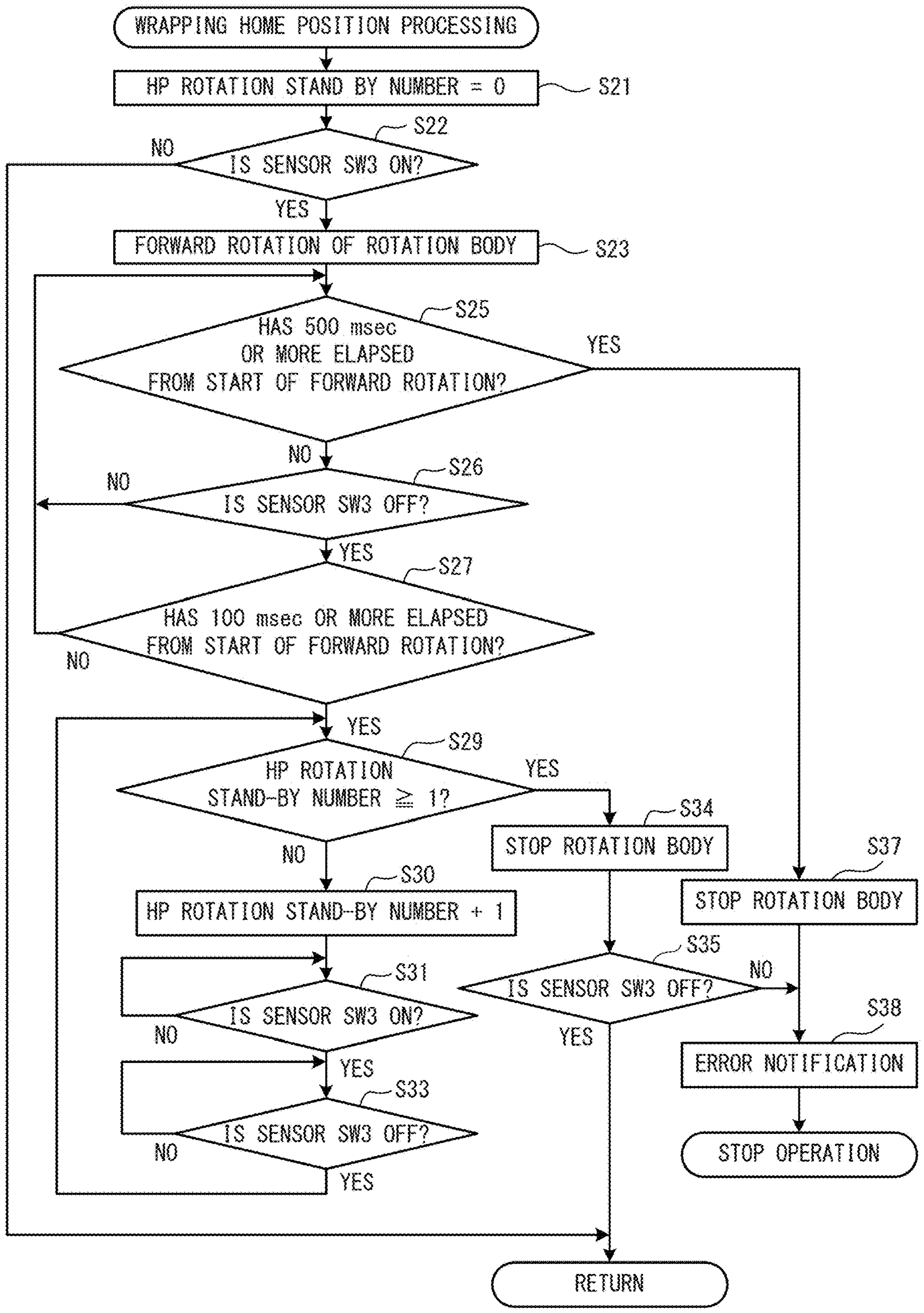
FIG. 32 is a flowchart of wrapping home position processing.

As shown in FIG. 31, the CPU 41 detects a state of the sensors SW7 and SW8 (S11). When the movable blade 91B of the full-cut cutting blade 91 is at the home position (a position at which an opening extent of the movable blade 91B with respect to the fixed plate 91A is greatest), the sensor SW7 is ON. In a similar manner, when the movable blade 92B of the half-cut cutting blade 92 is at the home position (a position at which an opening extent of the movable blade 92B with respect to the fixed plate 92A is greatest), the sensor SW8 is ON.

When the full-cut cutting blade 91 is at the home position (yes at S12), the CPU 41 shifts the processing to S15, and when the full-cut cutting blade 91 is not at the home position (no at S12), the CPU 41 drives the motor MT4 and moves the movable blade 91B to the home position until the sensor SW7 is ON (S13). When the half-cut cutting blade 92 is at the home position (yes at S15), the CPU 41 shifts the processing to S17, and when the half-cut cutting blade 92 is not at the home position (no at S15), the CPU 41 drives the motor MT5 and moves the movable blade 92B to the home position until the sensor SW8 is ON (S16).

The CPU 41 executes wrapping home position processing (S17). The wrapping home position processing is processing to dispose the rotation body 70 of the wrapping portion 7 at the home position. The home position of the rotation body 70 is a position at which the cable 19 can be inserted into the insertion portions 73B and 74B, detection light of the sensor SW3 is blocked by the detection plate 74A, and a detection result is OFF. As shown in FIG. 32, the CPU 41 sets an HP rotation stand-by number to zero (S21). The HP rotation stand-by number is a variable for counting a number of rotations by which the rotation body 70 is to be rotated in order to determine the position of the rotation body 70, when the rotation body 70 is not at the home position. The CPU 41 detects the state of the sensor SW3, and when the sensor SW3 is OFF (no at S22), this means that the rotation body 70 is at the home position, and thus the CPU 41 ends the wrapping home position processing, returns to the power-on processing, and ends the power-on processing.

When the sensor SW3 is ON (yes at S22), the CPU 41 drives the motor MT1 and rotates the rotation body 70 in the forward direction (forward rotation) (S23). The forward rotation of the rotation body 70 is the counterclockwise direction in a right side view of the label affixing device 1. The motor MT1 rotates the rotation body 70 at a speed of 500 msec or less per one cycle. When the sensor SW3 is not turned OFF even when 500 msec or more has elapsed from the start of the forward rotation of the rotation body 70 (no at S25, no at step S26, yes at S25), the CPU 41 stops the driving of the motor MT1 and stops the rotation body 70 (S37). The CPU 41 illuminates the LED of the notification portion 13B and notifies an error (S38), and stops the operation of the label affixing device 1.

When the sensor SW3 is turned OFF at less than 100 msec from the start of the forward rotation of the rotation body 70 (yes at S26, no at S27), the CPU 41 ignores the detection result of the sensor SW3, returns the processing to S25, and continues the forward rotation of the rotation body 70. When 100 msec or more has elapsed from the start of the forward rotation of the rotation body 70 and the sensor SW3 is turned OFF (yes at S26, yes at S27), when the HP rotation stand-by number is less than 1 (no at 29), 1 is added to the HP rotation stand-by number (S30). The CPU 41 continues to rotate the rotation body 70 in the forward direction, and stands by until the sensor SW3 is turned ON (no at S31). When the sensor SW3 is turned ON (yes at S31), the CPU 41 stands by until the sensor SW3 is once more turned OFF (no at S33).

When the sensor SW3 is turned OFF (yes at S33), when the HP rotation stand-by number is 1 or more (yes at S29), the CPU 41 stops the driving of the motor MT1 and stops the rotation body 70 (S34). The CPU 41 once more checks the state of the sensor SW3, and when the sensor SW3 is OFF (yes at S35), this means that the rotation body 70 is at the home position and the CPU 41 thus ends the wrapping home position processing, returns the processing to the power-on processing, and ends the power-on processing. On the other hand, when the sensor SW3 is turned ON at S35, this means that the rotation body 70 has exceeded the home position during a period from stopping the driving of the motor MT1 to the stopping of the rotation body 70. Thus, the CPU 41 illuminates the LED of the notification portion 13B and notifies an error (S38), and stops the operation of the label affixing device 1.

Cassette Installing Processing

Figure 33:
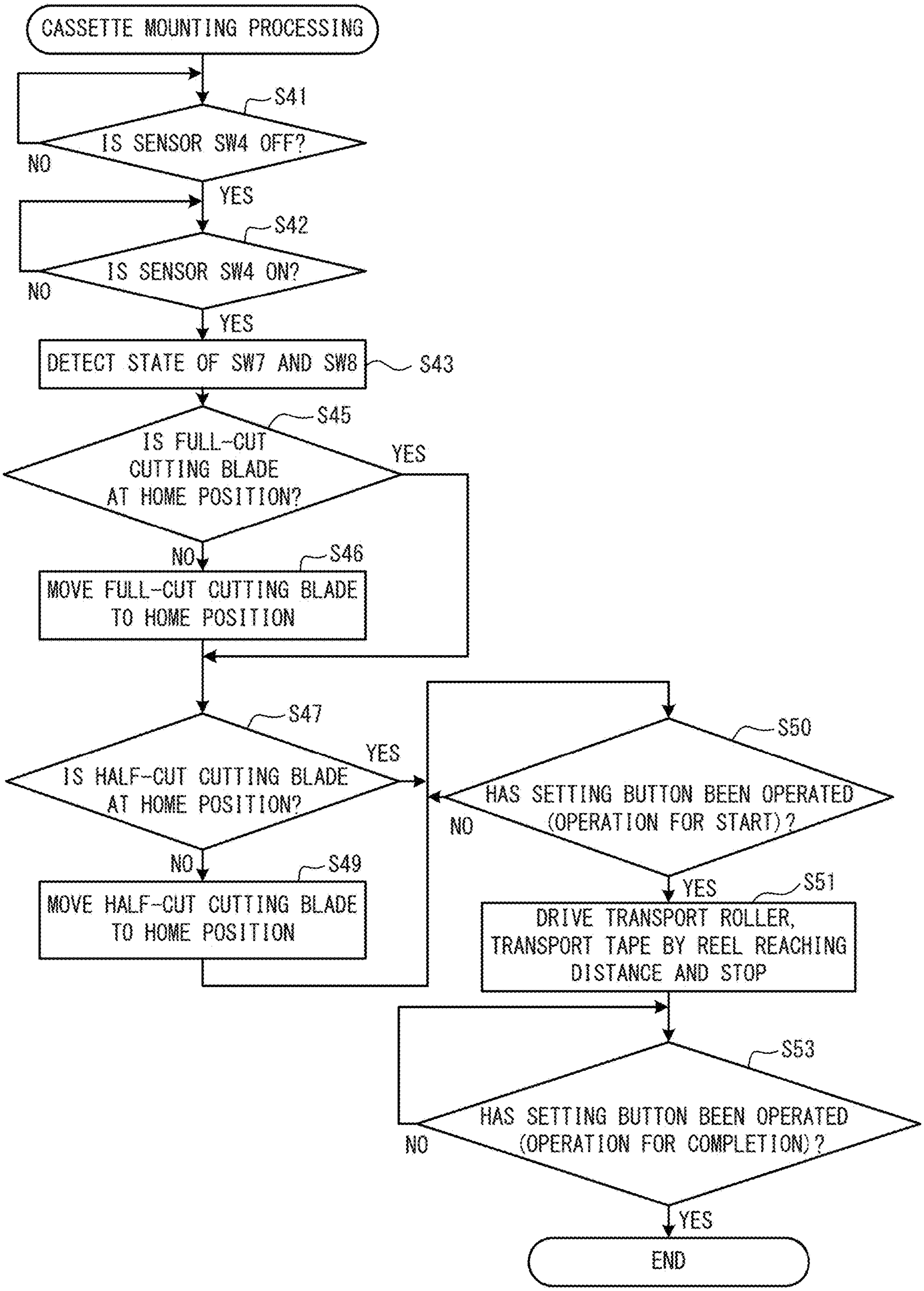
FIG. 33 is a flowchart of cassette installing processing.

Cassette installing processing will be described with reference to FIG. 33. When replacing the tape cassette 100 installed in the label affixing device 1, or installing the new tape cassette 100, the user performs an operation to command the start of a tape cassette 100 replacement operation, via the operation portion 13A. When the command for the tape cassette 100 replacement operation has been input, the cassette installing processing is started by the CPU 41 reading out and executing a program stored in the flash memory 44.

The CPU 41 detects the state of the sensor SW4, and when the sensor SW4 is ON (no at S41), the CPU 41 stands by for the tape cassette 100 mounted to the tape compartment 30 to be removed. When the tape cassette 100 is not mounted to the tape compartment 30 (when the tape cassette 100 is to be newly mounted), or when the tape cassette 100 mounted to the tape compartment 30 has been removed (when replacing the tape cassette 100), the sensor SW4 is turned OFF (yes at S41). When the sensor SW4 is OFF (no at S42), the CPU 41 stands by for the tape cassette 100 to be installed into the tape compartment 30.

When the tape cassette 100 is installed in the tape compartment 30 and the cassette cover 38 is closed, the platen holder 37 moves to the printing position. The tape 150 is pinched at the roller nip point NP between the transport roller 34 and the drive roller 101, and a state is obtained in which the tape 150 can be transported. When the sensor SW4 is turned ON by the tape cassette 100 being installed (yes at S42), the CPU 41 detects the state of the sensors SW7 and SW8 (S43). When the full-cut cutting blade 91 is at the home position (yes at S45), the CPU 41 shifts the processing to S47, and when the full-cut cutting blade 91 is not at the home position (no at S45), the CPU 41 drives the motor MT4 and moves the movable blade 91B to the home position (S46). When the half-cut cutting blade 92 is at the home position (yes at S47), the CPU 41 shifts the processing to S50, and when the half-cut cutting blade 92 is not at the home position (no at S47), the CPU 41 drives the motor MT5 and moves the movable blade 92B to the home position (S49).

When the user starts an operation to set the tape 150, of the installed tape cassette 100, onto the reel 80, the user operates a setting button (not shown in the drawings) of the operation portion 13A. The CPU 41 stands by for the input of the operation of the setting button of the operation portion 13A (no at S50). When the setting button is operated (yes at S50), the CPU 41 drives the motor MT3 and transports the tape 150 pinched at the roller nip point NP between the drive roller 101 and the transport roller 34 by a reaching distance, which is a length necessary for the downstream end portion of the tape 150 in the transport direction to reach the reel 80. The CPU 41 then stops the driving of the motor MT3 (S51). The reaching distance is obtained by adding a length of a margin necessary for an operation to insert the downstream end portion of the tape 150 into the slot 80F of the reel 80 to the length of the transport paths R1, R2, and R3, and is 185 mm, for example.

The user also operates the setting button of the operation portion 13A when the user inserts the downstream end of the tape 150 into the slot 80F of the reel 80, disposes the operation portion 86A at the first position, and completes the setting of the tape 150. The CPU 41 stands by for the operation of the setting button of the operation portion 13A to be input (no at S53). When the setting button is operated (yes at S53), the CPU 41 ends the cassette installing processing.

Note that after the tape 150 has been cut by the full-cut cutting blade 91, when the tape cassette 100 is used without being replaced, the user can start the operation to set the tape 150 on the reel 80 by long pressing the setting button of the operation portion 13A. In this case, the CPU 41 executes the processing at S51 and S53.

Print Processing

The print processing will be described with reference to FIG. 34 to FIG. 41. The user operates the external terminal 47A, such as the PC, and generates print data for printing a label, then transmits a print command to the label affixing device 1. In the following description, a case will be described in which two of the labels 160 to be affixed to two cables 19, respectively, are printed, for example. Note that, for convenience, of the two labels 160, the label 160 that is generated first will be referred to as a preceding label 162 and the label 160 that is generated second will be referred to as a following label 163 (refer to FIG. 37A and FIG. 37B). The length of the generated labels 160 is 32 mm, for example.

Further, after the last label 159 (refer to FIG. 37A and FIG. 37B) generated last during the previous printing has been peeled off, the downstream end portion of the label 160 in the transport direction is at a position X1 (to be described later) partway along the transport path R2 (refer to FIG. 18). In the following description, for convenience, the downstream end portion in the transport direction of the label 160 (a discard label 161, the preceding label 162, and the following label 163) will be referred to as a leading end portion, and the upstream end portion in the transport direction of the label 160 (the discard label 161, the preceding label 162, and the following label 163) will be referred to as a rear end portion. Since the laminate type tape cassette 100 has the configuration in which the film tape 110 and the double-sided adhesive tape 120 are adhered to each other at the roller nip point NP, they cannot be transported upstream in the transport direction. Thus, a section from the leading end portion of the label 160 positioned partway along the transport path R2 to a printing position PR (refer to FIG. 37A and FIG. 37B) at which the film tape 110 is printed by the thermal head 32 cannot be newly printed. For convenience, this section of the label 160 will be referred to as the discard label 161 (refer to FIG. 37A and FIG. 37B). In the print processing, in order for the discard label 161 to be wound up by the reel 80 of the winding portion 8 along with the release material 170 and not be peeled away from the release material 170, driving control is performed for the motor MT2 that rotates the reel 80 of the winding portion 8 and for the motor MT3 that drives the drive roller 101 that pinches the tape 150, together with the transport roller 34, at the roller nip point NP and transports the tape 150.

Figure 34:
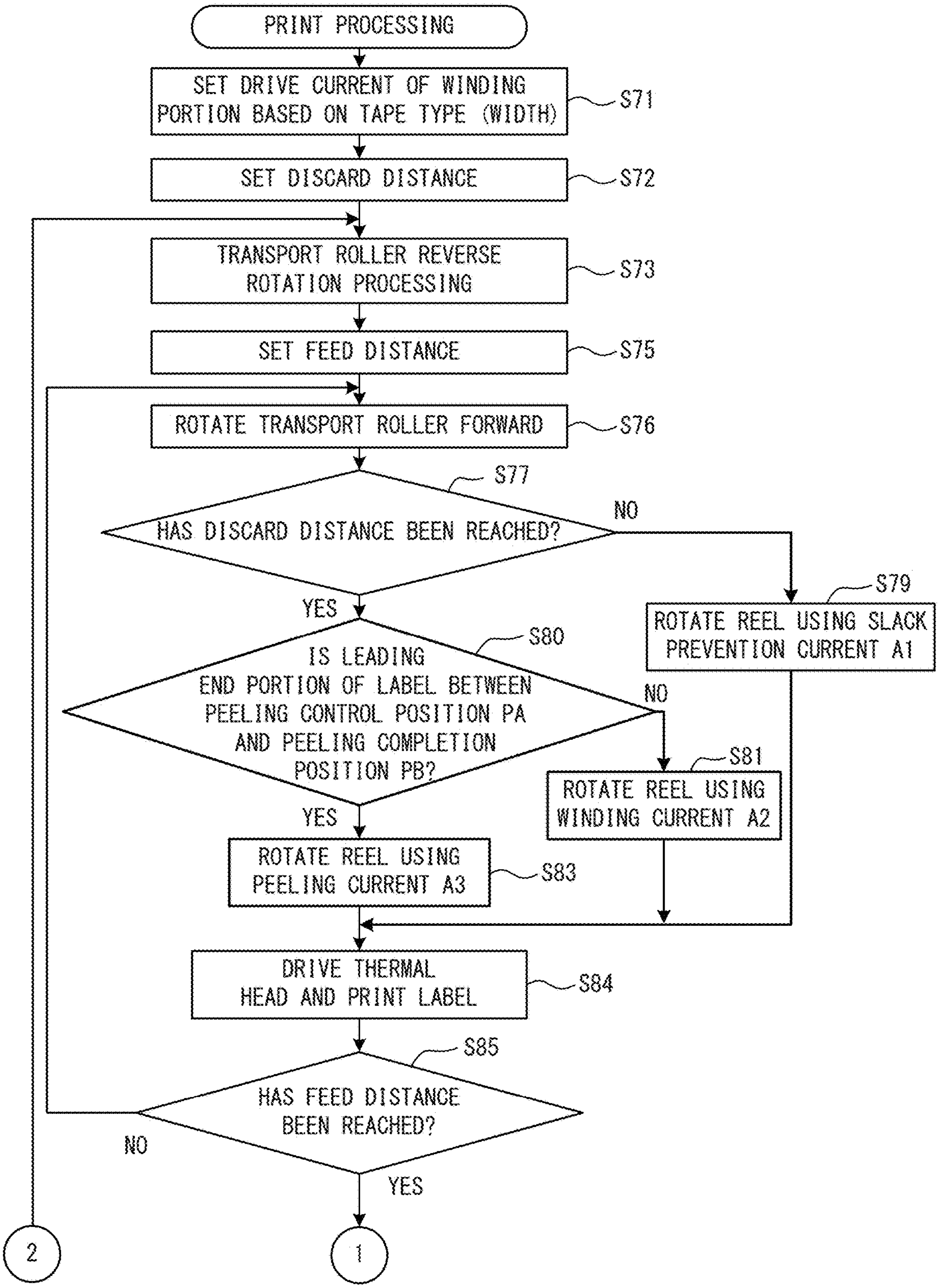
FIG. 34 is a flowchart of print processing.
Figure 35:
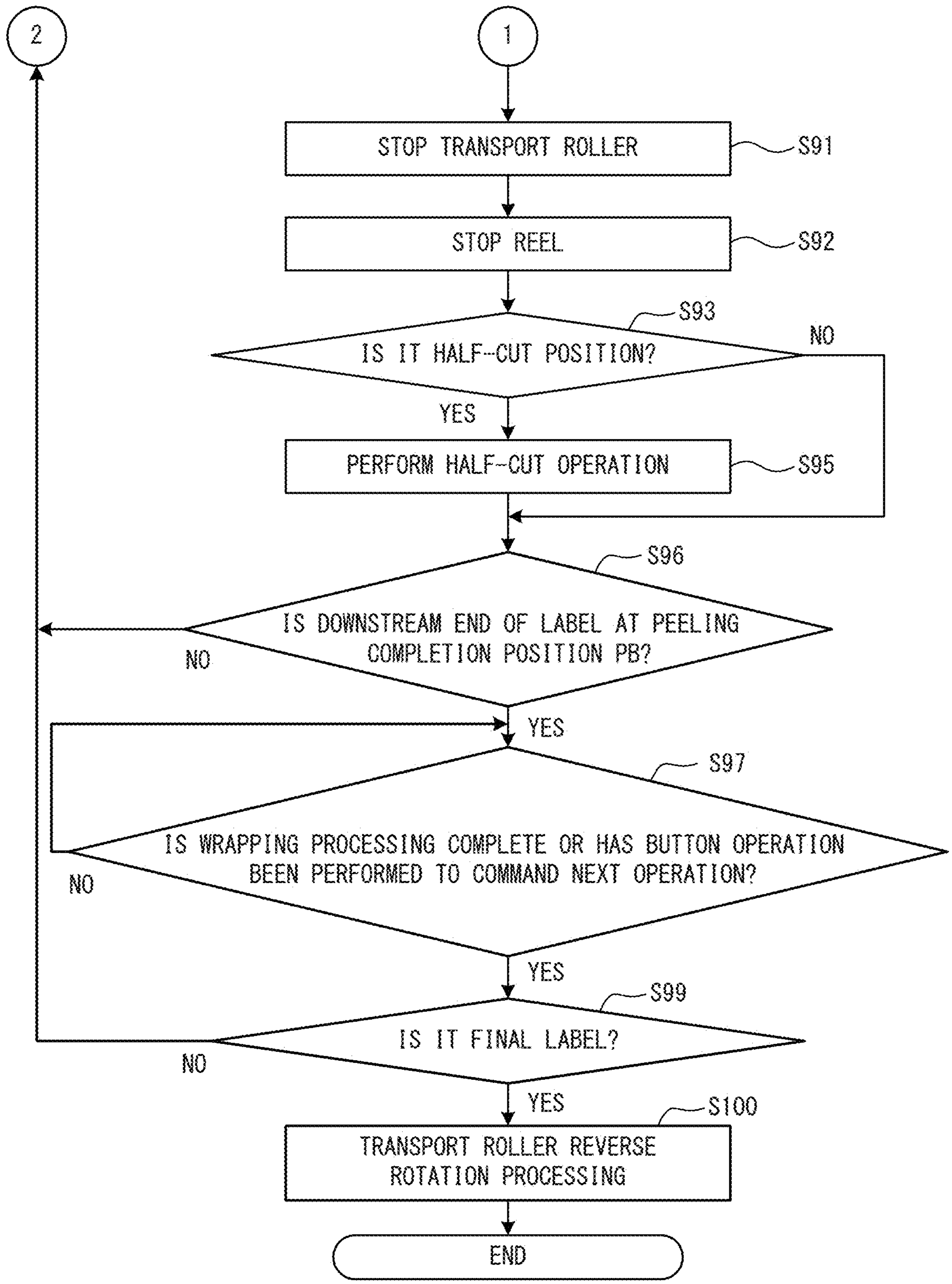
FIG. 35 is a continuation of the flowchart of the print processing.
Figure 36:
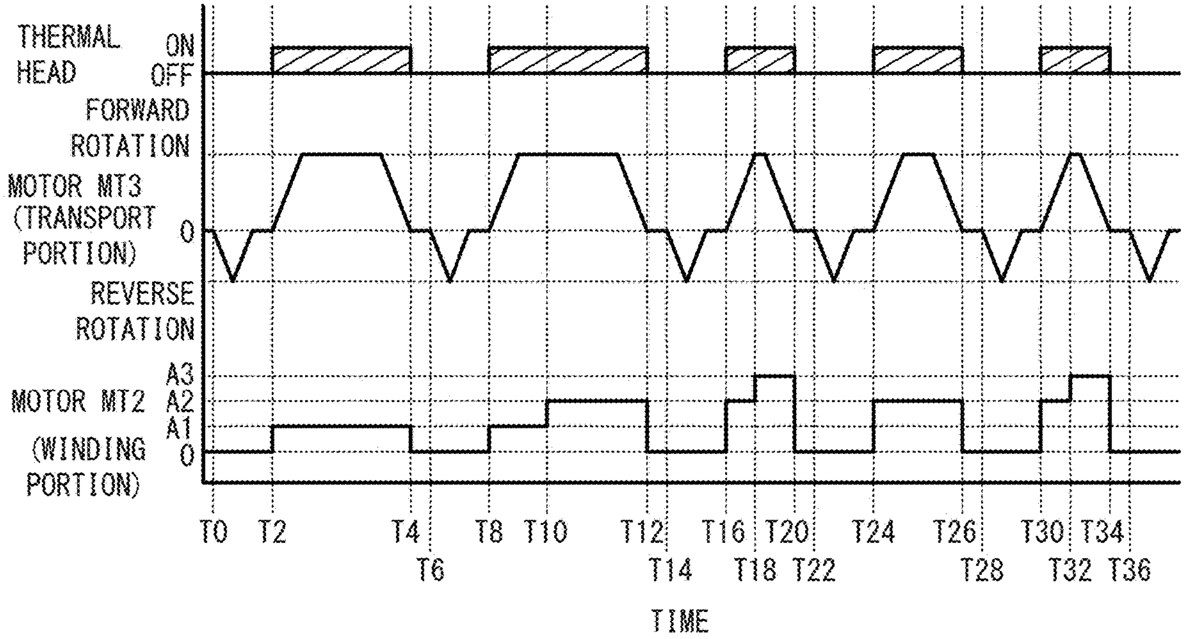
FIG. 36 is a timing chart of a printing operation.
Figure 37A:
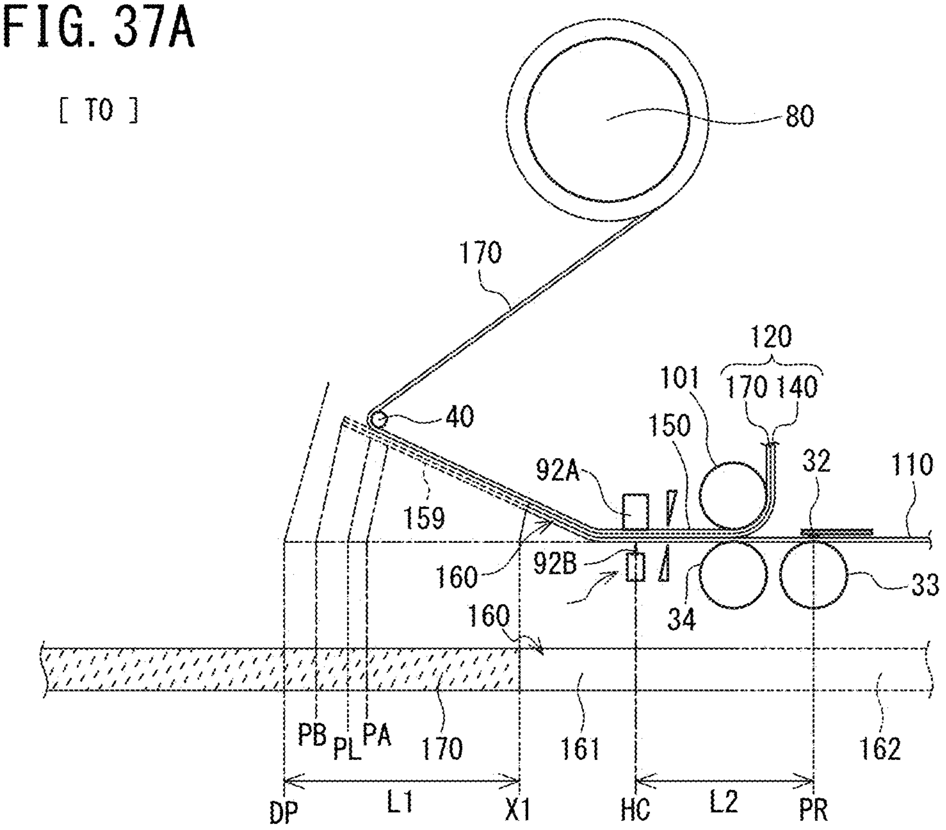
FIG. 37A and FIG. 37B are views showing a state of a label at T0 and T4 in the printing operation.
Figure 37B:
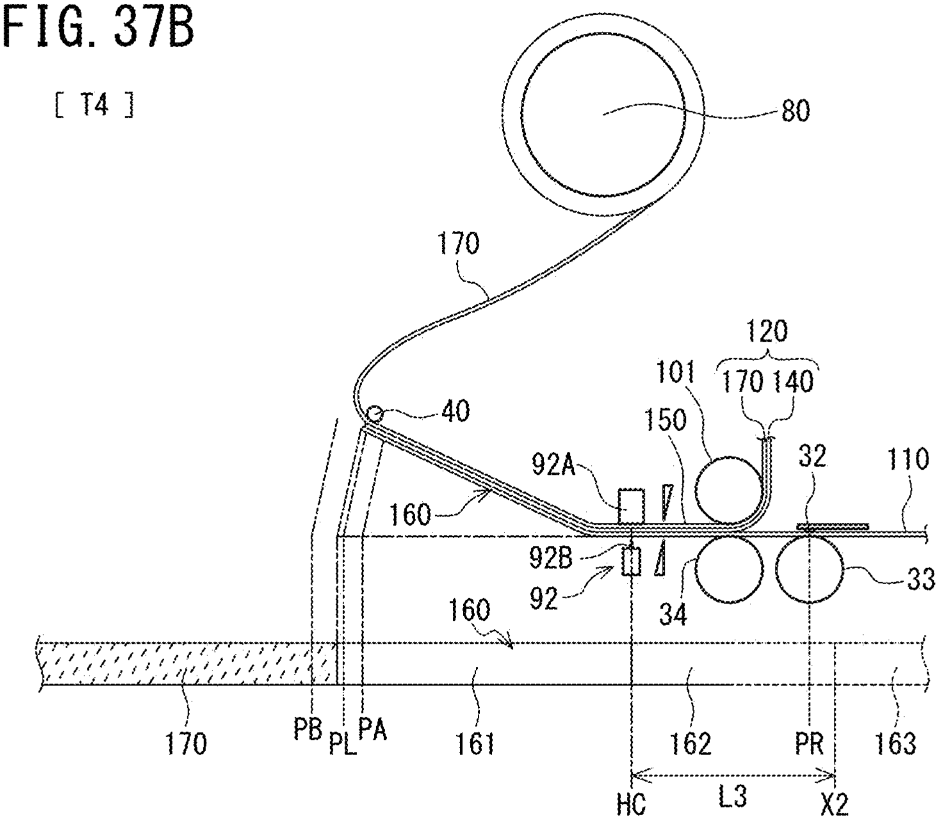
Figure 38A:
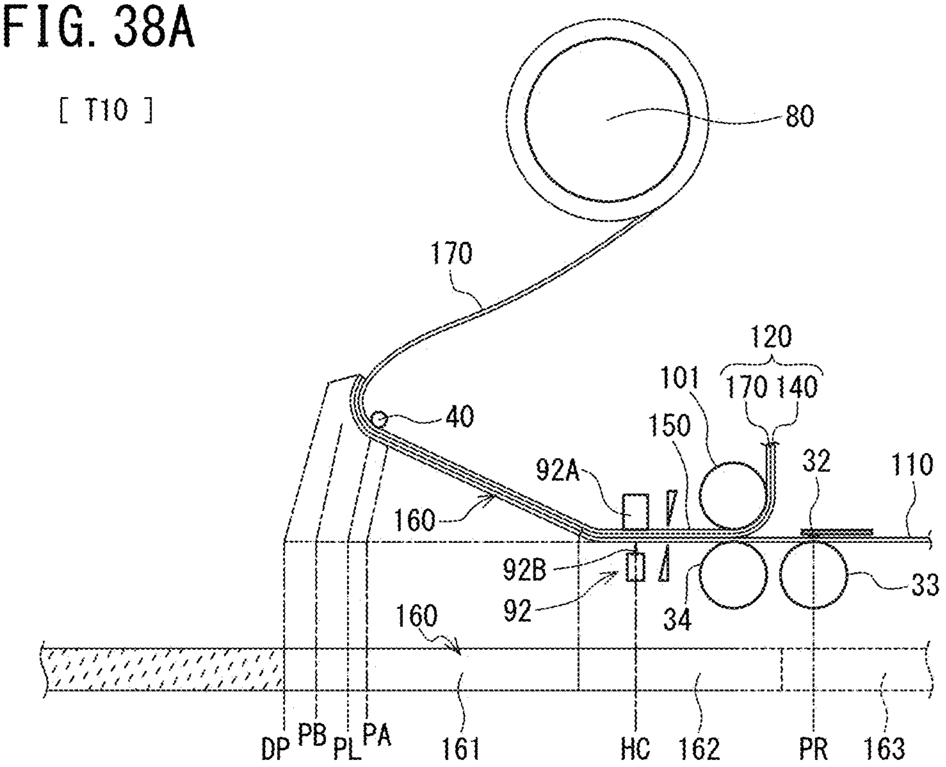
FIG. 38A and FIG. 38B are views showing a state of the label at T10 and T12 in the printing operation.
Figure 38B:
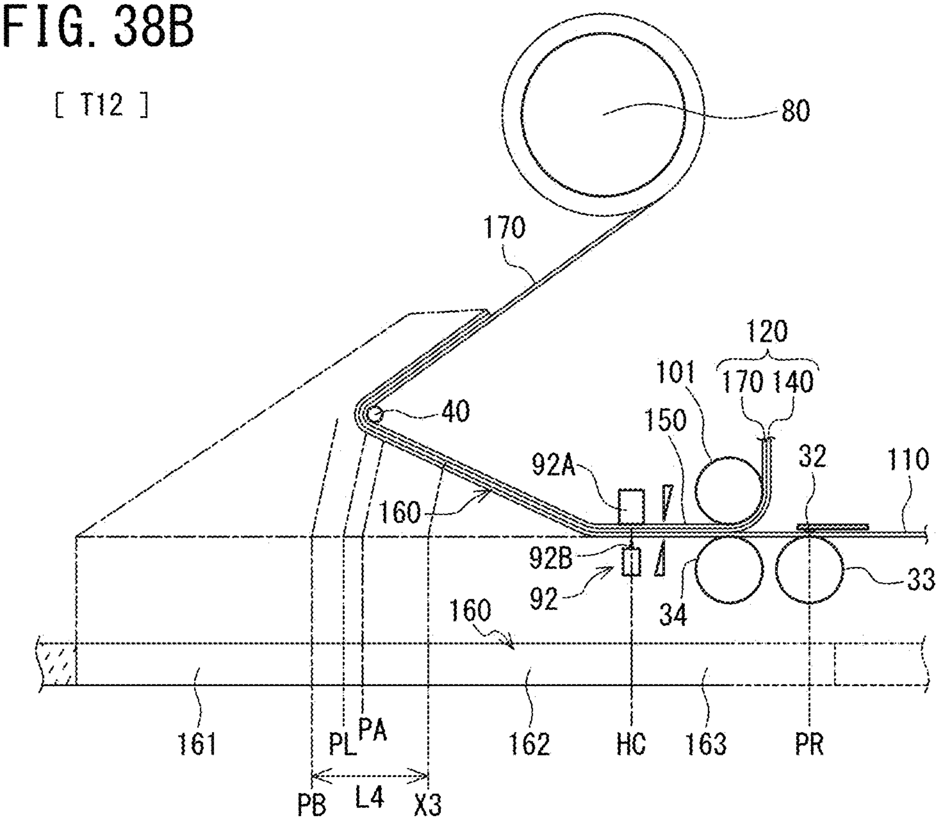
Figure 39A:
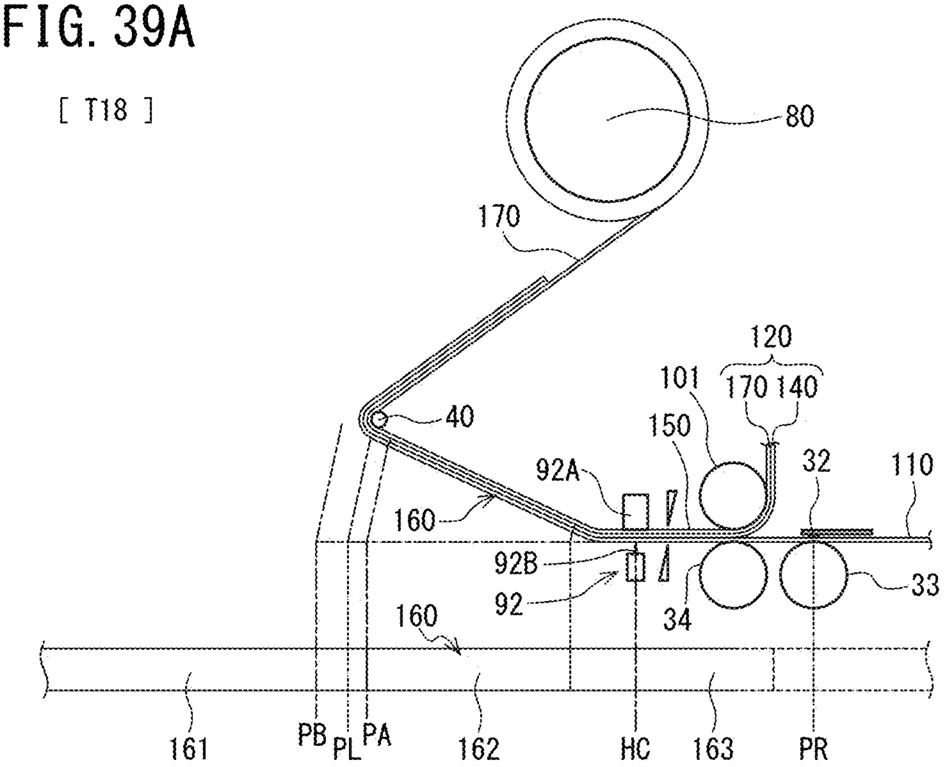
FIG. 39A and FIG. 39B are views showing a state of the label at T18 and T20 in the printing operation.
Figure 39B:
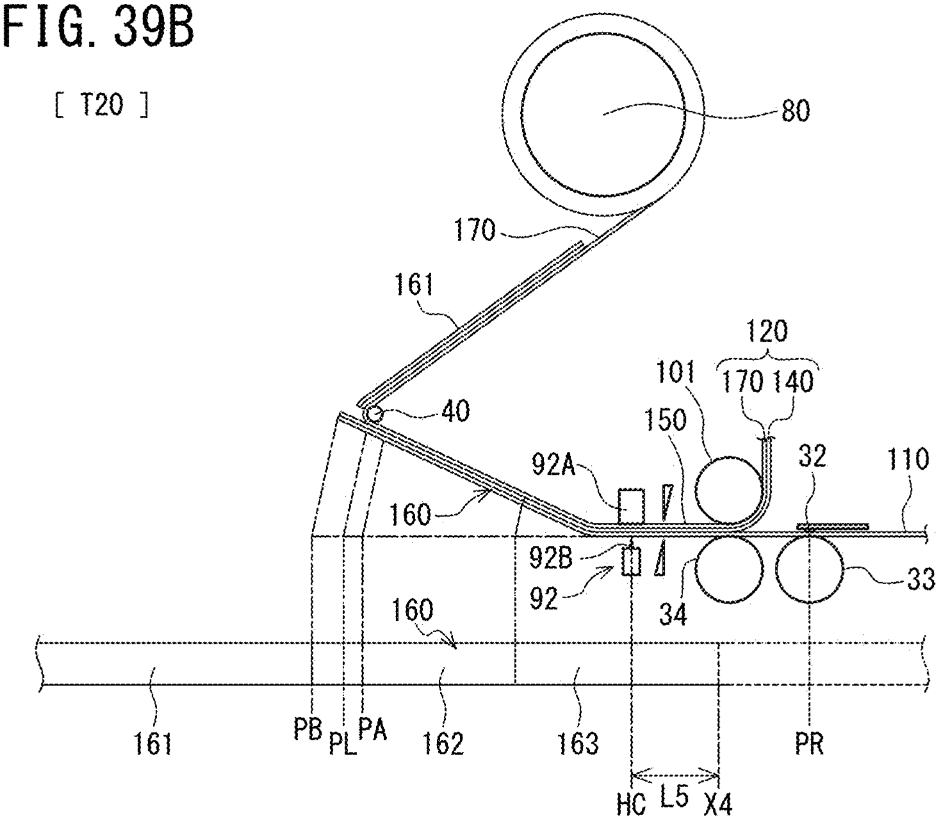

The print processing is started by the CPU 41 reading out and executing a program stored in the flash memory 44 when the print command has been received from the external terminal 47A. As shown in FIG. 34 to FIG. 36, based on the detection result of the sensor SW6, the CPU 41 determines the type of the tape cassette 100 installed in the tape compartment 30. In order to inhibit breakage of the tape 150, the smaller a tape width of the tape 150, the more the winding portion 8 needs to reduce a winding torque at the reel 80. The label affixing device 1 stores, in the flash memory 44, a table (not shown in the drawings) in which tape widths and current values (a peeling current A3, a winding current A2, a slack prevention current A1) are associated with each other, for setting a magnitude of a current flowing to the motor MT2 to rotate the reel 80 in accordance with the tape width.

Based on the table, the CPU 41 sets each of the peeling current A3, the winding current A2, and the slack prevention current A1 corresponding to the tape width (S71). The peeling current A3 is a current value required to impart a load equal to or greater than a peeling load, to the motor MT2 that rotates the reel 80. The peeling load generates, in the tape 150, a peeling tension necessary for the peeling portion 4 to peel away the leading end portion of the label 160. The peeling current A3 is applied to the motor MT2 when the leading end portion of the label 160 that is a peeling target (the preceding label 162, the following label 163) passes a peeling position PL (refer to FIG. 37A and FIG. 37B). For example, when the tape width is 24 mm, the peeling current A3 is 0.15 A. The winding current A2 is a current value that is applied to the motor MT2 when the reel 80 winds up the tape 150. The winding current A2 imparts a smaller load to the motor MT2 than the load imparted by the peeling current A3 that is equal to or greater than the peeling load. For example, when the tape width is 24 mm, the winding current A2 is 0.1 A. Note that, so that the tension is not suddenly applied to the tape 150 when peeling away the label 160, the winding current A2 is also applied to the motor MT2 immediately before applying the peeling current A3. The slack prevention current A1 is a current value that is applied to the motor MT2 in order for the reel 80 to wind up the tape 150 without peeling away the label 160, including when the leading end portion of the label 160 passes the peeling position PL, and also in order to not generate significant slack in the tape 150. As a result of the slack prevention current A1 imparting a load to the motor MT2 that is less than the peeling load, the tension generated in the tape 150 is a non-peeling tension that is less than the peeling tension.

The CPU 41 sets a discard distance L1 (refer to FIG. 37A) of the tape 150 (S72). The discard distance L1 is a distance over which the tape 150 is transported for the leading end portion of the discard label 161 to be transported from the position X1 to a discard position DP. The position X1 is a position of the leading end portion of the discard label 161 when the final label 159 is peeled away at the previous printing. The discard position DP is a position at which the leading end portion of the discard label 161 is not peeled away even when the tape 150 is wound up by the reel 80 as a result of driving the motor MT2 at the winding current A2. In the present embodiment, the discard position DP is, for example a position 10 mm downstream in the transport direction from the peeling position PL.

When the end portion of the label 160 is disposed at the affixing position P1, the leading end portion is disposed at a peeling completion position PB that is separated from the peeling position PL downstream in the transport direction by a distance set in accordance with the outer diameter of the cable 19. For example, when the outer diameter of the cable 19 is φ5, the peeling completion position PB is a position separated by 5 mm from the peeling position PL downstream in the transport direction. Further, the length of the label 160 is also set in accordance with the outer diameter of the cable 19 and a number of times to be wound on the cable 19. For example, when the outer diameter of the cable 19 is φ5, and the label 160 is to be wound twice around the cable 19, the length of the label 160 is 32 mm. Information relating to the position X1 set based on the print data at the time of the previous printing is stored in the flash memory 44, and the CPU 41 calculates the discard distance L1 based on the position X1 and the discard position DP.

At a time point T0 (refer to FIG. 36), the CPU 41 performs reverse direction processing that temporarily rotates (reverse rotates) the motor MT3 such that an orientation of the transport roller 34 is in the opposite direction from the direction in which the transport roller 34 transports the tape 150 (S73). At the time point T0, the leading end portion of the discard label 161 is at the position X1, and the position of the leading end portion of the preceding label 162 is the printing position PR (refer to FIG. 37A).

The CPU 41 sets a feed distance L2 (refer to FIG. 37A) of the tape 150 (S75). The feed distance L2 is a distance, in the course of transporting the tape 150, from a current position to reaching a position at which the transport of the tape 150 is temporarily stopped. In the present embodiment, the position at which the transport of the tape 150 is temporarily stopped is a half-cut position HC at which the label 160 is half cut, or is the peeling completion position PB at which the leading end portion is positioned when the end portion of the label 160 is disposed at the affixing position P1. A temporary stop position first reached from the start of the transport of the tape 150 at a time point T2 is the half-cut position HC. Thus, the feed distance L2 set at the time point T2 is the distance over which the tape 150 is transported during a period from when the leading end portion of the preceding label 162 is at the printing position PR to when the leading end portion reaches the half-cut position HC. In the present embodiment, the distance between the printing position PR and the half-cut position HC is 28 mm, for example. The CPU 41 sets the feed distance L2 at the time point T2 based on the distance between the printing position PR and the half-cut position HC.

In processing from S76 to S85, the printing is performed based on the print data while the tape 150 is transported. The CPU 41 rotates (forward rotates) the motor MT3 such that the orientation of the transport roller 34 is the direction in which the transport roller 34 transports the tape 150 (S76). The discard distance L1 is controlled by a rotation amount of the motor MT3. Until the transport distance of the tape 150 reaches the discard distance L1 (no at S77), the CPU 41 applies the slack prevention current A1 to the motor MT2, and winds up the tape 150 by rotating the reel 80 (S79). The motor MT2 is controlled such that a load equal to or greater than the peeling load is not generated. Thus, the reel 80 rotates when the load is light, and does not rotate when the load is great. Thus, the tape 150 is wound up without imparting a load to the tape 150 that is equal to or greater than the peeling load.

The CPU 41 selectively drives the heating elements of the thermal head 32 based on the print data, and performs the printing on the film tape 110 at a section that is the preceding label 162 (S84). The film tape 110 is adhered to the double-sided adhesive tape 120 at the roller nip point NP, and is transported as the tape 150. The feed distance L2 is controlled by the rotation amount of the motor MT3. When the transport distance of the tape 150 has not reached the feed distance L2 (no at S85), the CPU 41 shifts the processing to S76, and continues the printing on the preceding label 162 while transporting the tape 150.

When the transport distance of the tape 150 reaches the feed distance L2 at a time point T4 (yes at S85), the CPU 41 stops the driving of the motor MT3 and stops the transport of the tape 150 by the transport roller 34 (S91). The CPU 41 stops the driving of the motor MT2 and stops the winding up of the tape 150 by the reel 80 (S92). The temporary stop position at the time point T4 is the half-cut position HC (yes at S93, refer to FIG. 37B). The CPU 41 drives the motor MT5 and drives the half-cut cutting blade 92, and half cuts the label 160 (S95). The cut section Ct is formed between the rear end portion of the discard label 161 and the leading end portion of the preceding label 162.

The leading end portion of the label 160 is not at the peeling completion position PB (no at S96), and thus, the CPU 41 returns the processing to S73. The CPU 41 performs the reverse rotation processing at a time point T6 (S73), and sets a feed distance L3 from a time point T8 to a time point T12 (refer to FIG. 37B) (S75). The feed distance L3 set at the time point T8 is a distance over which the tape 150 is transported during a period from when the leading end portion of the following label 163 is at a position X2 to when the leading end portion reaches the half-cut position HC. The position X2 is the position of the rear end portion of the preceding label 162 when the leading end portion of the preceding label 162 is at the half-cut position HC. The labels 160 are formed by continuous printing without providing a margin section between the preceding label 162 and the following label 163. Thus, the position of the rear end portion of the preceding label 162 is the position of the leading end portion of the following label 163. The CPU 41 sets the feed distance L3 at the time point T8 based on the length and the position of the leading end portion of the preceding label 162.

The CPU 41 executes the processing from S76 to S85, and performs the printing based on the print data while transporting the tape 150. When the transport distance of the tape 150 reaches the discard distance L1 at a time point T10, the leading end portion of the discard label 161 is positioned at the discard position DP (yes at S77, refer to FIG. 38A). At the time point T10, the leading end portion of the peeling target preceding label 162 is not positioned between a peeling control position PA and the peeling completion position PB (no at S80). The peeling control position PA is a position at which the application of the peeling current A3 by the motor MT2 that rotates the reel 80 is started. For example, when the outer diameter of the cable 19 is φ5, the peeling control position PA is a position 3 mm from the peeling position PL upstream in the transport direction.

The CPU 41 applies the winding current A2 to the motor MT2 during a period from when the leading end portion reaches the discard position DP to when the leading end portion of the preceding label 162 reaches the peeling control position PA, and thus rotates the reel 80 and winds up the tape 150 (S81). The motor MT2 winds up the tape 150 at the load equal to or greater than the peeling load. The leading end portion of the discard label 161 has already passed the discard position DP, and thus, is transported toward the reel 80 together with the release material 170, without being peeled away from the release material 170. The CPU 41 ends the printing on the preceding label 162 between the time points T8 to T10, and continuously performs the printing on the following label 163 (S84). The CPU 41 continues the processing from S76 to S85.

When the transport distance of the tape 150 has reached the feed distance L3 at a time point T12 (yes at S85), the CPU 41 stops the transport of the tape 150 by the transport roller 34 (S91), and stops the winding of the tape 150 by the reel 80 (S92). The temporary stop position at the time point T12 is the half-cut position HC (yes at S93, refer to FIG. 38B). The CPU 41 drives the motor MT5 and drives the half-cut cutting blade 92, and half cuts the label 160 (S95). The cut section Ct is formed between the rear end portion of the preceding label 162 and the leading end portion of the following label 163.

The leading end portion of the preceding label 162 is not at the peeling completion position PB (no at S96), and thus the CPU 41 returns the processing to S73. The CPU 41 performs the reverse rotation processing at a time point T14 (S73) and sets a feed distance L4 from a time point T16 to a time point T20 (refer to FIG. 38B) (S75). The feed distance L4 set at the time point T16 is a distance over which the tape 150 is transported during a period from when the leading end portion of the preceding label 162 is at a position X3 to when the leading end portion reaches the peeling completion position PB. The position X3 is the position of the leading end portion of the preceding label 162 when the leading end portion of the following label 163 is at the half-cut position HC. The CPU 41 sets the feed distance L4 at the time point T16 based on the length of the preceding label 162 and the half-cut position HC.

The CPU 41 executes the processing from S76 to S85, and performs the printing based on the print data while transporting the tape 150. At the time point T16, the leading end portion of the preceding label 162 is further upstream in the transport direction than the peeling control position PA (no at S80). The CPU 41 applies the winding current A2 to the motor MT2, and thus rotates the reel and winds up the tape 150 (S81). The load equal to or greater than the peeling load is applied to the leading end portion of the preceding label 162, and the peeling away thus starts in accordance with the transport of the tape 150. At the time point T18, the leading end portion of the preceding label 162 reaches the peeling control position PA (refer to FIG. 39A). From the time point T18 onward, until the leading end portion of the preceding label 162 reaches the peeling completion position PB (yes at S80), the CPU 41 applies the peeling current A3 to the motor MT2 (S83). The even greater peeling force is applied to the leading end portion of the preceding label 162, and the preceding label 162 is peeled away by the peeling portion 4. The CPU 41 continues the printing on the following label 163 based on the print date from the time point T16 onward also (S84). When the printing on the following label 163 is complete, the CPU 41 does not drive the thermal head 32, and the printing is not performed on the labels 160 further upstream in the transport direction than the following label 163.

When the transport distance of the tape 150 has reached the feed distance L4 at the time point T20 (yes at S85), the CPU 41 stops the transport of the tape 150 by the transport roller 34 (S91), and stops the winding up of the tape 150 by the reel 80 (S92). The temporary stop position at the time point T20 is the position at which the leading end portion of the preceding label 162 has reached the peeling completion position PB (no at S93, yes at S96, refer to FIG. 39B). The CPU 41 stands by until the adhering of the preceding label 162 to the cable 19 in wrapping processing (to be described later) is complete, or until a button operation has been performed to command a next operation by the user (no at S97). When the affixing of the preceding label 162 in the wrapping processing is complete, or when the button operation by the user has been performed (yes at S97), since the printing has been performed on the following label 163 continuously to the preceding label 162 based on the print data, when the label 160 for which the affixing to the cable 19 is complete is not a final label for the current print data (no at S99), the CPU 41 returns the processing to S73.

The CPU 41 performs the reverse rotation processing at a time point T22 (S73) and sets a feed distance L5 from a time point T24 to a time point T26 (refer to FIG. 39B) (S75). The feed distance L5 set at the time point T24 is a distance over which the tape 150 is transported during a period from when the rear end portion of the following label 163 is at a position X4 to when the leading end portion reaches the half-cut position HC. The position X4 is the position of the rear end portion of the following label 163 when the leading end portion of the preceding label 162 is at the peeling completion position PB. The CPU 41 sets the feed distance L5 at the time point T24 based on the lengths of the preceding label 162 and the following label 163, and the peeling completion position PB.

The CPU 41 executes the processing from S76 to S85, and performs the printing based on the print data while transporting the tape 150. At the time point T24, the leading end portion of the following label 163 is further upstream in the transport direction than the peeling control position PA (no at S80). The CPU 41 applies the winding current A2 to the motor MT2, to wind up the tape 150 (S81). When the transport distance of the tape 150 has reached the feed distance L5 at the time point T26 (yes at S85), the CPU 41 stops the transport of the tape 150 by the transport roller 34 (S91), and stops the winding up of the tape 150 by the reel 80 (S92). The temporary stop position at the time point T26 is the half-cut position HC (yes at S93, refer to FIG. 40A). The CPU 41 drives the motor MT5 and drives the half-cut cutting blade 92, and half cuts the label 160 (S95). The cut section Ct is formed at the rear end portion of the following label 163.

The CPU 41 returns the processing to S73 (no at S96), and performs the reverse rotation processing at a time point T28 (S73). The CPU 41 sets a feed distance L6 from a time point T30 to a time point T34 (refer to FIG. 40A) (S75). The feed distance L6 set at the time point T30 is a distance over which the tape 150 is transported during a period from when the leading end portion of the following label 163 is at a position X5 to when the leading end portion reaches the peeling completion position PB. The position X5 is the position of the leading end portion of the following label 163 when the rear end portion of the following label 163 is at the half-cut position HC. The CPU 41 sets the feed distance L6 at the time point T30 based on the length of the following label 163 and the half-cut position HC.

Figure 40A:
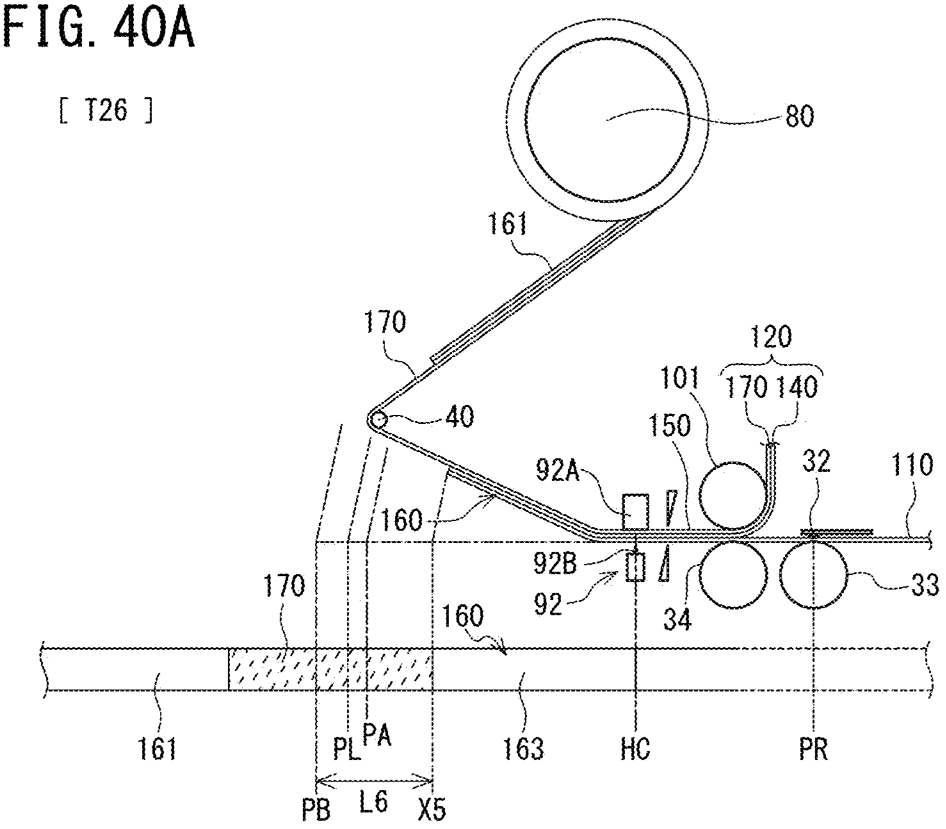
FIG. 40A and FIG. 40B are views showing a state of the label at T26 and T32 in the printing operation.
Figure 40B:
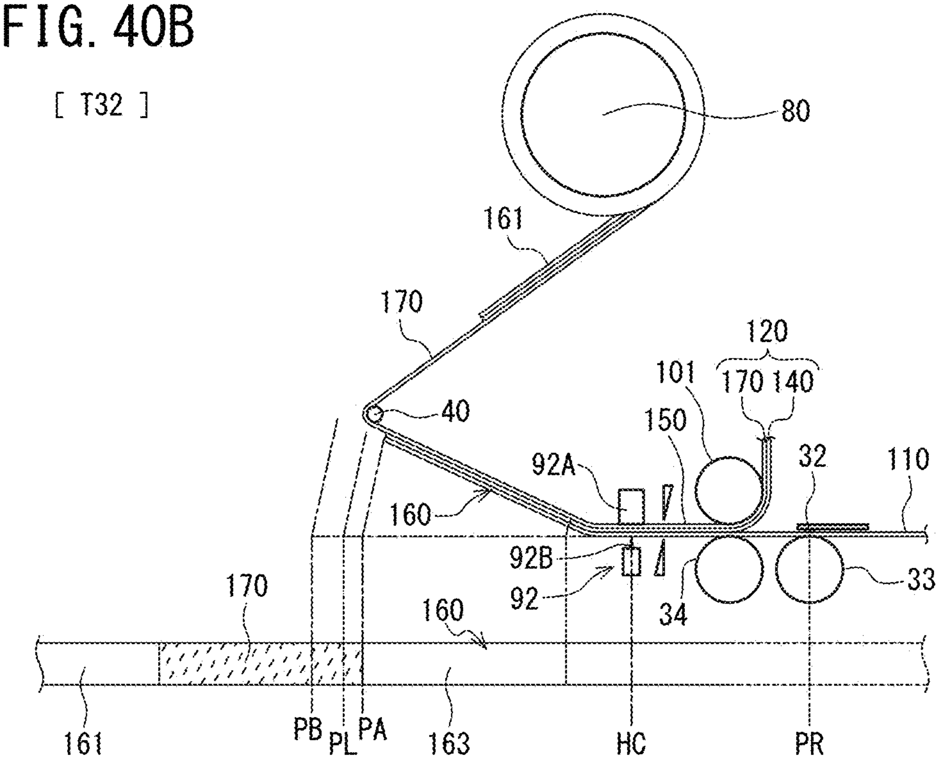
Figure 41:
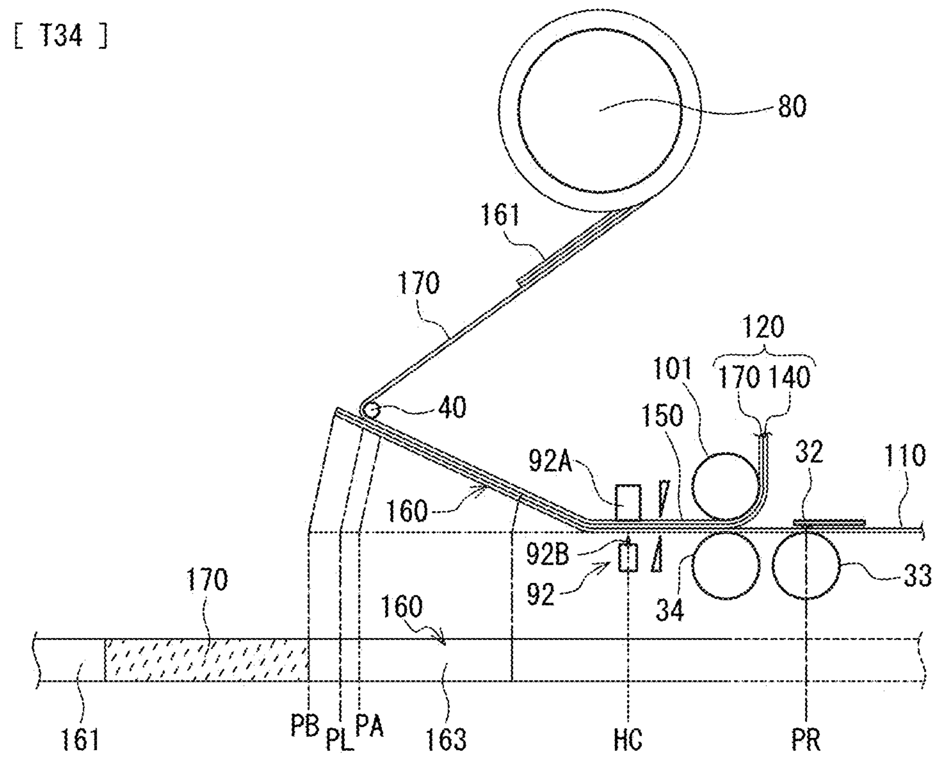
FIG. 41 is a view showing a state of the label at T34 in the printing operation.

At the time point T32, the leading end portion of the following label 163 has reached the peeling control position PA (refer to FIG. 40B). From the time point T30 onward, until the leading end portion of the following label 163 reaches the peeling completion position PB (yes at S80), the CPU 41 applies the peeling current A3 to the motor MT2 (S83). The even greater peeling load is applied to the leading end portion of the following label 163, and the following label 163 is peeled away by the peeling portion 4. When the transport distance of the tape 150 has reached the feed distance L6 at the time point T34 (yes at S85), the CPU 41 stops the transport of the tape 150 by the transport roller 34 (S91), and stops the winding up of the tape 150 by the reel 80 (S92). The temporary stop position at the time point T34 is the position at which the leading end portion of the following label 163 has reached the peeling completion position PB (no at S93, yes at S96, refer to FIG. 41). When the affixing of the following label 163 in the wrapping processing is complete, or when the button operation by the user has been performed (yes at S97), since the following label 163 is the final label in the current print data (yes at S99), the CPU 41 performs the reverse rotation processing at a time point T36 (S100), and ends the print processing.

Wrapping Processing

The wrapping processing will be described with reference to FIG. 42 and FIG. 43. The wrapping processing is processing to wrap the label 160 onto and affix the label 160 to the cable 19. When the sensor SW1 at the left end portion of the wrapping position P3 detects the cable 19, and the sensor SW2 at the right end portion of the wrapping position P3 detects the cable 19, the wrapping processing is started by the CPU 41 reading out and executing a program stored in the flash memory 44. The wrapping processing is executed in parallel to the print processing.

Figure 42:
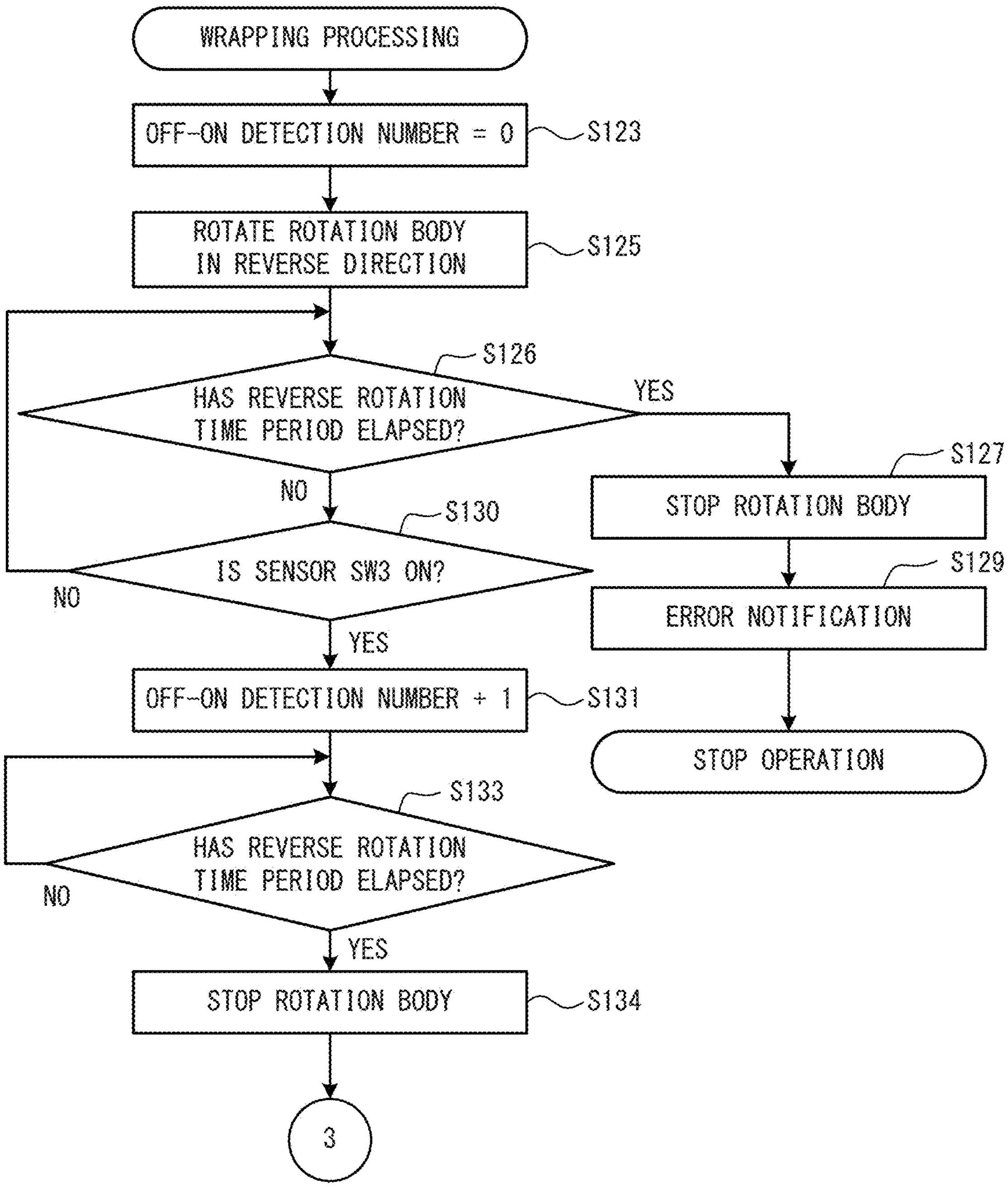
FIG. 42 is a flowchart of winding processing.

As shown in FIG. 42, the CPU 41 sets an OFF-ON detection number to zero (S123). The OFF-ON detection number is a variable for counting a number of times that the detection result of the sensor SW3 switches from OFF to ON. The rotation body 70 of the wrapping portion 7 is at the home position as a result of the wrapping home position processing when the power is turned on. The detection result of the sensor SW3 at the home position is OFF. The CPU 41 drives the motor MT1 and rotates the rotation body 70 in the reverse direction (S125). The direction in which the rotation body 70 rotates in the reverse direction is the clockwise direction when the label affixing device 1 is seen from the right side. When the sensor SW3 is not turned on after a predetermined reverse rotation time period has elapsed from the start of the reverse rotation (no at S126, no at S130, yes at S126), the CPU 41 stops the driving of the motor MT1 and stops the rotation body 70 (S127). The CPU 41 illuminates the LED of the notification portion 13B and notifies an error (S129), and stops the operation of the label affixing device 1.

When the sensor SW3 has turned on before the reverse rotation time period has elapsed from the start of the reverse rotation of the rotation body 70 (no at S126, yes at S130), 1 is added to the OFF-ON detection number (S131). The CPU 41 continues the reverse rotation of the rotation body 70 until the reverse rotation time period elapses (no at S133), and when the reverse rotation time period elapses (yes at S133), the CPU 41 stops the driving of the motor MT1 and stops the rotation body 70 (S134). The reverse rotation time period is a time period required for the rotation body 70 to rotate by roughly 90 degrees in the reverse rotation direction.

Figure 43:
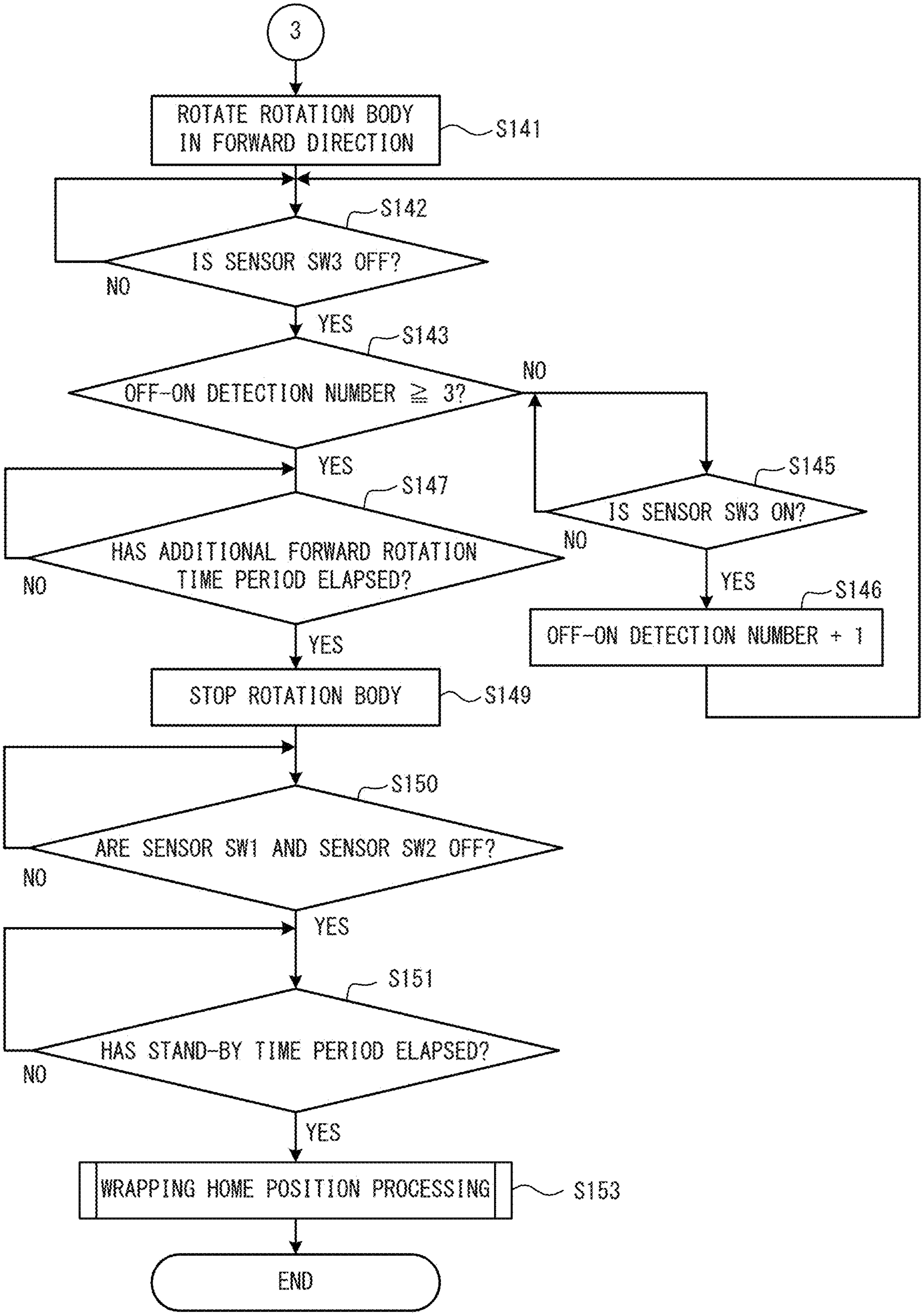
FIG. 43 is a continuation of the flowchart of the winding processing.

As shown in FIG. 43, the CPU 41 drives the motor MT1 and rotates the rotation body 70 in the forward direction (S141). The CPU 41 stands by until the sensor SW3 is turned off (no at S142), and when the sensor SW3 is turned OFF (yes at S142), the CPU 41 determines whether the OFF-ON detection number is equal to or greater than 3 (S143). When the OFF-ON detection number is less than 3 (no at S143), the CPU 41 stands by until the sensor SW3 is turned ON (no at S145), and when the sensor SW3 is turned ON (yes at S145), the CPU 41 adds 1 to the OFF-ON detection number (S146), and returns the processing to S142. At this time, the rotation body 70 is rotating once in the forward direction.

When the OFF-ON detection number is equal to or greater than 3 (yes at S143), the CPU 41 continues to rotate the rotation body 70 in the forward direction until an additional forward rotation time period elapses (no at S147). When the additional forward rotation time period has elapsed (yes at S147), the CPU 41 stops the driving of the motor MT1 and stops the rotation body 70 (S149). The additional forward rotation time period is a time period required for the rotation body 70 to rotate from where a detection position of the detection plate 74A by the detection light moves from being at the edge of the detection plate 74A to being at roughly the center of the detection plate 74A.

The CPU 41 stands by until the sensor SW1 at the left end portion is turned OFF and the sensor SW2 at the right end portion is turned OFF as a result of the cable 19 onto which the wrapping of the label 160 is complete being removed from the wrapping position P3 (no at S150). When the sensor SW is turned OFF and the sensor SW2 is turned OFF (yes at S150), the CPU 41 stands by until a stand-by time period required for the completion of the removal of the cable 19 has elapsed (S151). The CPU 41 executes the wrapping home position processing (refer to FIG. 32), and when the rotation body 70 is disposed at the home position, ends the wrapping processing (S153).

As described above, the non-peeling tension is a tension at which slack occurs in the tape 150 in the transport of the tape 150, for example. When the tape 150 is wound up by the reel 80 of the winding portion 8, the non-peeling tension is generated by the reel 80 pulling the tape 150 at the load less than the peeling load, by applying the slack prevention current A1 to the motor MT2 that rotates the reel 80. When the leading end portion of the discard label 161 is positioned at the peeling position PL and further upstream than the peeling position PL, by applying, to the motor MT2, the slack prevention current A1 that generates the non-peeling tension, the leading end portion of the discard label 161 passes through the peeling position PL without being peeled away by the peeling portion 4. The peeling tension is the tension with which the peeling portion 4 can peel away the label 160 from the tape 150. When the tape 150 is wound up by the reel 80 of the winding portion 8, the peeling tension is generated by the reel 80 pulling the tape 150 at the load equal to or greater than the peeling load, by applying the peeling current A3 or the winding current A2 to the motor MT2 that rotates the reel 80. As a result of imparting the peeling tension to the tape 150 by applying, to the motor MT2, the peeling current A3 or the winding current A2 that generate the peeling tension, after the leading end portion of the discard label 161 has passed the peeling position PL, the slack in the tape 150 is eliminated and the discard label 161 is transported without being peeled away. Thus, the label affixing device 1 can peel away the preceding label 162 and the following label 163 and affix the preceding label 162 and the following label 163 to the cable 19, without peeling away the discard label 161.

By applying the slack prevention current A1, which generates the non-peeling tension in the tape 150, to the motor MT2 when the discard label 161 passes through the peeling position PL, the discard label 161 is not peeled away by the peeling portion 4. By applying the peeling current A3 or the winding current A2, which generate the peeling tension in the tape 150, to the motor MT2 when the rear end portion of the discard label 161 is positioned in the vicinity of the peeling portion 4 upstream of the peeling position PL, the slack in the tape 150 is eliminated and, since the discard label 161 has already passed the peeling position PL at that time, the discard label 161 is transported without being peeled away. Thus, the label affixing device 1 can peel the preceding label 162 and the following label 163 and affix the preceding label 162 and the following label 163 to the cable 19, without peeing the discard label 161.

The label affixing device 1 cuts the label 160 without cutting the release material 170, using the half-cut cutting blade 92, and can generate the individual label 160. Thus, the label affixing device 1 can peel away the label 160 (the preceding label 162 and the following label 163) and affix the label 160 to the cable 19, without peeling away the discard label 161 from the release material 170 that is generated when creating the labels 160 in a non-continuous manner.

The label affixing device 1 includes the full-cut cutting blade 91, and can thus cut away the release material 170 to which the discard label 161 is affixed. Thus, it is not necessary to peel away the discard label 161 each time the label 160 is affixed, and the discard label 161 can be easily processed.

When the labels 160 are created in the continuous manner, the label affixing device 1 can create the preceding label 162 and the following label 163 in the continuous manner without forming the margin section, and thus, the discard label 161 is not formed. As a result, it is possible to suppress an unnecessary number of labels 160 from being consumed.

By replacing the tape cassette 100, the label affixing device 1 can create the label 160 from the variety of types of the tape 150. Depending on the type of the tape 150, there is the tape 150 for which processing cannot be performed to transport the tape 150 in the reverse direction, namely, upstream in the transport direction. When creating the label 160 from this type of the tape 150, the label affixing device 1 can easily perform the processing in which the discard label 161 is not peeled away.

By winding up the tape 150 using the winding portion 8, the label affixing device 1 can generate the peeling tension and the non-peeling tension in the tape 150, and can easily control the transport of the tape 150. Thus, the label affixing device 1 can reliably suppress the peeling away of the discard label 161.

By transporting the tape 150 using the transport roller 34, the label affixing device 1 can easily control the transport of the tape 150 using the peeling tension and the non-peeling tension in conjunction with the winding portion 8, and can thus reliably suppress the peeling away of the discard label 161.

Since the motor MT2 and the motor MT3 that respectively drive the winding portion 8 and the transport roller 34 are provided separately from each other, the label affixing device 1 can easily control the transport of the tape 150 using the peeling tension and the non-peeling tension by individually driving each of the motor MT2 and the motor MT3, and can reliably suppress the peeling away of the discard label 161.

By controlling the driving of each of the winding portion 8 and the transport roller 34, the label affixing device 1 can easily impart the peeling tension or the non-peeling tension to the tape 150, and can reliably suppress the peeling away of the discard label 161.

Other

In the present embodiment, the film tape 110 is one example of the "label material" of the present disclosure. The print surface Ut is one example of the "one surface" of the present disclosure. The tape 150 is one example of the "print tape" of the present disclosure. The thermal head 32 is one example of the "print head" of the present disclosure. The thermal head 32, the platen roller 33, the tape compartment 30, and the sensor SW6 are one example of the "print portion" of the present disclosure. The transport roller 34, the drive roller 101, and the motor MT3 are one example of the "transport portion" of the present disclosure. The cable 19 is one example of the "adherend" of the present disclosure. The discard label 161 is one example of the "margin region" of the present disclosure. The half-cut cutting blade 92 is one example of the "half cutting portion" of the present disclosure. The full-cut cutting blade 91 is one example of the "full cutting portion" of the present disclosure. The tape compartment 30 is one example of the "compartment" of the present disclosure. The sensor SW6 is one example of the "detector" of the present disclosure. The motor MT2 is one example of the "first drive source" of the present disclosure. The motor MT3 is one example of the "second drive source" of the present disclosure. The peeling tension generated as a result of pulling the tape 150 using the reel 80 rotated by applying the peeling current A3 or the winding current A2 to the motor MT2 is one example of the "first tension" of the present disclosure. The non-peeling tension generated as a result of pulling the tape 150 using the reel 80 rotated by applying the slack prevention current A1 to the motor MT2 is one example of the "second tension" of the present disclosure.

MODIFIED EXAMPLES

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below:

Between the time points T2 to T10 when the transport distance of the tape 150 is less than the discard distance L1 and before the leading end portion of the discard label 161 has reached the discard position DP, the CPU 41 applies the slack prevention current A1 to the motor MT2 of the reel 80, but the CPU 41 may cause the motor MT2 to be in a stopped state. In other words, during a period until the leading end portion of the discard label 161 reaches the discard position DP, the reel 80 need not necessarily wind up the tape 150 even when the tape 150 is transported by the transport roller 34, and the tape 150 may be in a slack state at the transport path R3.

The current flowing to the motor MT2 of the reel 80 is changed from the slack prevention current A1 to the winding current A2 when the leading end portion of the discard label 161 reaches the discard position DP, but the slack prevention current A1 may be switched to the winding current A2 when the rear end portion of the discard label 161 reaches the peeling control position PA, for example. In this case, since the leading end portion of the discard label 161 has passed through the peeling position PL, it is possible to reliably suppress the peeling away of the discard label 161.

The label affixing device 1 winds up the discard label 161, which is generated between the previous printing and the current printing, onto the winding portion 8 without peeling away the discard label 161, but control may be performed to not peel away the leading end portion of the label 160 on which printing has failed or the label 160 that has been unnecessarily printed, for example, and to wind up the defective label 160 onto the winding portion 8 along with the release material 170.

What is claimed is:

1. A label affixing device comprising:
 - a print portion including a print head and configured to print an image on a label material of a print tape, the print tape including the label material and a release material adhered to one surface of the label material;
 - a transport portion configured to transport the print tape printed by the print portion;
 - a cutting portion disposed further downstream than the print portion in a transport direction of the print tape, the cutting portion being configured to cut the label material printed by the print portion into an individual label;
 - a peeling portion configured to peel, away from the release material, the label cut by the cutting portion; and
 - a controller configured to control the print portion, the transport portion, and the cutting portion, wherein in the label affixing device that affixes the label peeled away by the peeling portion to an adherend being an affixing target of the label, the controller cuts the label material to form a margin region between a preceding label and a following label, the preceding label being one of the labels, the following label being positioned upstream of the preceding label in the transport direction, and the margin region being a region that is not a target of printing by the print portion, transports the print tape while imparting a second tension to the print tape when a downstream end portion of the margin region in the transport direction is positioned at a position of the peeling portion or at a position further upstream than the peeling portion in the transport direction, the second tension being smaller than a first tension required by the peeling portion for the peeling away of the label, and transports the print tape while imparting the first tension to the print tape when the downstream end portion of the margin region is positioned further downstream than the position of the peeling portion in the transport direction.

2. A label affixing device comprising:

a print portion including a print head and configured to print an image on a label material of a print tape, the print tape including the label material and a release material adhered to one surface of the label material;

a transport portion configured to transport the print tape printed by the print portion;

a cutting portion disposed further downstream than the print portion in a transport direction of the print tape, the cutting portion being configured to cut the label material printed by the print portion into an individual label;

a peeling portion configured to peel, away from the release material, the label cut by the cutting portion; and a controller configured to control the print portion, the transport portion, and the cutting portion, wherein in the label affixing device that affixes the label peeled away by the peeling portion to an adherend being a target for affixing the label, the controller cuts the label material to form a margin region between a preceding label and a following label, the preceding label being one of the labels, the following label being positioned upstream of the preceding label in the transport direction, and the margin region being a region that is not a target of printing by the print portion, transports the print tape while imparting a second tension to the print tape when the margin region is positioned at a position of the peeling portion or at a position further upstream than the peeling portion in the transport direction, the second tension being smaller than a first tension required by the peeling portion for the peeling away of the label, and transports the print tape while imparting the first tension to the print tape when an upstream end portion of the margin region in the transport direction is positioned further upstream in the transport direction than, and close to, the position of the peeling portion.

3. The label affixing device according to claim 1, wherein the cutting portion includes a half cutting portion configured to cut the label material, of the label material and the release material of the print tape.

4. The label affixing device according to claim 3, wherein the cutting portion includes a full cutting portion configured to cut through the print tape, and the full cutting portion is disposed further upstream than the half cutting portion in the transport direction.

5. The label affixing device according to claim 3, wherein when the individual label is continuously printed, the controller performs the printing on the label by the print portion without forming the margin region between the preceding label and the following label, and when an upstream end portion of the preceding label in the transport direction is transported to a position of the half cutting portion, the controller temporarily stops the printing on the following label by the print portion, and performs the cutting of the label material by the half cutting portion.

6. The label affixing device according to claim 1, wherein the print portion includes a compartment configured to accommodate a tape cassette, the tape cassette housing the label material and the release material, and the tape cassette having an indicator portion including information indicating a type of the print tape, and a detector configured to detect the type of the print tape, based on the information indicated by the indicator portion of the tape cassette.

7. The label affixing device according to claim 1, wherein the transport portion includes a winding portion configured to wind up the print tape, and the controller controls the winding portion and imparts, to the release material, the first tension with which the label material is peeled away from the print tape by the peeling portion, and the second tension with which the label material is not peeled away from the print tape by the peeling portion.

8. The label affixing device according to claim 7, wherein the transport portion includes a transport roller configured to feed, toward the peeling portion, the print tape pinched at a roller nip point, and the controller controls the transport roller and imparts, to the print tape, the first tension with which the label material is peeled away from the print tape by the peeling portion, and the second tension with which the label material is not peeled away from the print tape by the peeling portion.

9. The label affixing device according to claim 8, wherein the transport portion includes a first drive source configured to drive the winding portion, and a second drive source configured to drive the transport roller.

10. The label affixing device according to claim 9, wherein the controller imparts the second tension to the print tape by transporting the print tape using the transport roller, and performing control to stop the winding up of the release material by the winding portion, or to cause the first drive source to drive the winding portion at a load smaller than a peeling load required for the peeling away of the label by the peeling portion, and imparts the first tension to the print tape by transporting the print tape using the transport roller, and performing control to cause the first drive source to drive the winding portion at a load equal to or greater than the peeling load required for the peeling away of the label by the peeling portion.

11. The label affixing device according to claim 7, further comprising:

a first surface disposed further upstream in the transport direction than the peeling portion; and a second surface disposed between the peeling portion and the winding portion in the transport direction, wherein an angle formed between the first surface and the second surface is equal to or less than 90 degrees.

12. The label affixing device according to claim 11, wherein the first surface and the second surface are disposed in a fixed manner with respect to a housing of the label affixing device.

13. The label affixing device according to claim 1, further comprising:

a wrapping portion configured to affix the label peeled away by the peeling portion to the adherend being the affixing target of the label.

14. The label affixing device according to claim 7, wherein the winding portion includes a cylindrical member configured to rotate around a rotational axis center and wind up the print tape.

15. The label affixing device according to claim 2, wherein the cutting portion includes a half cutting portion configured to cut the label material, of the label material and the release material of the print tape.

16. The label affixing device according to claim 15, wherein the cutting portion includes a full cutting portion configured to cut through the print tape, and the full cutting portion is disposed further upstream than the half cutting portion in the transport direction.

17. The label affixing device according to claim 15, wherein when the individual label is continuously printed, the controller performs the printing on the label by the print portion without forming the margin region between the preceding label and the following label, and when an upstream end portion of the preceding label in the transport direction is transported to a position of the half cutting portion, the controller temporarily stops the printing on the following label by the print portion, and performs the cutting of the label material by the half cutting portion.

* * * * *